United States Patent [19]
Taki et al.

[11] Patent Number: 5,955,959
[45] Date of Patent: *Sep. 21, 1999

[54] SYNCHRONIZATION MESSAGE TRANSMITTING APPARATUS

[75] Inventors: Yoshitaka Taki, Kawasaki; Kazuhiko Hata, Yokohama; Junji Yamamoto, Kawasaki, all of Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/783,066

[22] Filed: Jan. 15, 1997

[30] Foreign Application Priority Data

Jul. 31, 1996 [JP] Japan ................................ 8-201667

[51] Int. Cl.$^6$ ....................................................... H04L 7/00
[52] U.S. Cl. .............................. 340/825.14; 340/825.16; 340/825.2; 375/358; 375/365; 375/357; 370/509
[58] Field of Search ......................... 340/825.14, 825.16, 340/825.2; 375/354, 358, 365, 362, 357, 356; 370/509, 503

[56] References Cited

U.S. PATENT DOCUMENTS

| | | | |
|---|---|---|---|
| 4,562,574 | 12/1985 | Kambayashi | 375/357 X |
| 4,779,087 | 10/1988 | Fukuda et al. | 340/825.14 X |
| 5,268,932 | 12/1993 | Okuzono | 375/354 |
| 5,438,591 | 8/1995 | Oie et al. | 375/362 X |
| 5,631,931 | 5/1997 | Takano et al. | 375/357 X |
| 5,748,684 | 5/1998 | Sanchez | 375/357 |

*Primary Examiner*—Brian Zimmerman
*Assistant Examiner*—William H. Wilson, Jr.
*Attorney, Agent, or Firm*—Helfgott & Karas, P.C.

[57] ABSTRACT

A synchronization message transmitting apparatus employs a synchronization message to synchronize a communication network. If an abnormality occurs in any part of the apparatus or on a clock in the apparatus, the apparatus detects the abnormality and prepares a synchronization message indicating that a frame to be transmitted must not be used for preparing a master clock. An opposite party that receives the frame with the synchronization message will not use the received frame for preparing a master clock.

33 Claims, 55 Drawing Sheets

Fig. 50

| | OVERHEAD | | |
|---|---|---|---|
| SECTION OVERHEAD | FRAME SYNC<br><br>A1 | FRAME SYNC<br><br>A2 | TRACE/SPARE<br>(STM IDENTIFICATION)<br>J0/Z0 |
| | BIT INTERLEAVE PARITY 8<br><br>B1 | ORDERWIRE<br><br>E1 | USER CHANNEL<br><br>F1 |
| | DATA COMMUNICATION CHANNEL<br>D1 | DATA COMMUNICATION CHANNEL<br>D2 | DATA COMMUNICATION CHANNEL<br>D3 |
| LINE OVERHEAD | POINTER<br><br>H1 | POINTER<br><br>H2 | POINTER ACTION<br><br>H3 |
| | BIT INTERLEAVE PARITY 8<br><br>B2 | AUTOMATIC SWITCHING<br><br>K1 | AUTOMATIC SWITCHING<br><br>K2 |
| | DATA COMMUNICATION CHANNEL<br>D4 | DATA COMMUNICATION CHANNEL<br>D5 | DATA COMMUNICATION CHANNEL<br>D6 |
| | DATA COMMUNICATION CHANNEL<br>D7 | DATA COMMUNICATION CHANNEL<br>D8 | DATA COMMUNICATION CHANNEL<br>D9 |
| | DATA COMMUNICATION CHANNEL<br>D10 | DATA COMMUNICATION CHANNEL<br>D11 | DATA COMMUNICATION CHANNEL<br>D12 |
| | SYNC QUALITY LEVEL/SPARE (BITS 5 TO 8)<br>S1/Z1 | FEBE/SPARE<br><br>M0 or M1/Z2 | ORDERWIRE<br><br>E2 |

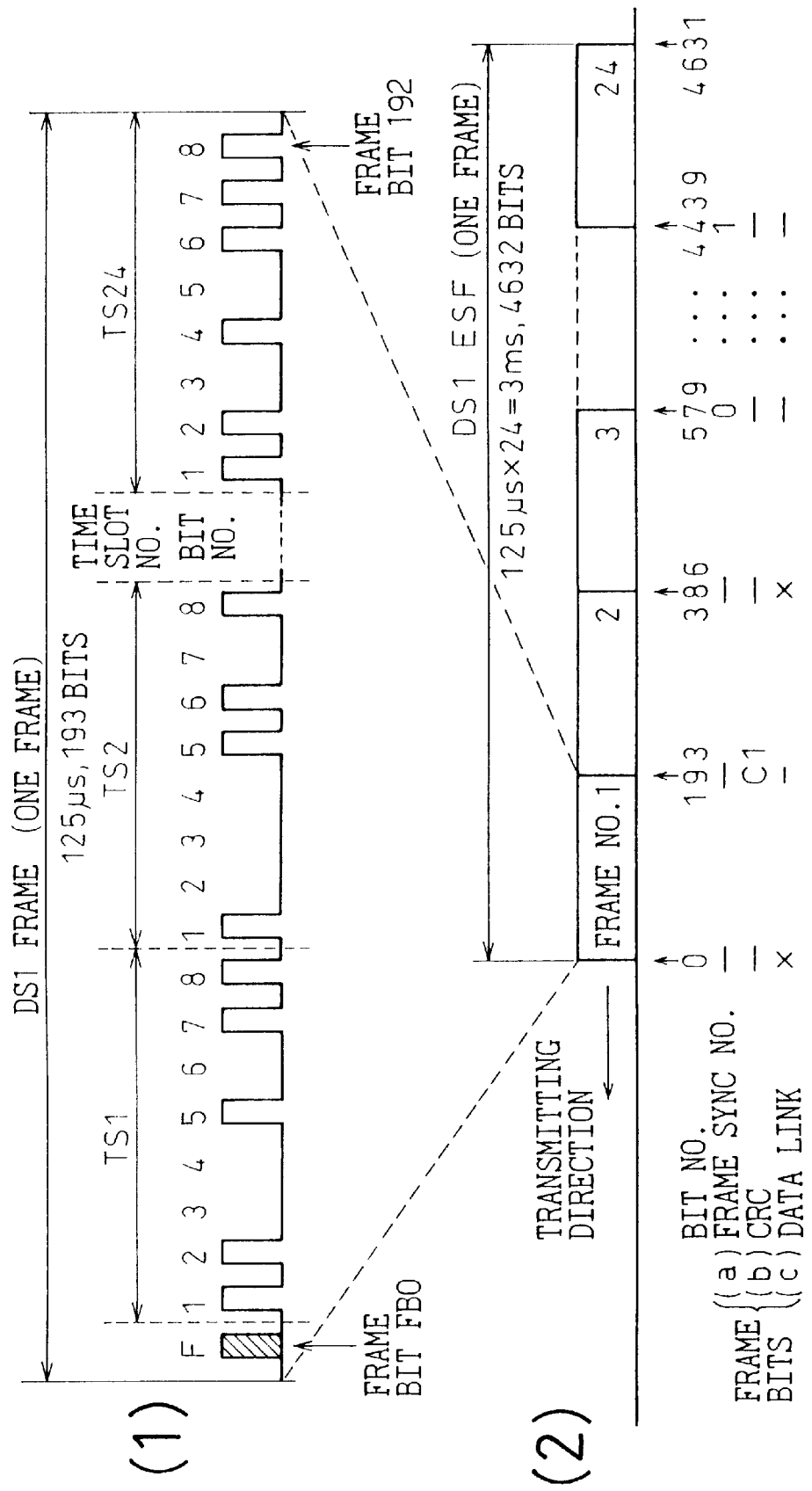

Fig.52

| FRAME NO. | FRAME BITS | | | |
|---|---|---|---|---|
| | BIT NO. | (a) FRAME SYNC NO. | (b) CRC | (c) DATA LINK (DL) |
| 1 | 0 | — | — | × |
| 2 | 193 | — | C1 | — |
| 3 | 386 | — | — | × |
| 4 | 579 | 0 | — | — |
| 5 | 772 | — | — | × |
| 6 | 965 | — | C2 | — |
| 7 | 1158 | — | — | × |
| 8 | 1351 | 0 | — | — |
| 9 | 1544 | — | — | × |
| 10 | 1737 | — | C3 | — |
| 11 | 1930 | — | — | × |
| 12 | 2123 | 1 | — | — |
| 13 | 2316 | — | — | × |
| 14 | 2509 | — | C4 | — |
| 15 | 2702 | — | — | × |
| 16 | 2895 | 0 | — | — |
| 17 | 3088 | — | — | × |
| 18 | 3281 | — | C5 | — |
| 19 | 3474 | — | — | × |
| 20 | 3667 | 1 | — | — |
| 21 | 3860 | — | — | × |
| 22 | 4053 | — | C6 | — |
| 23 | 4246 | — | — | × |
| 24 | 4439 | 1 | — | — |

Fig.53

| NAME | ABBREVIATION | DETAILS | PRIORITY | SYNC MESSAGE | |
|---|---|---|---|---|---|
| | | | | S1 | ESF-DS1 DATA LINK |
| (1) LAYER 1 TRACEABLE | PRS | $\pm 10^{-11}$ IN CLOCK ACCURACY | 1 | 0001 | 00000100111111111 |
| (2) SYNCHRONIZED TRACEABILITY UNDEFINED | STU | ACCURACY UNDEFINED (FOR APPARATUS NOT SUPPORTING SYNC MESSAGE) | 2 | 0000 | 00001000111111111 |
| (3) LAYER 2 TRACEABLE (HOLDOVER) | ST2 | $\pm 1.6 \times 10^{-8}$ IN CLOCK ACCURACY | 3 | 0111 | 00001100111111111 |
| (4) LAYER 3 TRACEABLE (HOLDOVER) | ST3 | $\pm 4.6 \times 10^{-6}$ IN CLOCK ACCURACY | 4 | 1010 | 00010000111111111 |
| (5) SONET CLOCK | SIC | $\pm 20 \times 10^{-6}$ IN CLOCK ACCURACY | 5 | 1100 | 00100010111111111 |
| (6) LAYER 4 TRACEABLE (FREE RUNNING) | ST4 | $\pm 32 \times 10^{-6}$ IN CLOCK ACCURACY | 6 | — | 00101000111111111 |
| (7) UNUSABLE | DUS | MUST NOT USE FOR MASTER CLOCK | 7 | 1111 | 00110000111111111 |
| (8) RESERVED FOR NETWORK SYNCHRONIZATION | RES | | ALLOCATED FOR USER | 1110 | 01000000111111111 |

SYNCHRONIZATION MESSAGE TRANSMITTING APPARATUS

BACKGROUND OF THE INVENTION

1. Field of the Invention

The present invention relates to an apparatus for transmitting a synchronization message used to synchronize a communication network.

The apparatus is employed in, for example, a Synchronous Optical Network (SONET) that conforms to a new international standard for optical transmission. SONET was formulated by the Exchange Carriers Standards Association for the American National Standards Institute (ANSI). SONET has been adopted by the Consultive Committee for International Telephone and Telegraph (CCITT).

The SONET interface standard defines the physical interface, optical line rates known as Optical Carrier (OC) signals, frame format, and an Operations, Administration, Maintenance and Provisioning (OAM&P) protocol. SONET allows many advanced networking capabilities and, at the same time, provides transport for existing services.

Optical Carrier (OC) signals have electrical equivalents called Synchronous Transport Signals (STSs). The base rate is 51.84 Mb/s (OC-1/STS-), and higher rates are multiples of the base rate. For example, OC-12=12 ×51.84 Mb/s, or 622.080 Mb/s. Higher rate SONET signals are produced by byte-interleaving N STS-1s (N=any whole number) to form an STS-N signal. The STS-N is then converted to an Optical Carrier-Level N (OC-N) signal. The optical OC-N signal is formed by scrambling the electrical STS-N signal using a present polynomial, which was selected to improve laser longevity. The OC-N has a line rate of exactly N times the OC-1 signal (51.84 Mb/s).

SONET transmission equipment interleaves STSs to form a synchronous high-speed signal. This method permits access to low-speed signals, e.g., DS0 (digital signal 0), DS1 (digital signal 1), etc., without multistage multiplexing and demultiplexing.

SONET stipulates a synchronization message that specifies the quality level or accuracy of a clock used to synchronize the network. It is necessary to provide a function of transmitting the synchronization message with the overhead of a SONET signal or with the data link bits of ESF (extended superframe format) frames consisting of DS1, as well as a function of selecting a master clock of the best quality according to the synchronization message.

2. Description of the Related Art

Although SONET stipulates the transmission and reception of a synchronization message and the switching of a reference clock under a normal state, it insufficiently stipulates how to deal with errors. For example, a synchronization message inserting unit, a signal transmitting unit, a system clock or reference clock selecting unit, etc., incorporated in a synchronization message transmitting apparatus may cause an unequipped error, an erroneously mounted error, or an internal fault. It is also possible that manual switches are erroneously operated to select, as a reference clock, an external clock whose quality is lower than an internal clock. If such an error or mistake occurs, the actual quality of a reference clock used to transmit a frame to an opposite party will be lower than the clock quality written in a synchronization message enclosed in the frame. SONET insufficiently stipulates how to deal with this kind of trouble.

SUMMARY OF THE INVENTION

An object of the present invention is to provide a synchronization message transmitting apparatus capable of informing an opposite party that, if any part of the apparatus is abnormal, a frame to be transmitted to the opposite party must not be used for providing a master clock, thereby preventing the opposite party from using a wrong clock.

In order to accomplish the object, aspect 1 of the present invention provides a synchronization message transmitting apparatus having an abnormality detecting unit for detecting an abnormality, if any, in a clock selecting unit and provides abnormality information to any one of a synchronization message processing unit, a synchronization message inserting unit, and a signal transmitting unit. The unit that has received the abnormality information inserts, in a synchronization message of a frame to be transmitted to an opposite party, information indicating that the frame must not be used for providing a master clock. The opposite party that receives the frame with the synchronization message will never use the frame for preparing a master clock.

Aspect 2 of the present invention provides a synchronization message transmitting apparatus having a synchronization message comparing unit that compares a clock quality level written in a received synchronization message with the quality level of an internal clock and provides a comparison result to any one of a synchronization message processing unit, a synchronization message inserting unit, and a signal transmitting unit. If the comparison result indicates that the clock quality level in the received synchronization message is lower than that of the internal clock, the unit that has received the comparison result inserts, in a synchronization message of a frame to be transmitted to an opposite party, information indicating that the frame must not be used for providing a master clock. The opposite party that receives the frame will never uses the frame for preparing a master clock.

BRIEF DESCRIPTION OF THE DRAWINGS

The above objects and features of the present invention will be more apparent from the following description of the preferred embodiments when read in conjunction with the accompanying drawings, wherein:

FIG. 50 shows a SONET overhead;

FIG. 51 shows a DS1 frame and an ESF-DS1 frame;

FIG. 52 shows a bit configuration of the ESF-DS1 frame; and

FIG. 53 shows clock quality levels and corresponding synchronization messages in a SONET overhead and in data link bits of ESF-DS1 frames.

DESCRIPTION OF THE PREFERRED EMBODIMENTS

Figure 1:
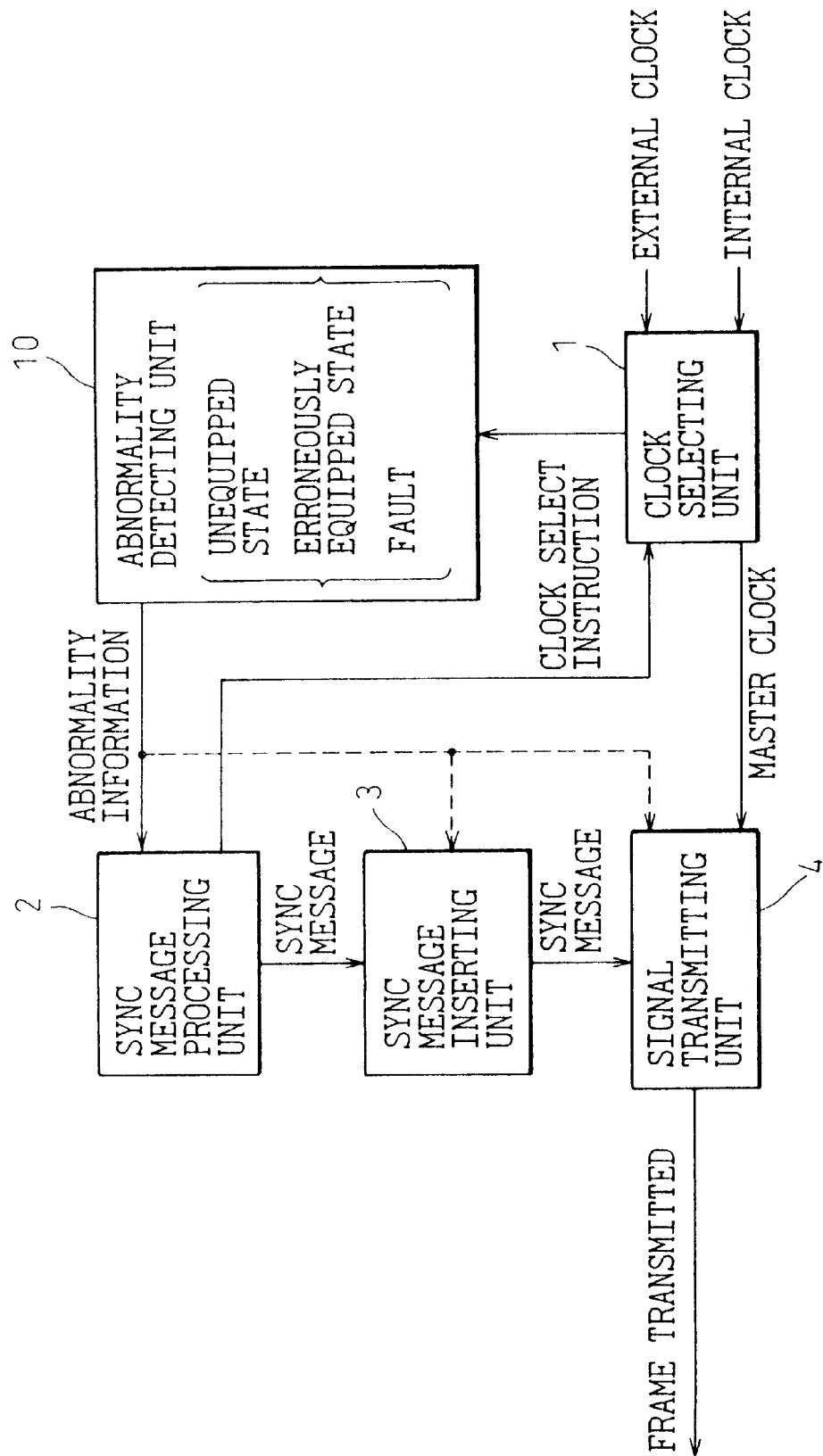
FIG. 1 shows the principle of a synchronization message transmitting apparatus according to aspect 1 of the present invention.

For a better understanding of the preferred embodiments of the present invention, a SONET overhead and the data link bits of ESF (extended superframe format) frames will be explained with reference to FIGS. 50 to 53 as examples of signal frames for transmitting a synchronization message.

A synchronous transport signal 1 (STS-1) of SONET consists of an overhead and a payload and is transmitted as an optical carrier 1 (OC-1). FIG. 50 shows the overhead of the STS-1. The overhead is formed of a section overhead and a line overhead and has a structure of three columns and nine rows.

The overhead includes bytes A1 and A2 for frame synchronization, J0 for STS identification, B1 and B2 for bit interleave parity 8, E1 and E2 for orderwire, D1 to D12 for data communication channels, H1 to H3 for pointers, K1 and K2 for automatic switching, S1 for a synchronization quality level, M0 and M1 for FEBE, and F1 for a user channel. Bytes Z0, Z1, and Z2 are undefined.

Bits 5 to 8 in the byte S1 hatched in FIG. 50 are used to store a synchronization message.

FIG. 51(1) shows a DS1 frame that has been used before SONET. The DS1 frame consists of a frame bit FB0 and 24 channels of time slots TS1 to TS24. Each time slot is made of eight bits, and therefore, the DS1 frame has 193 (=1+8× 24) bits. The time width of the DS1 frame is 125 $\mu$s (1.544 Mb/s).

FIG. 51(2) shows a frame of the extended superframe format (ESF) consisting of 24 DS1 frames, i.e., 4632 (=193× 24) bits. The time width of the ESF frame is 3 ms (=125 $\mu$s×24).

The 24 DS1s in the ESF frame have sequential frame numbers, and the 4632 bits in the ESF frame have sequential bit numbers with the first bit being a bit 0.

Among 24 frame bits of the 24 DS1s in the ESF frame, (a) six are assigned for frame synchronization, (b) six for cyclic redundancy check (CRC), and (c) 12 for data link.

FIG. 52 is a table showing the DS1 frame numbers 1 to 24 in the ESF frame, the bit numbers of the 24 frame bits, and the assignments of the frame bits, i.e., (a) frame synchronization, (b) CRC, and (c) data link.

The frame synchronization bits (a) are bits 579, 1351, 2123, 2895, 3667, and 4439, which are allocated 0, 0, 1, 0, 1, and 1, respectively. The CRC bits (b) are bits 193, 965, 1737, 2509, 3281, and 4053, which are allocated C1, C2, C3, C4, C5, and C6, respectively.

The data link bits (c) are 12 bits 0, 386, . . . , 4246, which are allocated data X, i.e., a synchronization message.

The synchronization message consists of 16 bits, and therefore, is inserted in the data link bits of a plurality of ESF frames.

FIG. 53 is a table showing clock quality levels and corresponding synchronization messages. The quality level of each clock is the priority or accuracy of the clock when used as a reference clock. A synchronization message representing a clock quality level is stored as a synchronization message in the byte S1 of the overhead of a SONET STS-1 (FIG. 50), or in the data link bits of ESF-DS1 frames (FIGS. 51 and 52).

There are eight clock quality levels as shown in FIG. 53, i.e., (1) layer 1 traceable (PRS) having top priority, (2) synchronization traceability undefined (STU) having second priority, (3) layer 2 traceable holdover (ST2) having third priority, (4) layer 3 traceable holdover (ST3) having fourth priority, (5) traceable SONET internal clock (SIC) having fifth priority, (6) layer 4 traceable free-running (ST4) having sixth priority, (7) do not use as a master clock (DUS) having seventh priority, and (8) reserved for network synchronization (RES). The name in each pair of parentheses is an abbreviation.

The eighth level RES is reserved for network synchronization and its priority is determined by the user.

The column "S1" in the table indicates the bits 5 to 8 of the byte S1 of a SONET overhead (FIG. 50) that represent one of the clock quality levels.

The column "ESF-DS1 data link" in the same table indicates the data link bits of ESF-DS1 frames (FIGS. 51 and 52) that represent one of the clock quality levels.

For example, the clock quality level 7 "do not use as a master clock" (DUS) is transmitted (a) by inserting a synchronization message of "1111" in the bits 5 to 8 of the byte S1 of a SONET overhead (FIG. 50), or (b) by inserting a synchronization message of "0011000011111111" in the data link bits of DS1-ESF frames (FIGS. 51 and 52).

A conventional apparatus for transmitting such a synchronization message has, as mentioned above, the problem that the actual quality level of a reference clock is sometimes lower than a clock quality level written in the synchronization message.

The embodiments of the present invention to solve this problem will be explained.

(1) Aspect 1

FIG. 1 shows the principle of a synchronization message transmitting apparatus according to the aspect 1 of the present invention. Units that form the apparatus will be explained. A synchronization message processing unit 2 determines a master clock among available clocks according to clock determination information and provides a synchronization message that specifies the quality level of the master clock. A clock selecting unit 1 selects the master clock among the available clocks. A synchronization message inserting unit 3 inserts the synchronization message in a frame to be transmitted. A signal transmitting unit 4 transmits the frame to an opposite party according to the master clock. An abnormality detecting unit 10 detects an abnormality, if any, in the selecting unit 1 and provides abnormality information to any one of the units 2, 3, and 4. The unit that has received the abnormality information inserts, in the synchronization message of a frame to be transmitted, information indicating that the frame must not be used for providing a master clock.

If the processing unit 2 receives abnormality information from the detecting unit 10, the processing unit 2 inserts the abnormality information in a synchronization message and transfers the message to the inserting unit 3. The inserting unit 3 inserts the message in a frame to be transmitted and transfers the frame to the transmitting unit 4. The transmitting unit 4 transmits the frame to the opposite party.

If the inserting unit 3 receives abnormality information from the detecting unit 10, the inserting unit 3 inserts the abnormality information in a synchronization message transferred from the processing unit 2 without regard to the contents of the message, puts the message in a frame to be transmitted, and transfers the frame to the transmitting unit 4. The transmitting unit 4 transmits the frame to the opposite party.

If the transmitting unit 4 receives abnormality information from the detecting unit 10, the transmitting unit 4 forcibly inserts the abnormality information in the synchronization message of a frame transferred from the inserting unit 3 without regard to the contents of the message and transmits the frame to the opposite party.

The opposite party that receives the frame with the synchronization message of abnormality information will never use the frame for preparing a master clock.

(2) Aspect 2

Figure 2:
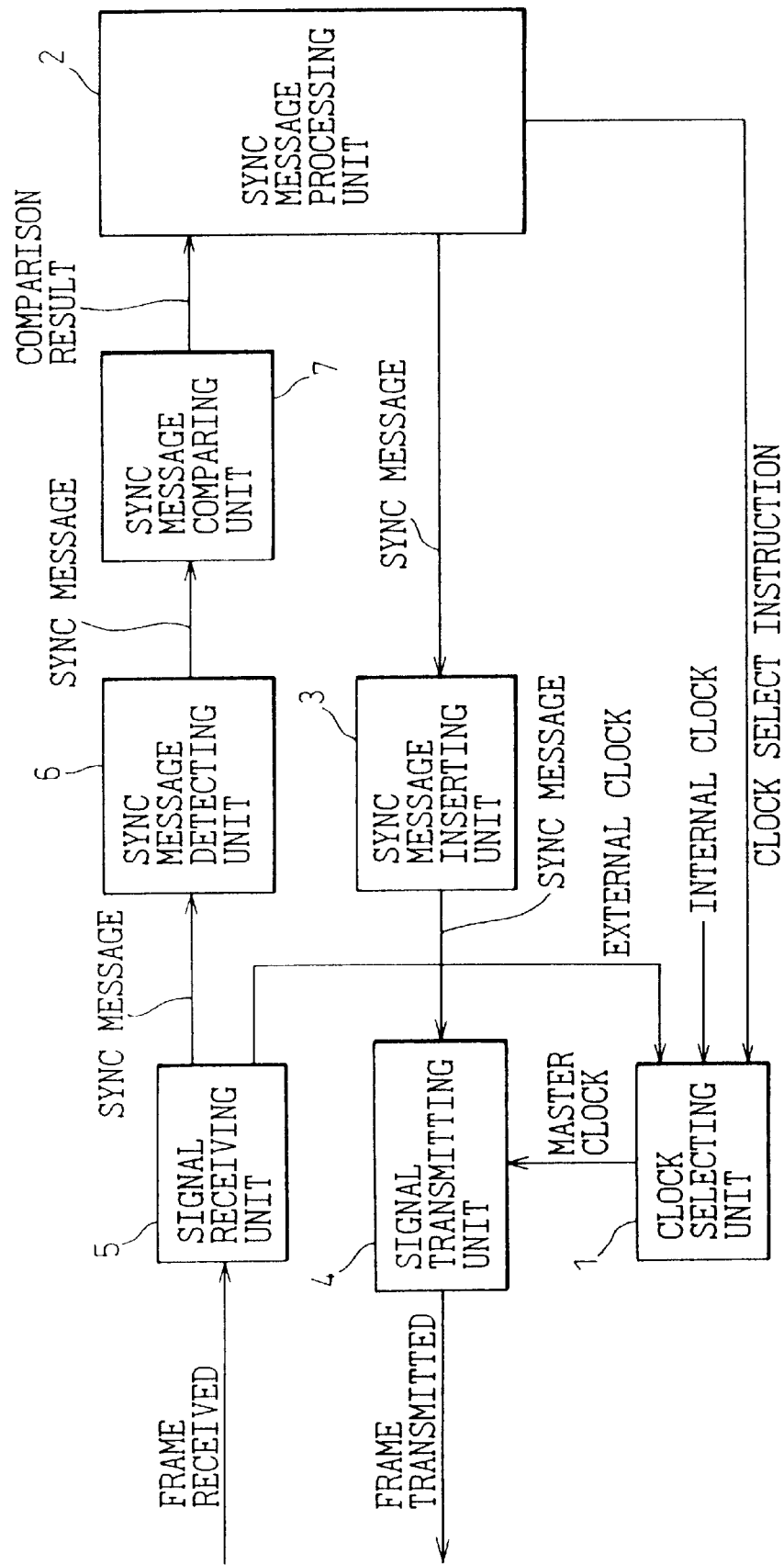
FIG. 2 shows the principle of a synchronization message transmitting apparatus according to aspect 2 of the present invention.

FIG. 2 shows the principle of a synchronization message transmitting apparatus according to the aspect 2 of the present invention. Units that form the apparatus will be explained. A signal receiving unit 5 receives a frame from another party. A synchronization message detecting unit 6 detects a synchronization message in the received frame. A synchronization message processing unit 2 determines a master clock among available clocks according to clock determination information and provides a synchronization message that specifies the quality level of the master clock. A clock selecting unit 1 selects the master clock among the available clocks. A synchronization message inserting unit 3 inserts the synchronization message from the processing unit 2 in a frame to be transmitted. A signal transmitting unit 4 transmits the frame to an opposite party according to the master clock. A synchronization message comparing unit 7 compares a clock quality level written in the received synchronization message with the quality level of an internal clock and provides a comparison result to any one of the units 2, 3, and 4. If the comparison result indicates that the clock quality level written in the received synchronization message is lower than the internal clock quality level, the unit that has received the comparison result inserts, in the synchronization message of a frame to be transmitted, information indicating that the frame must not be used for providing a master clock.

If the processing unit 2 receives the comparison result indicating that the clock quality level written in the received synchronization message is lower than the internal clock quality level, the processing unit 2 inserts abnormality information in a synchronization message and transfers the message to the inserting unit 3. The inserting unit 3 inserts the message in a frame to be transmitted and transfers the frame to the transmitting unit 4. The transmitting unit 4 transmits the frame to the opposite party.

If the inserting unit 3 receives the comparison result indicating that the clock quality level written in the received synchronization message is lower than the internal clock quality level, the inserting unit 3 inserts abnormality information in a synchronization message transferred from the processing unit 2 without regard to the contents of the message, puts the message in a frame to be transmitted, and transfers the frame to the transmitting unit 4. The transmitting unit 4 transmits the frame to the opposite party.

If the transmitting unit 4 receives the comparison result indicating that the clock quality level written in the received synchronization message is lower than the internal clock quality level, the transmitting unit 4 forcibly inserts abnormality information in the synchronization message of a frame transferred from the inserting unit 3 without regard to the contents of the message and transmits the frame to the opposite party.

The opposite party that receives the frame with the synchronization message of abnormality information will never use the frame for preparing a master clock.

(3) Aspect 3

Figure 3:
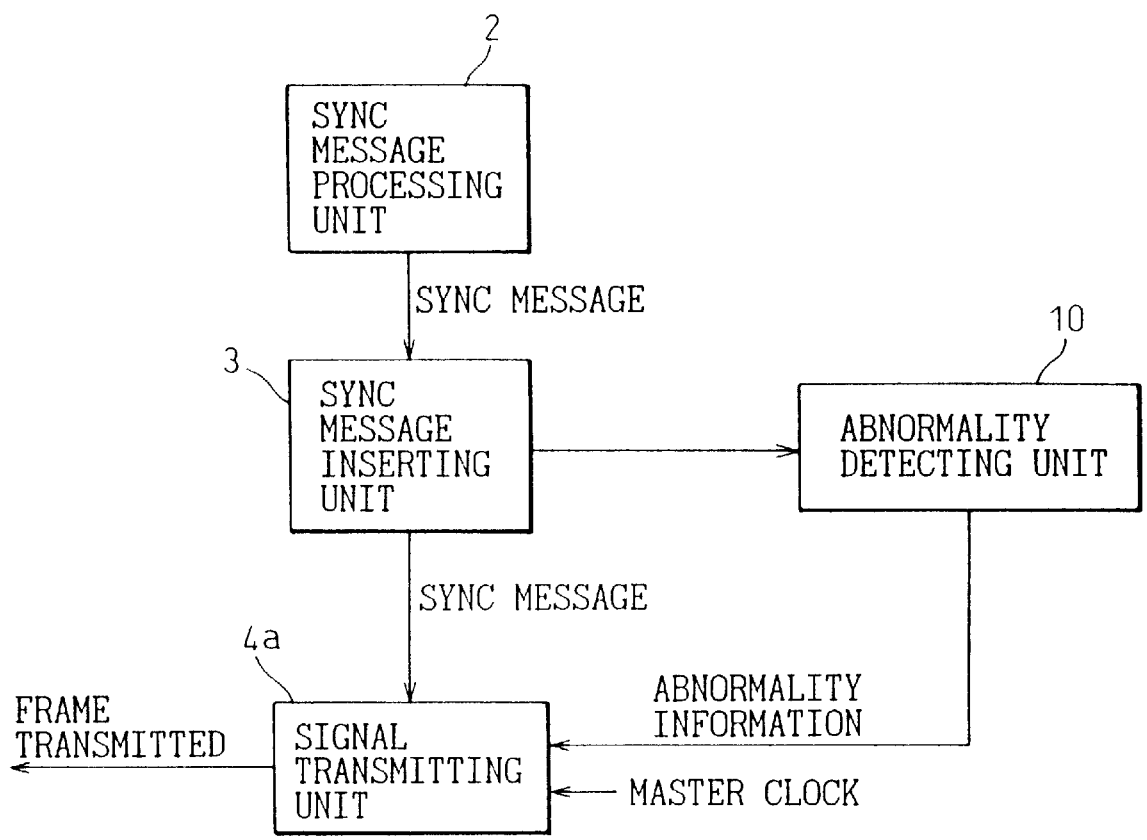
FIG. 3 shows the principle of a synchronization message transmitting apparatus according to aspect 3 of the present invention.

FIG. 3 shows the principle of a synchronization message transmitting apparatus according to the aspect 3 of the present invention. Units that form the apparatus will be explained. A synchronization message processing unit 2 provides a synchronization message that specifies the quality level of a master clock. A synchronization message inserting unit 3 inserts the synchronization message in a frame to be transmitted. A signal transmitting unit 4 transmits the frame to an opposite party according to the master clock. An abnormality detecting unit 10 detects an abnormality, if any, in the inserting unit 3 and provides abnormality information to the transmitting unit 4.

Upon receiving the abnormality information from the inserting unit 3, the transmitting unit 4 forcibly inserts, in the synchronization message transferred from the inserting unit 3, information indicating that the frame must not be used for providing a master clock and transmits the frame to the opposite party.

The opposite party that receives the frame with the synchronization message of abnormality information will never use the frame for preparing a master clock.

(4) Aspect 4

Figure 4:
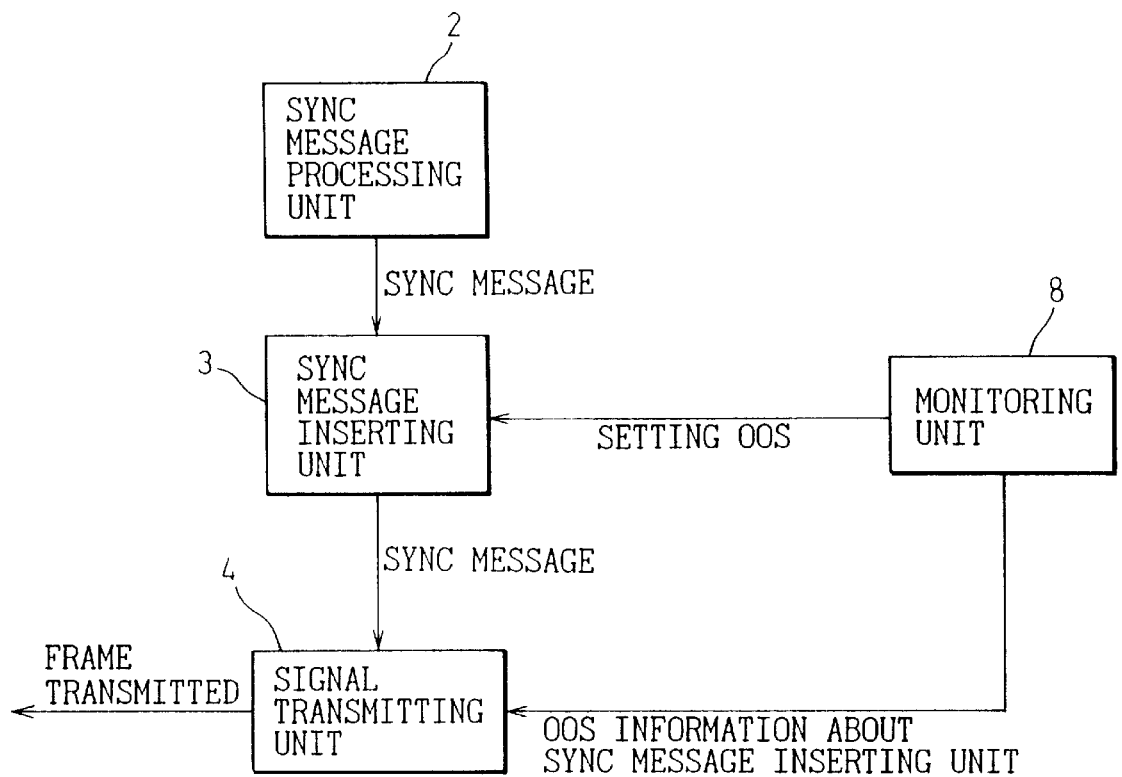
FIG. 4 shows the principle of a synchronization message transmitting apparatus according to aspect 4 of the present invention.

FIG. 4 shows the principle of a synchronization message transmitting apparatus according to the aspect 4 of the present invention. Units that form the apparatus will be explained. A monitoring unit 8 monitors and controls the apparatus. A synchronization message processing unit 2 provides a synchronization message that specifies the quality level of a master clock. A synchronization message inserting unit 3 inserts the synchronization message in a frame to be transmitted. A signal transmitting unit 4 transmits the frame to an opposite party according to the master clock. The monitoring unit 8 provides the inserting unit 3 with, for example, an out-of-service (OOS) signal to put the inserting unit 3 in a pseudo unequipped state, and provides the transmitting unit 4 with unequipped information indicating that the inserting unit 3 is in the pseudo unequipped state. Upon receiving the unequipped information, the transmitting unit 4 forcibly inserts, in the synchronization message of the frame transferred from the inserting unit 3, information indicating that the frame must not be used for providing a master clock.

Namely, the aspect 4 differs from the aspect 3 in that the monitoring unit 8 provides the inserting unit 3 with the pseudo unequipped state setting signal, and the transmitting unit 4 with the information indicating that the inserting unit 3 is unequipped.

The monitoring unit 8 is capable of setting the inserting unit 3 to the pseudo unequipped state. In this case, the monitoring unit 8 provides the transmitting unit 4 with information indicating that the inserting unit 3 is in the pseudo unequipped state.

Upon receiving the information, the transmitting unit 4 forcibly inserts, in the synchronization message of the frame transferred from the inserting unit 3, abnormality information and transmits the frame to the opposite party.

The opposite party that receives the frame with the synchronization message of abnormality information will never use the frame for preparing a master clock.

(5) Aspect 5

Figure 5:
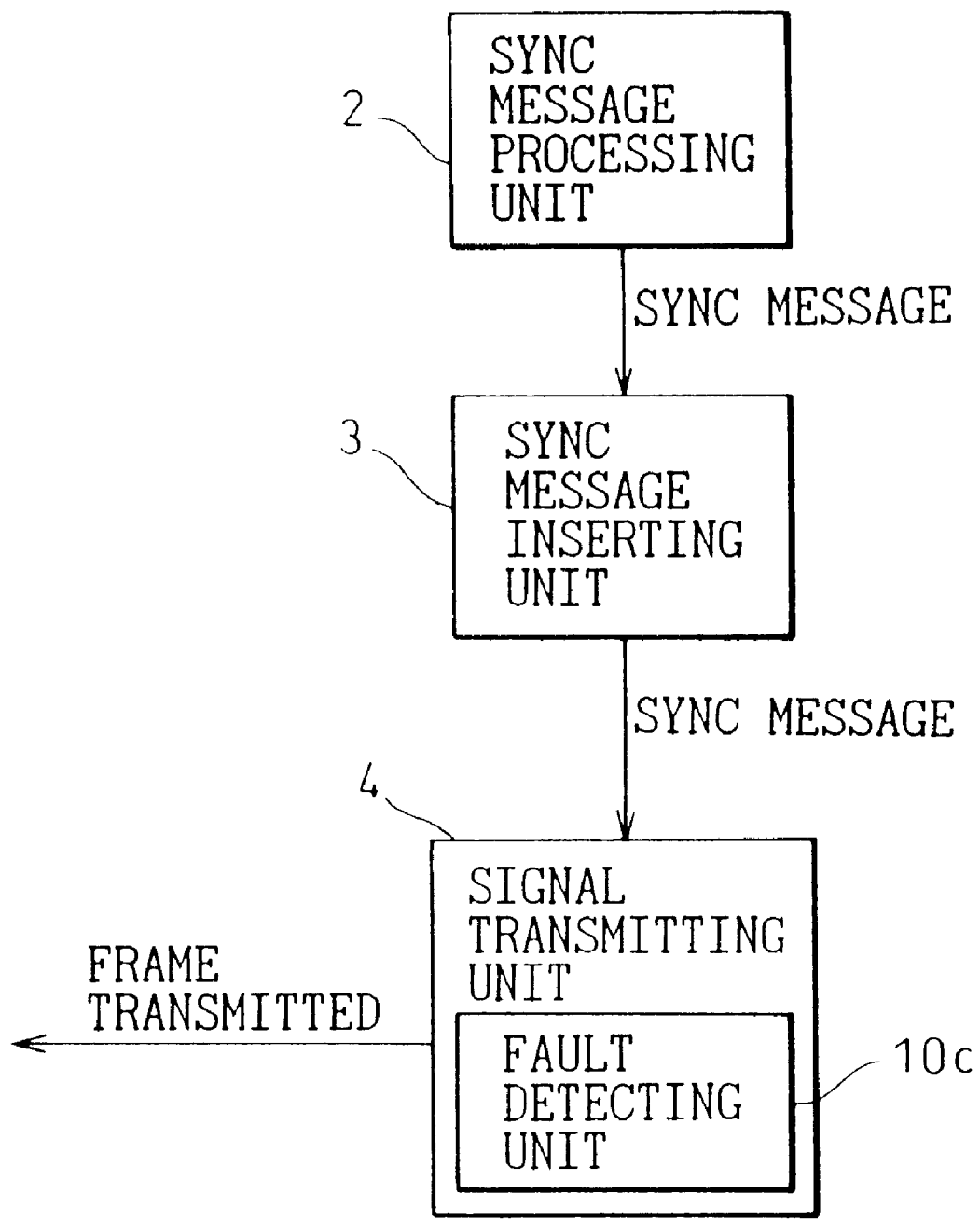
FIG. 5 shows the principle of a synchronization message transmitting apparatus according to aspect 5 of the present invention.

FIG. 5 shows the principle of a synchronization message transmitting apparatus according to the aspect 5 of the present invention. Units that form the apparatus will be explained. A synchronization message processing unit 2 provides a synchronization message that specifies the quality level of a master clock. A synchronization message inserting unit 3 inserts the synchronization message in a frame to be transmitted. A signal transmitting unit 4 transmits the frame to an opposite party according to the master clock. An abnormality detecting unit 10c detects an abnormality, if any, in the transmitting unit 4, which then inserts, in the synchronization message of the frame transferred from the inserting unit 3, information indicating that the frame must not be used for providing a master clock.

The aspect 5 differs from the aspect 3 in that the detecting unit 10c detects an abnormality in the transmitting unit 4.

If the detecting unit 10c sends abnormality information to the transmitting unit 4, the transmitting unit 4 forcibly inserts the abnormality information in the synchronization message of the frame transferred from the inserting unit 3 without regard to the contents of the message and transmits the frame to the opposite party.

The opposite party that receives the frame with the synchronization message of abnormality information will never use the frame for preparing a master clock.

(6) Aspect 6

Figure 6:
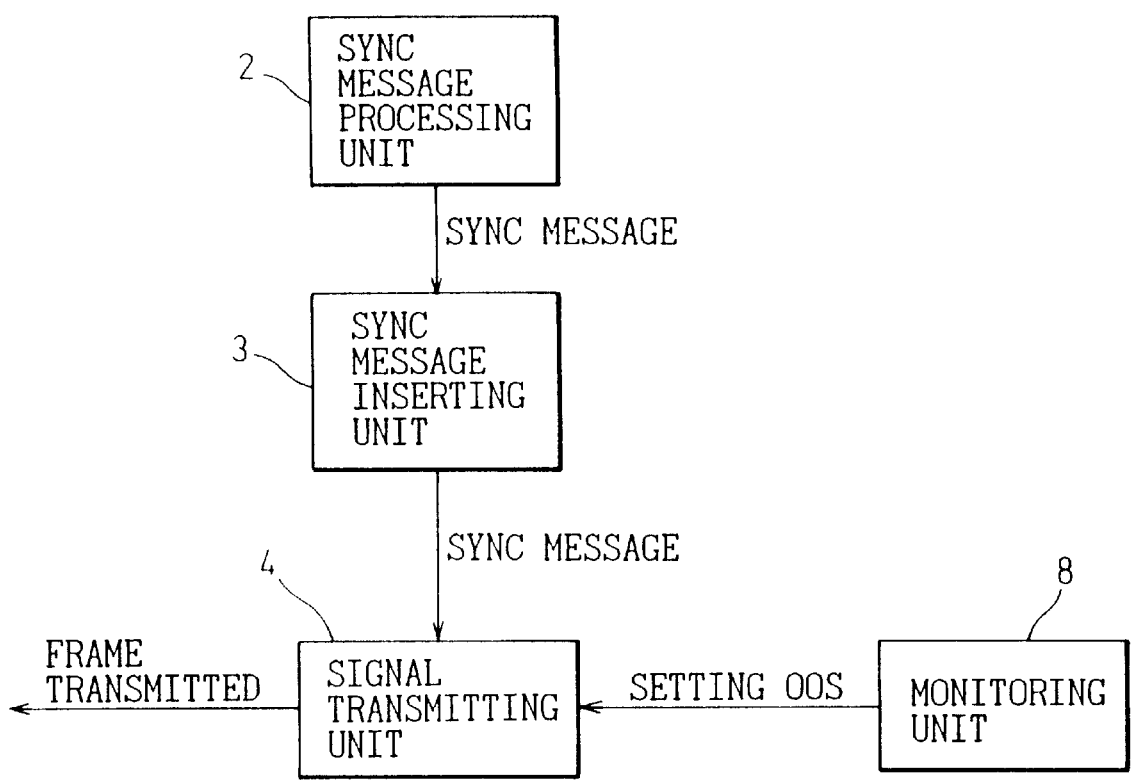
FIG. 6 shows the principle of a synchronization message transmitting apparatus according to aspect 6 of the present invention.

FIG. 6 shows the principle of a synchronization message transmitting apparatus according to the aspect 6 of the present invention. Units that form the apparatus will be explained. A monitoring unit 8 monitors and controls the apparatus. A synchronization message processing unit 2 provides a synchronization message that specifies the quality level of a master clock. A synchronization message inserting unit 3 inserts the synchronization message in a frame to be transmitted. A signal transmitting unit 4 transmits the frame to an opposite party according to the master clock. The monitoring unit 8 provides the transmitting unit 4 with a signal to put the transmitting unit 4 in a pseudo unequipped state, and the transmitting unit 4 inserts, in the synchronization message of the frame transferred from the inserting unit 3, information indicating that the frame must not be used for providing a master clock.

The aspect 6 differs from the aspect 4 in that the monitoring unit 8 provides a pseudo unequipped state setting signal to the transmitting unit 4.

When the monitoring unit 8 puts the transmitting unit 4 in a pseudo unequipped state, the transmitting unit 4 forcibly inserts, in the synchronization message of the frame transferred from the inserting unit 3, abnormality information without regard to the contents of the message and transmits the frame to the opposite party.

The opposite party that receives the frame with the synchronization message of abnormality information will never use the frame for preparing a master clock.

(7) Aspect 7

The aspect 7 of the present invention lets the detecting unit 10 of FIG. 1 detect an unequipped state of the selecting unit 1. Upon detecting the unequipped state, the detecting unit 10 provides abnormality information that is used to inform an opposite party that a frame to be transmitted must not be used for providing a master clock.

(8) Aspect 8

The aspect 8 of the present invention lets the detecting unit 10 of FIG. 1 detect an erroneously equipped state of the selecting unit 1. Upon detecting the erroneously equipped state, the detecting unit 10 provides abnormality information that is used to inform an opposite party that a frame to be transmitted must not be used for providing a master clock.

(9) Aspect 9

The aspect 9 of the present invention lets the detecting unit 10 of FIG. 1 detect a fault in the selecting unit 1. Upon detecting the fault, the detecting unit 10 provides abnormality information that is used to inform an opposite party that a frame to be transmitted must not be used for providing a master clock.

(10) Aspect 10

The aspect 10 of the present invention lets the detecting unit 10 of FIG. 3 detect an unequipped state of the inserting unit 3. Upon detecting the unequipped state, the detecting unit 10 provides abnormality information that is used to inform an opposite party that a frame to be transmitted must not be used for providing a master clock.

(11) Aspect 11

The aspect 11 of the present invention lets the detecting unit 10 of FIG. 3 detect an erroneously equipped state of the inserting unit 3. Upon detecting the erroneously equipped state, the detecting unit 10 provides abnormality information that is used to inform an opposite party that a frame to be transmitted must not be used for providing a master clock.

(12) Aspect 12

The aspect 12 of the present invention lets the detecting unit 10 of FIG. 3 detect a fault in the inserting unit 3. Upon detecting the fault, the detecting unit 10 provides abnormality information that is used to inform an opposite party that a frame to be transmitted must not be used for providing a master clock.

(13) Aspect 13

The aspect 13 of the present invention lets the detecting unit 10c of FIG. 5 detect an erroneously equipped state of the transmitting unit 4. Upon detecting the erroneously equipped state, the detecting unit 10c provides abnormality information that is used to inform an opposite party that a frame to be transmitted must not be used for providing a master clock.

(14) Aspect 14

The aspect 14 of the present invention lets the detecting unit 10c of FIG. 5 detect a fault in the transmitting unit 4. Upon detecting the fault, the detecting unit 10c provides abnormality information that is used to inform an opposite party that a frame to be transmitted must not be used for providing a master clock.

(15) Aspect 15

The aspect 15 of the present invention employs the clock selecting unit 1 of any one of the aspects 1, 2, 7, 8, and 9 as a system clock selecting unit for selecting a system clock serving as a master clock of SONET, or as a reference clock selecting unit for selecting a DS1 reference clock. If an abnormality is detected in the system clock or reference clock selecting unit, the aspect 15 informs an opposite party that a frame to be transmitted must not be used for providing a master clock.

(16) Aspect 16

The aspect 16 of the present invention employs the synchronization message inserting unit 3 of any one of the aspects 1 to 15, to insert a synchronization message in an overhead of a SONET frame, or in data link bits of ESF-DS1 frames. If an abnormality is detected, the aspect 16 informs an opposite party that the SONET frame or ESF-DS1 frames to be transmitted must not be used for providing a master clock.

Embodiment 1 of aspect 1

Figure 7:
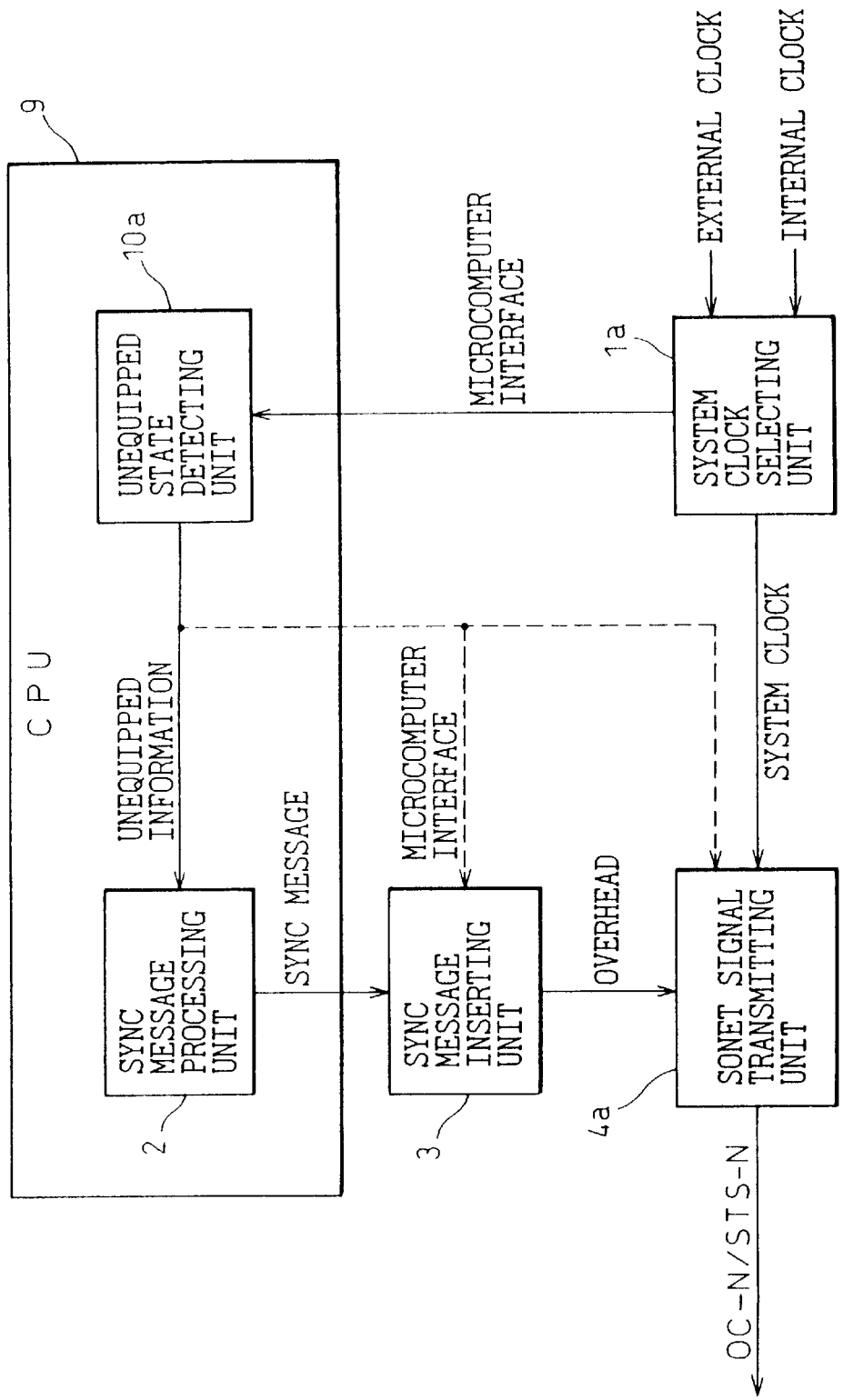
FIG. 7 shows a synchronization message transmitting apparatus according to embodiment 1 of the aspect 1.

FIG. 7 shows a synchronization message transmitting apparatus according to embodiment 1 of the aspect 1. The apparatus employs a system clock selecting unit 1a for selecting a system clock serving as a SONET master clock, a SONET signal transmitting unit 4a, and an unequipped state detecting unit 10a. The other parts of FIG. 7 are the same as those of FIG. 1.

The detecting unit 10a provides unequipped information to any one of the units 2, 3, and 4a. The transmitting unit 4a receives the system clock from the selecting unit 1a and an overhead from the inserting unit 3 and transmits an OC-N/STS-N SONET frame to an opposite party.

The processing unit 2 and detecting unit 10a are incorporated in a CPU 9. The units 1a, 3, and 4a communicate data with the detecting unit 10a through a microcomputer interface.

If the processing unit 2 receives unequipped information from the detecting unit 10a, the processing unit 2 prepares a synchronization message of DUS (do not use as a master clock: FIG. 53) and transfers the message to the inserting unit 3. The inserting unit 3 inserts "1111" representing DUS in the bits 5 to 8 of the byte S1 of a SONET overhead and transfers the overhead to the transmitting unit 4a. The transmitting unit 4a transmits an OC-N/STS-N frame with the overhead to the opposite party so that the opposite party will never use the frame for preparing a master clock.

If the inserting unit 3 receives unequipped information from the detecting unit 10a, the inserting unit 3 inserts "1111" representing DUS in the bits 5 to 8 of the byte S1 of a SONET overhead without regard to the contents of the synchronization message transferred from the processing unit 2, and transfers the overhead to the transmitting unit 4a. The transmitting unit 4a transmits an OC-N/STS-N frame with the overhead to the opposite party so that the opposite party will never use the frame for preparing a master clock.

If the transmitting unit 4a receives unequipped information from the detecting unit 10a, the transmitting unit 4a forcibly puts "1111" representing DUS in the bits 5 to 8 of the byte S1 of the overhead of an OC-NISTS-N frame without regard to the contents of the overhead transferred from the inserting unit 3 and transmits the frame to the opposite party so that the opposite party will never use the frame for preparing a master clock.

The detecting unit 10a reads a code related to the selecting unit la on the microcomputer interface, and if the code is equal to one specific to the selecting unit 1a, the detecting unit 10a detects a normally equipped state of the selecting unit 1a. If the code is 00h or FFh that is not equal to the specific code, the detecting unit 10a detects an unequipped state of the selecting unit 1a.

Embodiment 2 of aspect 1

Figure 8:
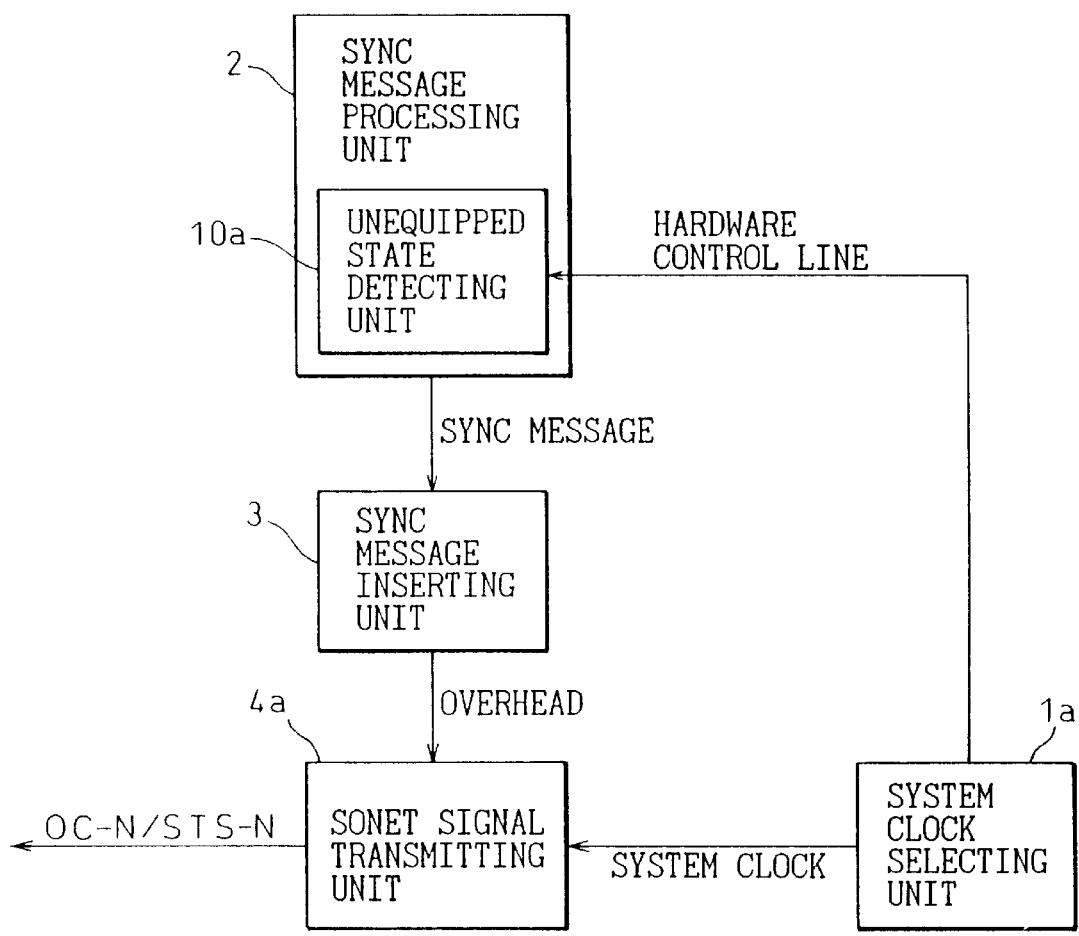
FIG. 8 shows a synchronization message transmitting apparatus according to embodiment 2 of the aspect 1.

FIG. 8 shows a synchronization message transmitting apparatus according to embodiment 2 of the aspect 1. The embodiment 2 differs from the embodiment 1 in that it employs a synchronization message processing unit 2 that includes an unequipped state detecting unit 10a and is outside a CPU.

If the detecting unit 10a detects an unequipped state of a system clock selecting unit 1a, the processing unit 2 transfers a synchronization message of DUS (do not use as a master clock) to a synchronization message inserting unit 3. The inserting unit 3 inserts "1111" representing DUS in the bits 5 to 8 of the byte S1 of a SONET overhead and transfers the overhead to a SONET signal transmitting unit 4a. The transmitting unit 4a transmits an OC-N/STS-N frame with the overhead to an opposite party so that the opposite party will never use the frame for preparing a master clock.

The detecting unit 10a checks a signal on a hardware control line. If the signal is at low level, the detecting unit 10a determines that the selecting unit 1a is equipped, and if the signal is at high level, that the selecting unit 1a is unequipped.

Embodiment 3 of aspect 1

Figure 9:
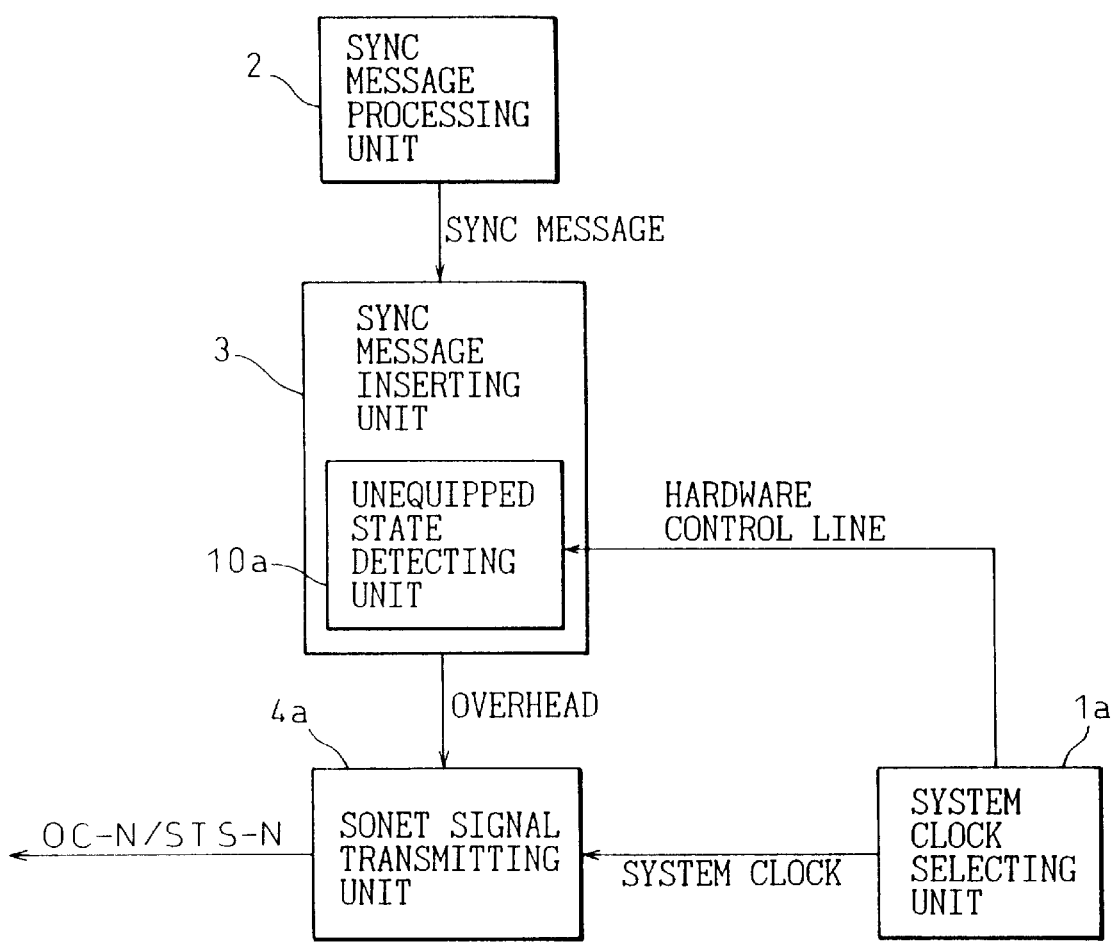
FIG. 9 shows a synchronization message transmitting apparatus according to embodiment 3 of the aspect 1.

FIG. 9 shows a synchronization message transmitting apparatus according to embodiment 3 of the aspect 1. The embodiment 3 differs from the embodiment 2 of FIG. 8 in that it employs a synchronization message inserting unit 3 that includes an unequipped state detecting unit 10a.

If the detecting unit 10a detects an unequipped state of a system clock selecting unit 1a, the inserting unit 3 inserts "1111" representing DUS (do not use as a master clock) in the bits 5 to 8 of the byte S1 of a SONET overhead without regard to the contents of a synchronization message transferred from a synchronization message processing unit 2, and transfers the overhead to a SONET signal transmitting unit 4a. The transmitting unit 4a transmits an OC-N/STS-N frame with the overhead to an opposite party so that the opposite party will never use the frame for preparing a master clock.

Embodiment 4 of aspect 1

Figure 10:
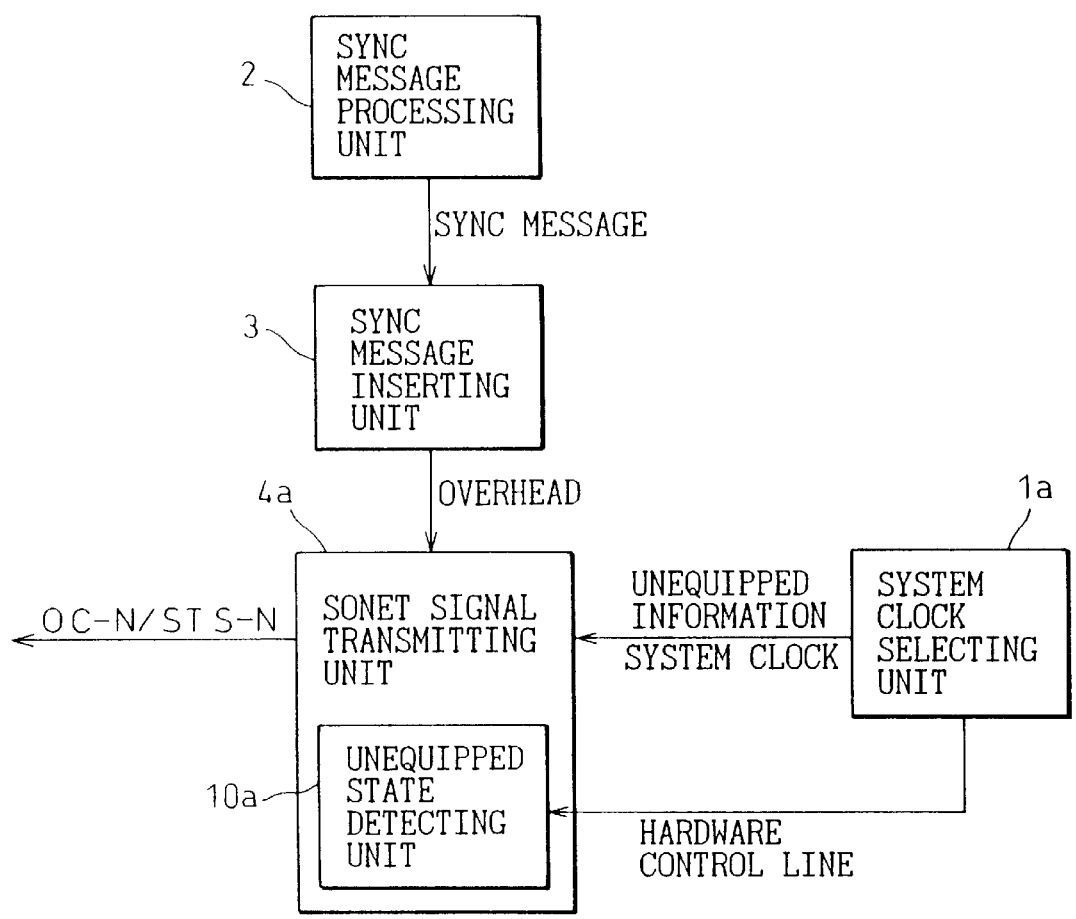
FIG. 10 shows a synchronization message transmitting apparatus according to embodiment 4 of the aspect 1.

FIG. 10 shows a synchronization message transmitting apparatus according to embodiment 4 of the aspect 1. The embodiment 4 differs from the embodiment 2 of FIG. 8 in that it employs a SONET signal transmitting unit 4a that includes an unequipped state detecting unit 10a.

If the detecting unit 10a detects an unequipped state of a system clock selecting unit 1a, the transmitting unit 4a inserts "1111" representing DUS (do not use as a master clock) in the bits 5 to 8 of the byte S1 of the overhead of an OC-N/STS-N frame without regard to the contents of an overhead transferred from a synchronization message inserting unit 3, and transmits the frame to an opposite party so that the opposite party will never use the frame for preparing a master clock.

Embodiment 5 of aspect 1

Figure 11:
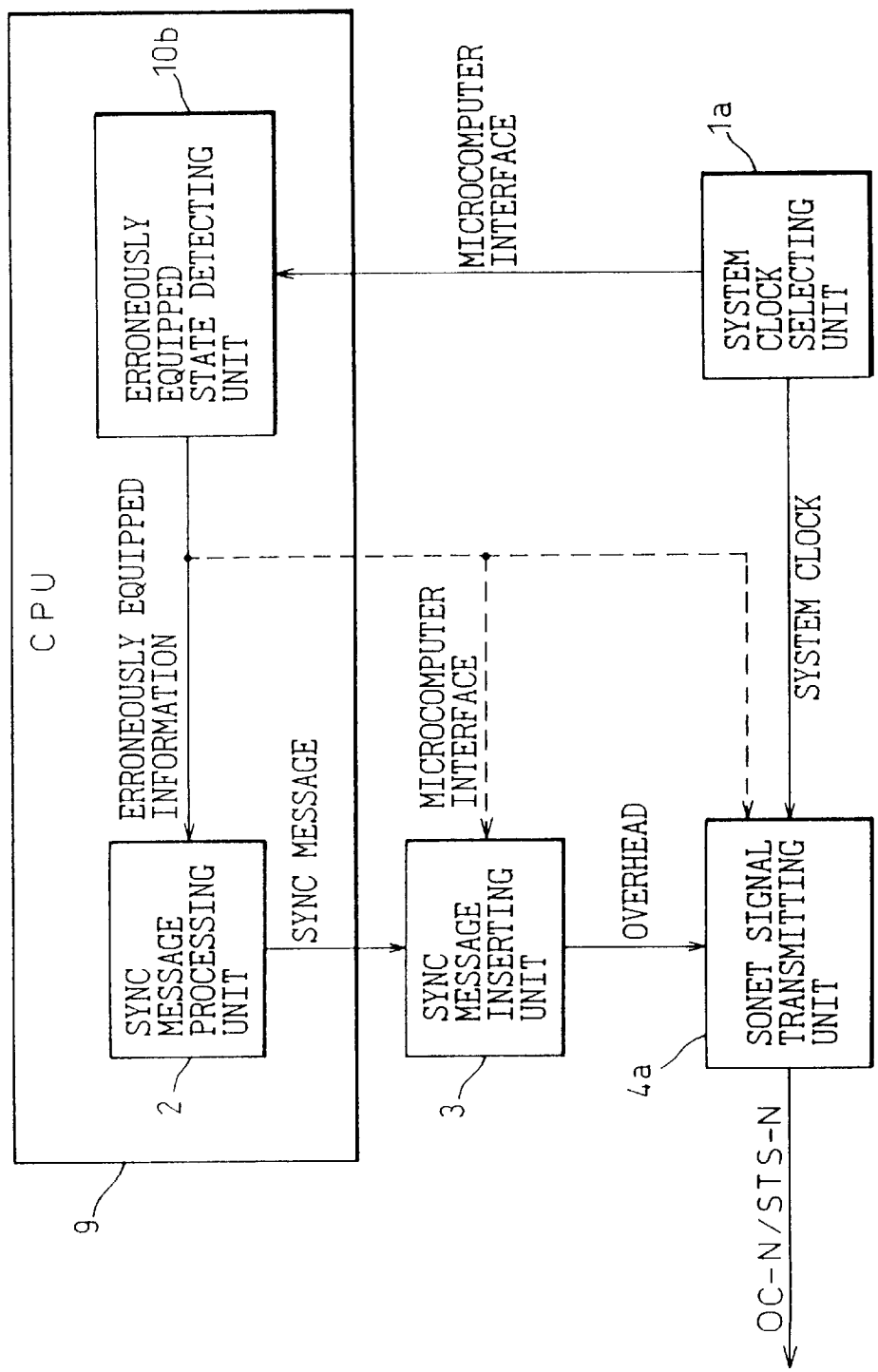
FIG. 11 shows a synchronization message transmitting apparatus according to embodiment 5 of the aspect 1.

FIG. 11 shows a synchronization message transmitting apparatus according to embodiment 5 of the aspect 1. The embodiment 5 differs from the embodiment 1 of FIG. 7 in that it employs an erroneously equipped state detecting unit 10b that provides erroneously equipped information to a synchronization message processing unit 2, a synchronization message inserting unit 3, or a SONET signal transmitting unit 4a.

The operation of the embodiment 5 is the same as that of the embodiment 1 if replacing the detecting unit 10a with the detecting unit 10b and the unequipped information with the erroneously equipped information. If the erroneously equipped information is sent to any one of the units 2, 3, and 4a, the transmitting unit 4a transmits an OC-N/STS-N frame with an overhead containing a synchronization message of DUS (do not use as a master clock) to an opposite party so that the opposite party will not employ the frame for generating a master clock.

The detecting unit 10b reads a code related to the selecting unit 1a on a microcomputer interface, and if the code is equal to one specific to the selecting unit 1a, the detecting unit 10b detects a normally equipped state of the selecting unit 1a. If the code is not equal to the specific code nor the code representing an unequipped state, the detecting unit 10b detects an erroneously equipped state of the selecting unit 1a.

Embodiment 6 of aspect 1

Figure 12:
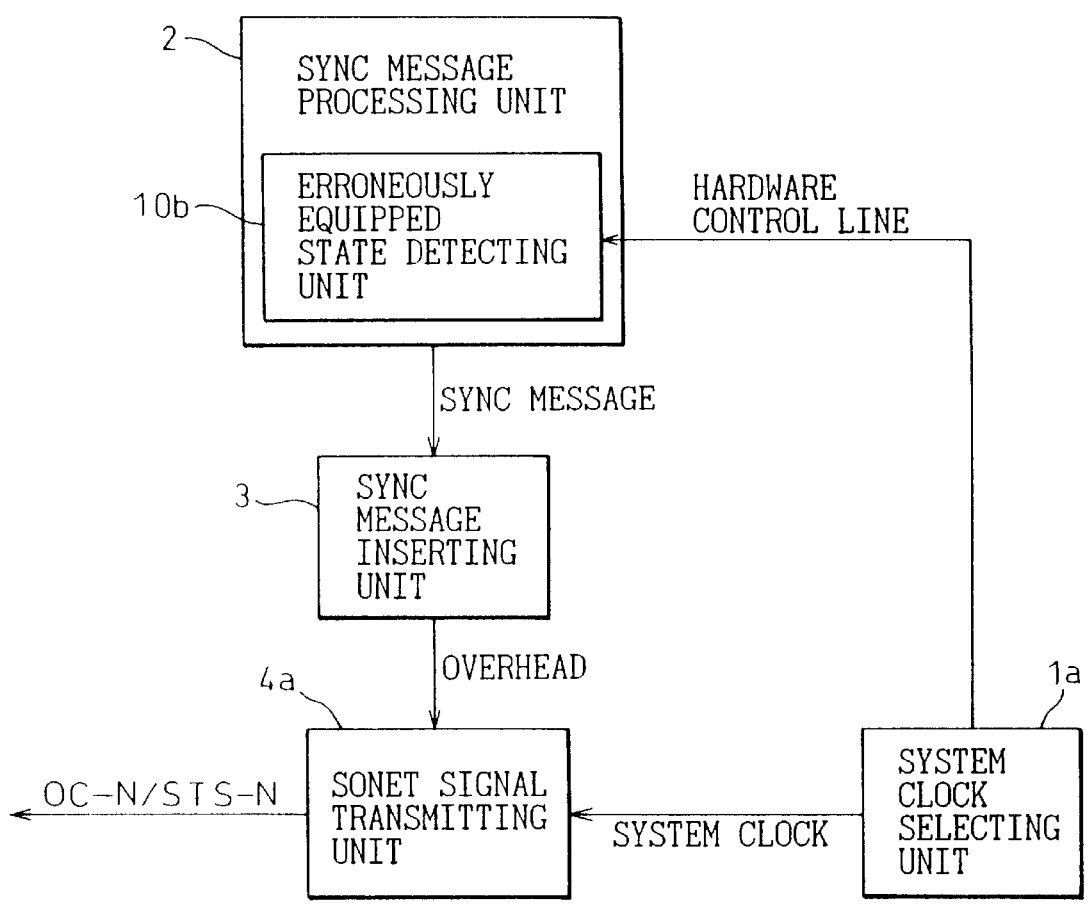
FIG. 12 shows a synchronization message transmitting apparatus according to embodiment 6 of the aspect 1.

FIG. 12 shows a synchronization message transmitting apparatus according to embodiment 6 of the aspect 1. The embodiment 6 differs from the embodiment 2 of FIG. 8 in that it employs an erroneously equipped state detecting unit 10b.

The operation of the embodiment 6 is the same as that of the embodiment 2 if the detecting unit 10a is replaced with the detecting unit 10b and the unequipped information is replaced with erroneously equipped information.

Embodiment 7 of aspect 1

Figure 13:
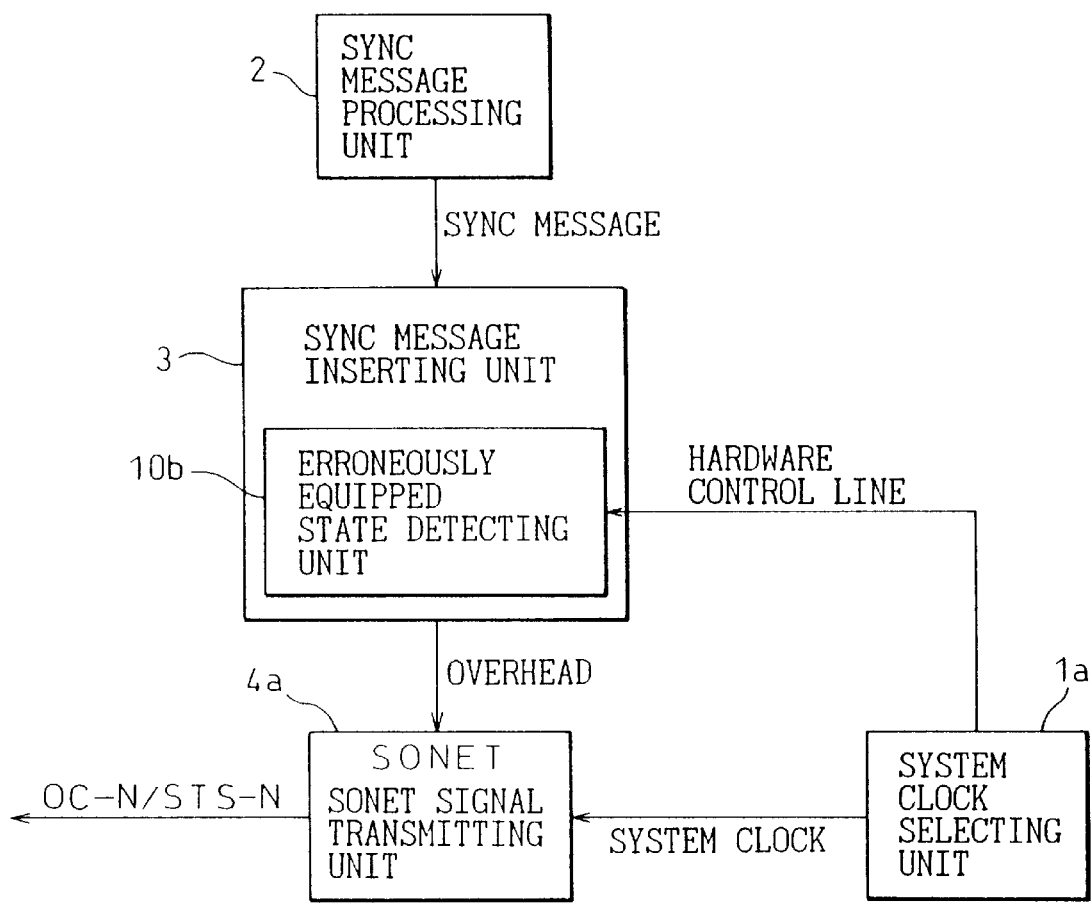
FIG. 13 shows a synchronization message transmitting apparatus according to embodiment 7 of the aspect 1.

FIG. 13 shows a synchronization message transmitting apparatus according to embodiment 7 of the aspect 1. The embodiment 7 differs from the embodiment 3 of FIG. 9 in that it employs an erroneously equipped state detecting unit 10b.

The operation of the embodiment 7 is the same as that of the embodiment 3 if the detecting unit 10a is replaced with the detecting unit 10b and the unequipped information is replaced with erroneously equipped information.

Embodiment 8 of aspect 1

Figure 14:
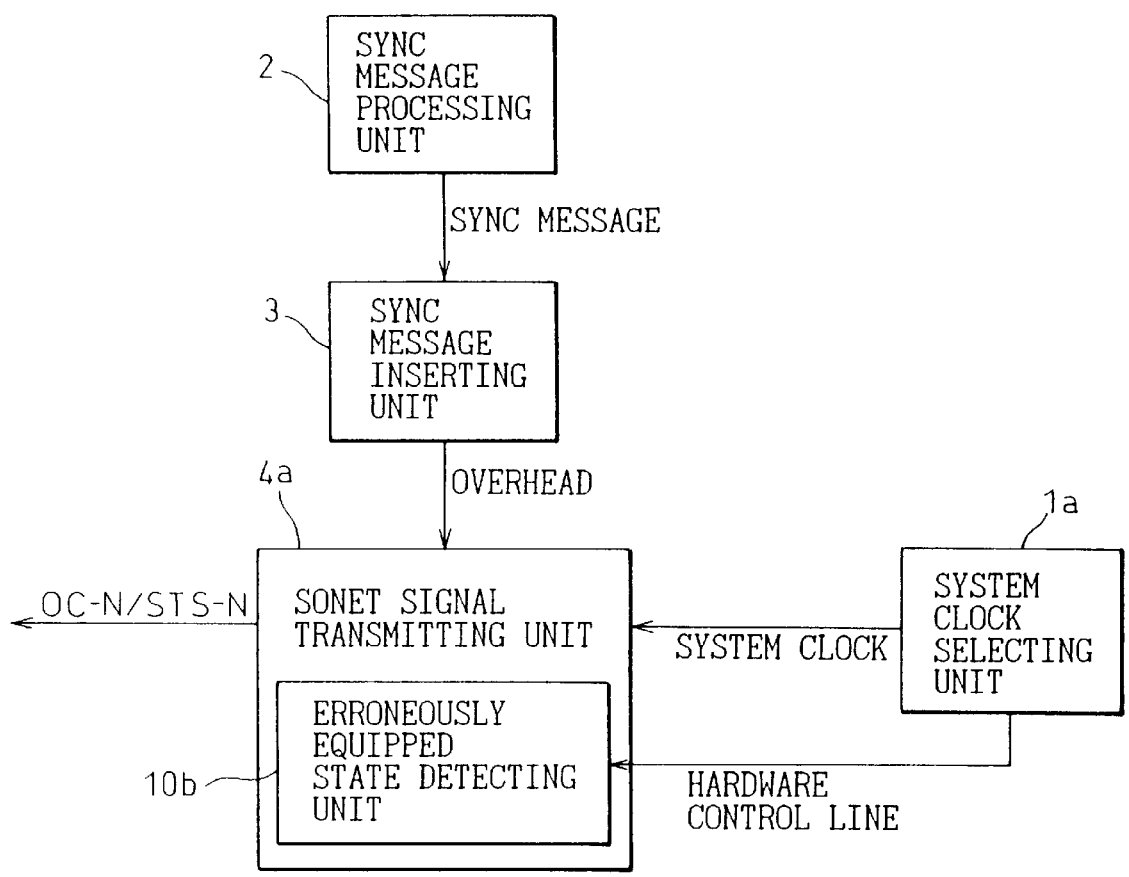
FIG. 14 shows a synchronization message transmitting apparatus according to embodiment 8 of the aspect 1.

FIG. 14 shows a synchronization message transmitting apparatus according to embodiment 8 of the aspect 1. The embodiment 8 differs from the embodiment 4 of FIG. 10 in that it employs an erroneously equipped state detecting unit 10b.

The operation of the embodiment 8 is the same as that of the embodiment 4 if the detecting unit 10a is replaced with the detecting unit 10b and the unequipped information is replaced with erroneously equipped information.

If the detecting unit 10b of any one of the embodiments 6 to 8 of FIGS. 12 to 14 detects an erroneously equipped state of a system clock selecting unit 1a, a SONET signal transmitting unit 4a transmits an OC-N/STS-N frame with an overhead containing a synchronization message of DUS (do not use as a master clock) to an opposite party so that the opposite party will not employ the frame for providing a master clock.

Embodiment 9 of aspect 1

Figure 15:
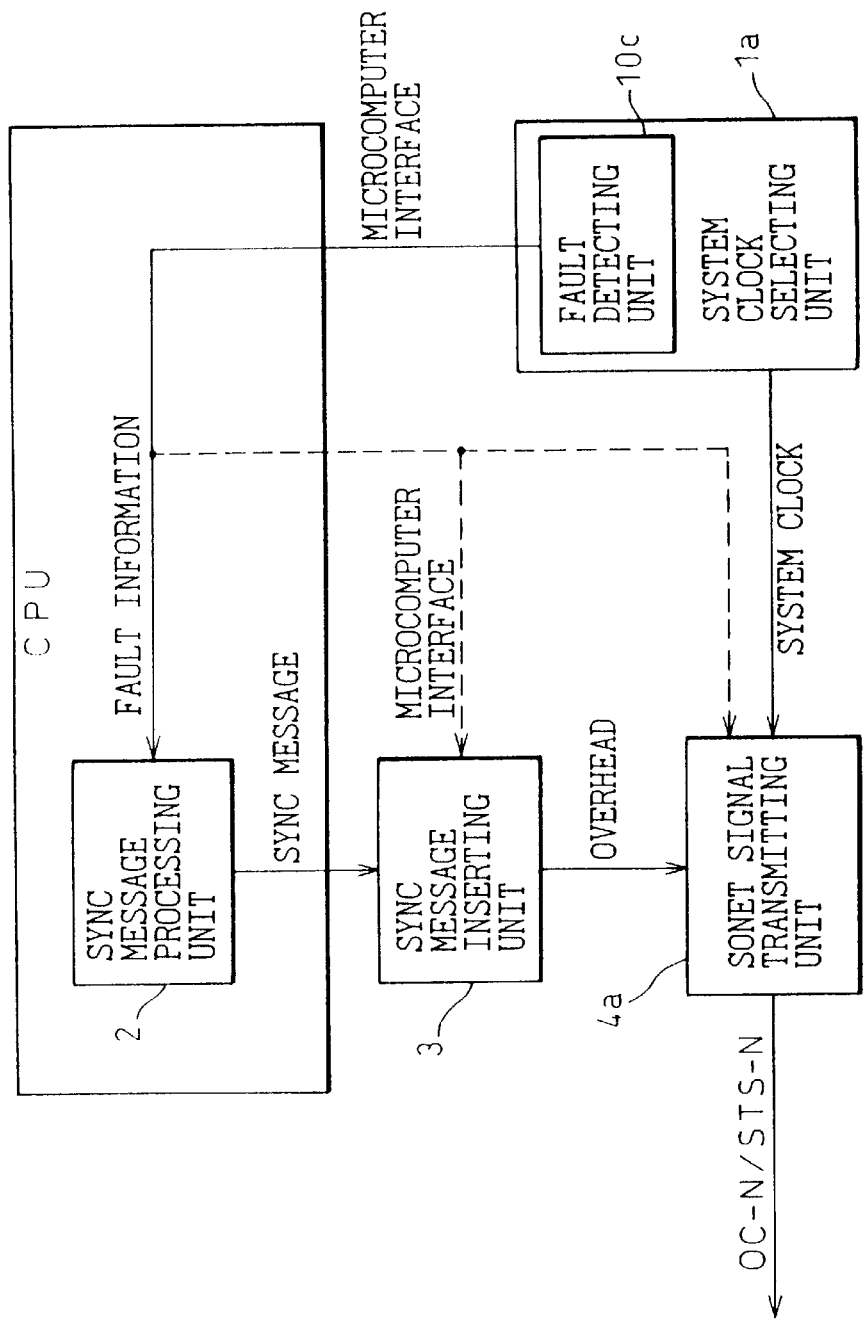
FIG. 15 shows a synchronization message transmitting apparatus according to embodiment 9 of the aspect 1.

FIG. 15 shows a synchronization message transmitting apparatus according to embodiment 9 of the aspect 1. The embodiment 9 differs from the embodiment 1 of FIG. 7 in that it employs a fault detecting unit 10c incorporated in a system clock selecting unit 1a.

The detecting unit 10c provides fault information to a synchronization message processing unit 2, a synchronization message inserting unit 3, or a SONET signal transmitting unit 4a.

The operation of the embodiment 9 is the same as that of the embodiment 1 if the detecting unit 10a is replaced with the detecting unit 10c and the unequipped information is replaced with the fault information.

If the fault information is sent to any one of the units 2, 3, and 4a, the transmitting unit 4a transmits an OC-N/STS-N frame with an overhead containing a synchronization message of DUS (do not use as a master clock) to an opposite party so that the opposite party will not employ the frame for preparing a master clock.

Embodiment 10 of aspect 1

Figure 16:
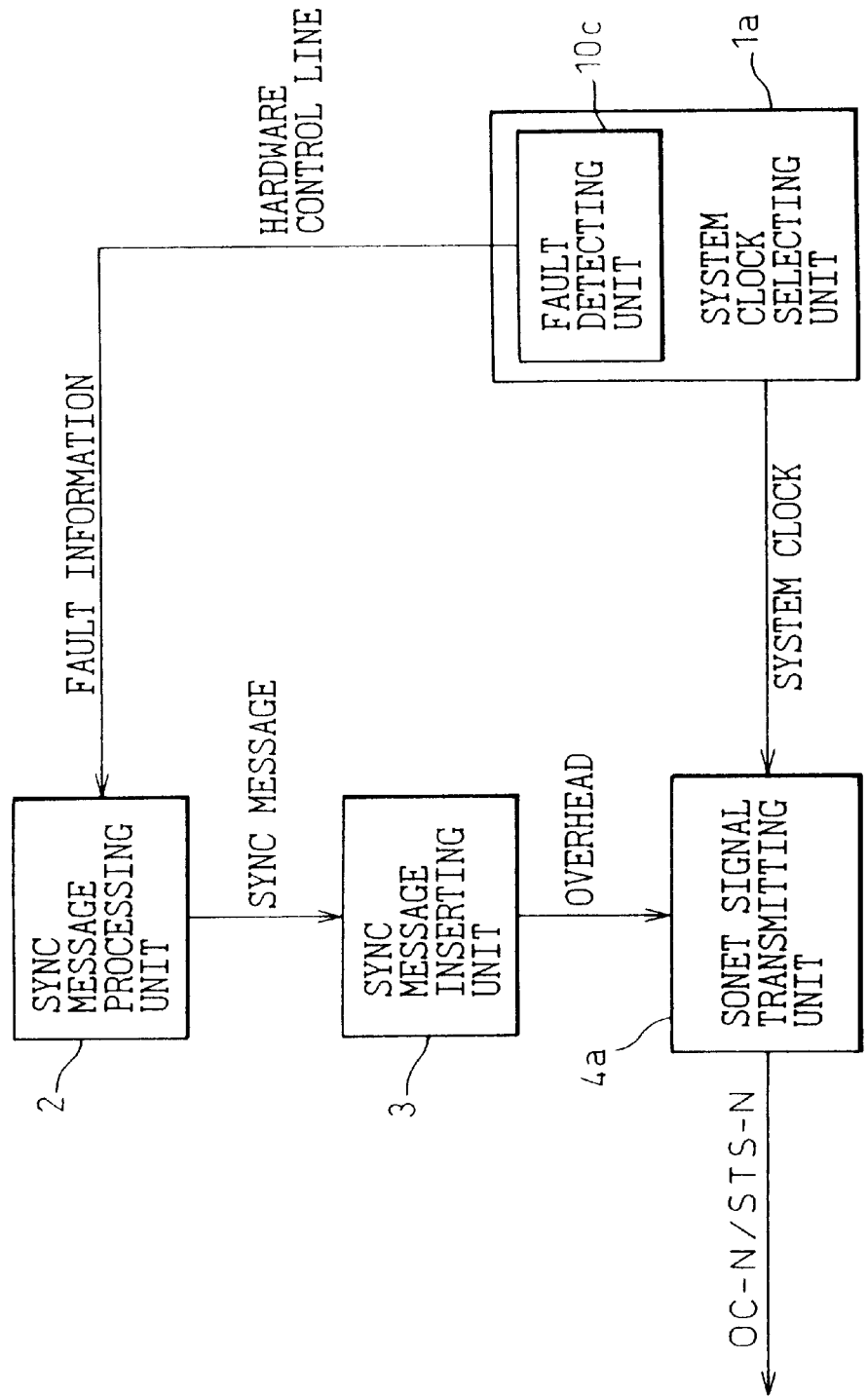
FIG. 16 shows a synchronization message transmitting apparatus according to embodiment 10 of the aspect 1.

FIG. 16 shows a synchronization message transmitting apparatus according to embodiment 10 of the aspect 1. The embodiment 10 differs from the embodiment 9 of FIG. 15 in that it employs a synchronization message processing unit 2 that is not in a CPU and a fault detecting unit 10c that provides fault information only to the processing unit 2.

The operation of the embodiment 10 is the same as that of the embodiment 9 with the detecting unit 10c providing the processing unit 2 with fault information about a system clock selecting unit 1a.

While the embodiment 9 provides fault information to the processing unit 2 through a microcomputer interface, the embodiment 10 provides the fault information to the processing unit 2 through a hardware control line.

Embodiment 11 of aspect 1

Figure 17:
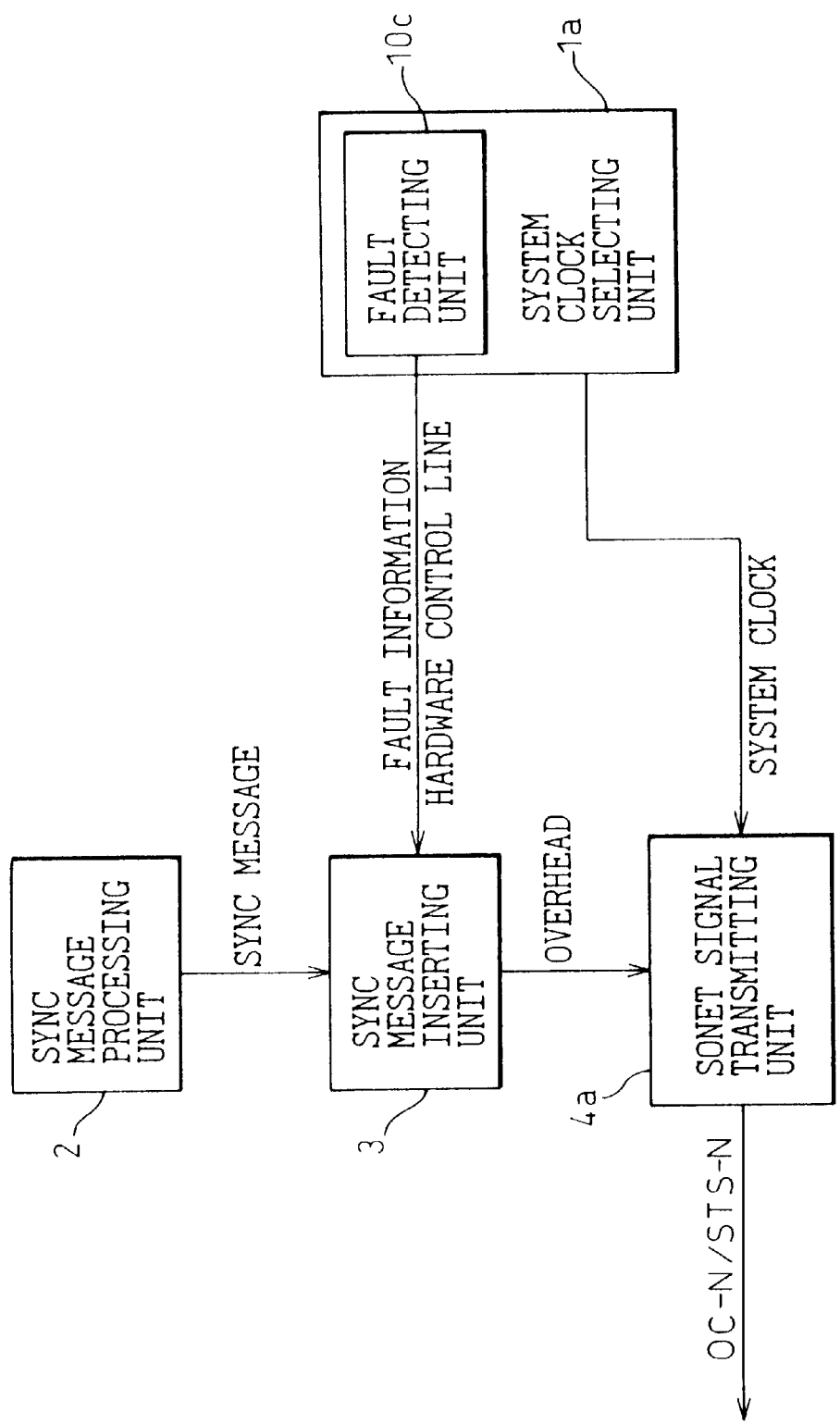
FIG. 17 shows a synchronization message transmitting apparatus according to embodiment 11 of the aspect 1.

FIG. 17 shows a synchronization message transmitting apparatus according to embodiment 11 of the aspect 1. The embodiment 11 differs from the embodiment 10 of FIG. 16 in that it employs a fault detecting unit 10c that provides fault information to a synchronization message inserting unit 3.

The operation of the embodiment 11 is the same as that of the embodiment 9 with the detecting unit 10c providing the inserting unit 3 with fault information about a system clock selecting unit 1a.

Embodiment 12 of aspect 1

Figure 18:
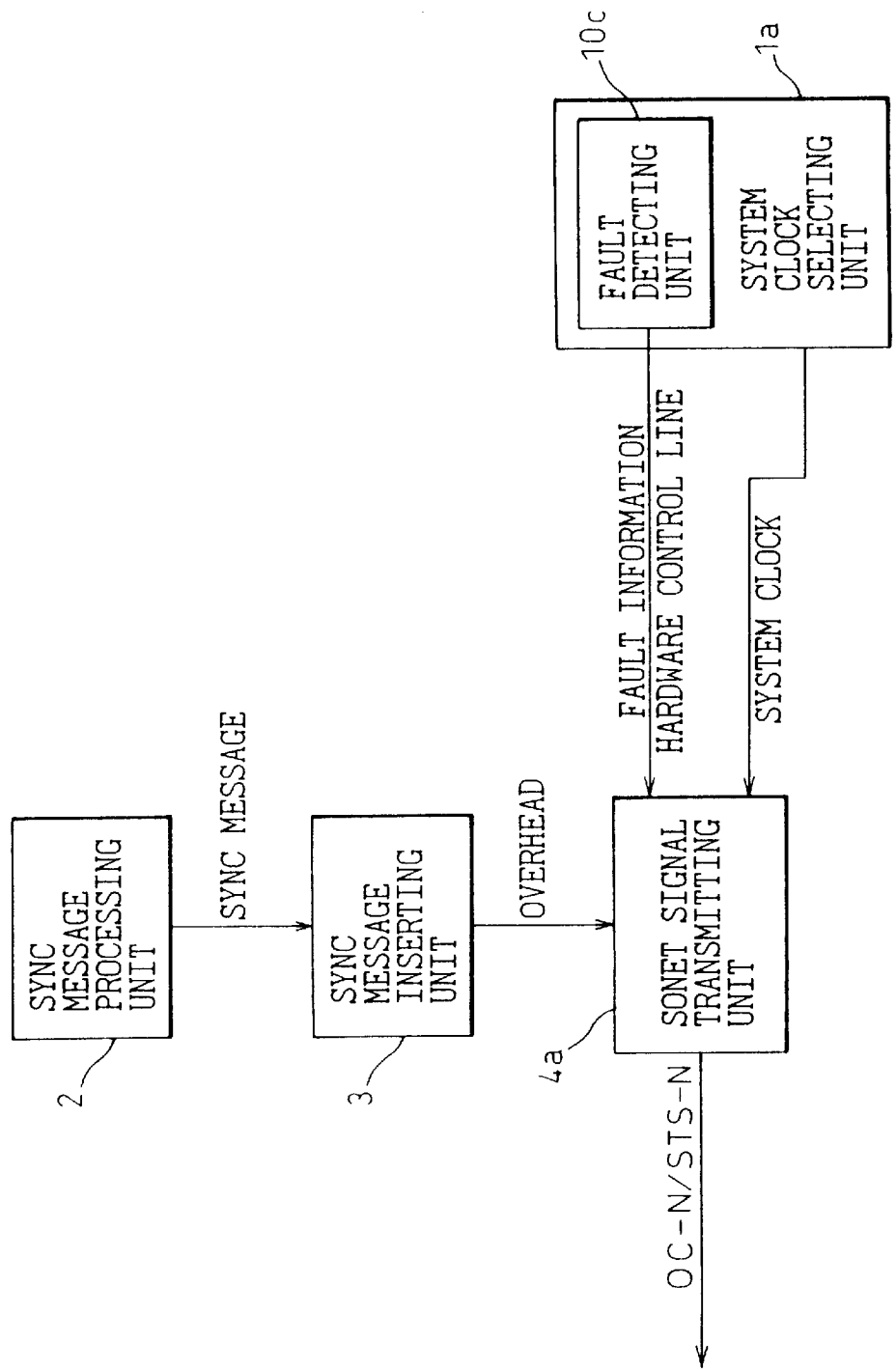
FIG. 18 shows a synchronization message transmitting apparatus according to embodiment 12 of the aspect 1.

FIG. 18 shows a synchronization message transmitting apparatus according to embodiment 12 of the aspect 1. The embodiment 12 differs from the embodiment 10 of FIG. 16 in that it employs a fault detecting unit 10c that provides fault information to a SONET signal transmitting unit 4a.

The operation of the embodiment 12 is the same as that of the embodiment 9 of FIG. 15 with the detecting unit 10c providing the transmitting unit 4a with fault information about a system clock selecting unit 1a.

If the detecting unit 10c of any one of the embodiment 10 to 12 of FIGS. 16 to 18 detects a fault in the system clock selecting unit 1a, the SONET signal transmitting unit 4a transmits an OC-N/STS-N frame with an overhead containing a synchronization message of DUS (do not use as a master clock) to an opposite party so that the opposite party will not employ the frame for preparing a master clock.

Embodiment 13 of aspect 1

Figure 19:
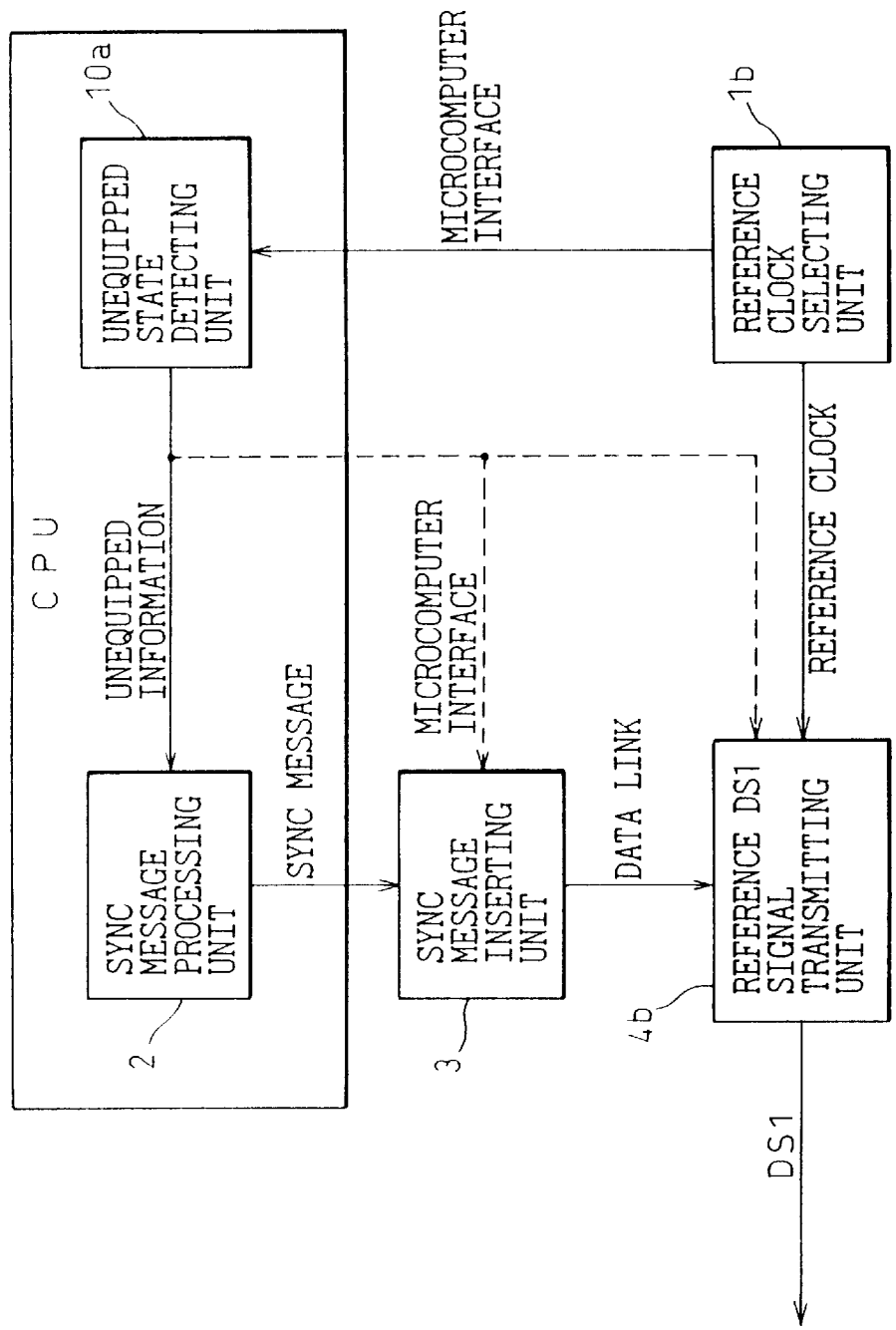
FIG. 19 shows a synchronization message transmitting apparatus according to embodiment 13 of the aspect 1.

FIG. 19 shows a synchronization message transmitting apparatus according to embodiment 13 of the aspect 1. The embodiment 13 differs from the embodiment 1 of FIG. 7 in that it employs a reference clock selecting unit 1b for selecting a reference clock serving as a master clock for ESF-DS1 frames, and a reference DS1 signal transmitting unit 4b.

The transmitting unit 4b receives ESF-DS1 data link bits from a synchronization message inserting unit 3 as well as a reference clock from the selecting unit 1b, and transmits ESF-DS1 frames to an opposite party.

If the processing unit 2 receives unequipped information about the selecting unit 1b from the detecting unit 10a, the processing unit 2 prepares a synchronization message of DUS (do not use as a master clock) indicating that a frame to be transmitted must not be used for providing a master clock and transfers the message to the inserting unit 3. The inserting unit 3 inserts a bit string of "0011000011111111" representing DUS in data link bits and transfers the data link bits to the transmitting unit 4b. The transmitting unit 4b transmits ESF-DS1 frames including the data link bits to an opposite party. The opposite party that receives the frames with the synchronization message of DUS will not use the received frames for preparing a master clock.

If the inserting unit 3 receives the unequipped information about the selecting unit 1b from the detecting unit 10a, the inserting unit 3 inserts a bit string of "0011000011111111" representing DUS in data link bits without regard to the contents of a synchronization message transferred from the processing unit 2 and transfers the data link bits to the transmitting unit 4b. The transmitting unit 4b transmits ESF-DS1 frames including the data link bits to the opposite party. The opposite party that receives the frames with the synchronization message of DUS will not use the received frames for preparing a master clock.

If the transmitting unit 4b receives the unequipped information about the selecting unit 1b from the detecting unit 10a, the transmitting unit 4b forcibly inserts a bit string of "0011000011111111" representing DUS in data link bits transferred from the inserting unit 3 and transmits ESF-DS1 frames containing the data link bits to the opposite party. The opposite party that receives the frames with the synchronization message of DUS will not use the received frames for preparing a master clock.

The detecting unit 10a detects an unequipped state of the selecting unit 1b in the same manner as the embodiment 1 detecting an unequipped state of the selecting unit 1a.

Embodiment 14 of aspect 1

Figure 20:
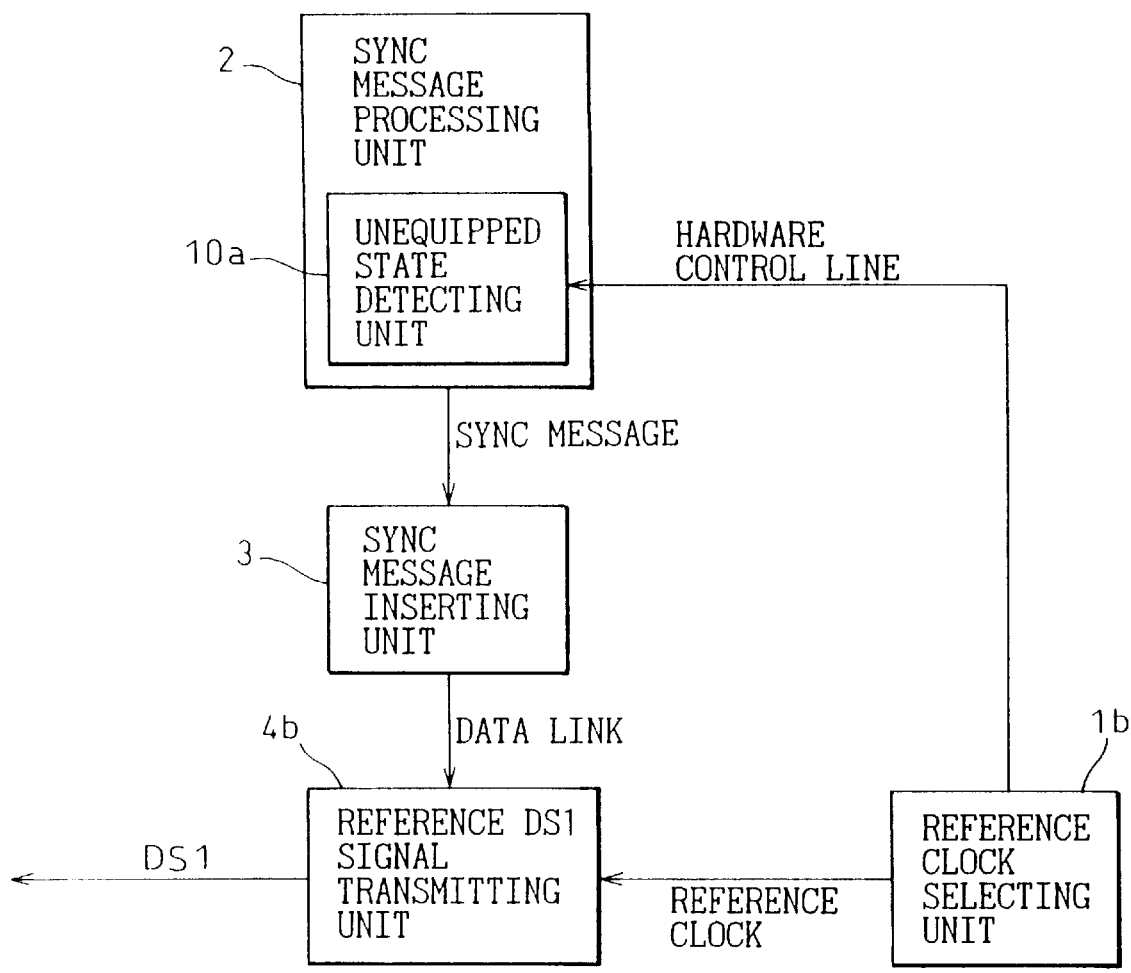
FIG. 20 shows a synchronization message transmitting apparatus according to embodiment 14 of the aspect 1.

FIG. 20 shows a synchronization message transmitting apparatus according to embodiment 14 of the aspect 1. The embodiment 14 differs from the embodiment 13 of FIG. 19 in that it employs an unequipped state detecting unit 10a incorporated in a synchronization message processing unit 2.

If the detecting unit 10a detects an unequipped state of a reference clock selecting unit 1b through a hardware control line, the processing unit 2 sends a synchronization message of DUS (do not use as a master clock) to a synchronization message inserting unit 3. Thereafter, the operations of the units 3 and 4b are the same as those of the embodiment 13 of FIG. 19.

An opposite party that receives ESF-DS1 frames with the synchronization message of DUS will not use the received frames for preparing a master clock.

Embodiment 15 of aspect 1

Figure 21:
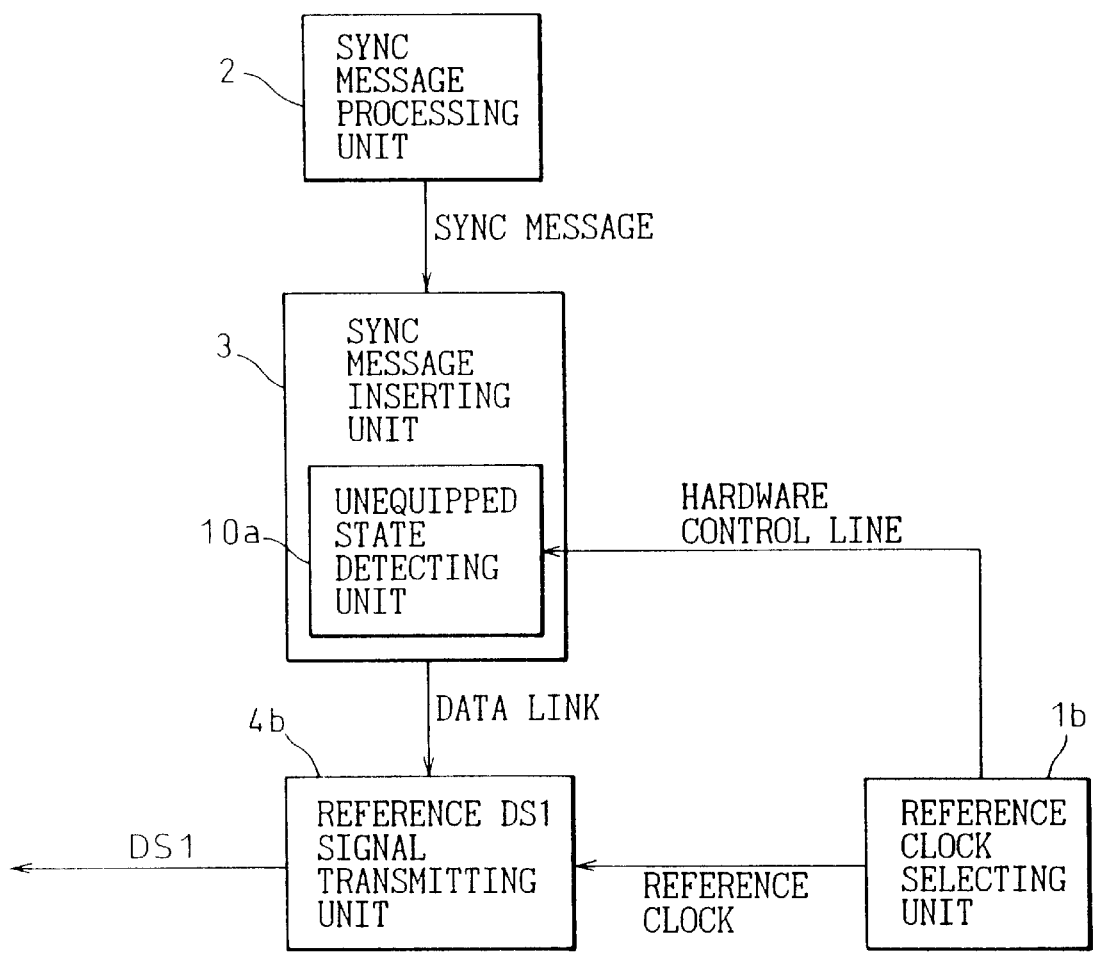
FIG. 21 shows a synchronization message transmitting apparatus according to embodiment 15 of the aspect 1.

FIG. 21 shows a synchronization message transmitting apparatus according to embodiment 15 of the aspect 1. The embodiment 15 differs from the embodiment 14 of FIG. 20 in that it employs an unequipped state detecting unit 10a incorporated in a synchronization message inserting unit 3.

If the detecting unit 10a detects an unequipped state of a reference clock selecting unit 1b, the inserting unit 3 inserts a bit string of "0011000011111111" representing DUS (do not use as a master clock) in data link bits without regard to the contents of a synchronization message transferred from a synchronization message processing unit 2 and transfers the data link bits to a reference DS1 signal transmitting unit 4b. The transmitting unit 4b transmits ESF-DS1 frames with the data link bits to an opposite party so that the opposite party will not use the frames for preparing a master clock.

Embodiment 16 of aspect 1

Figure 22:
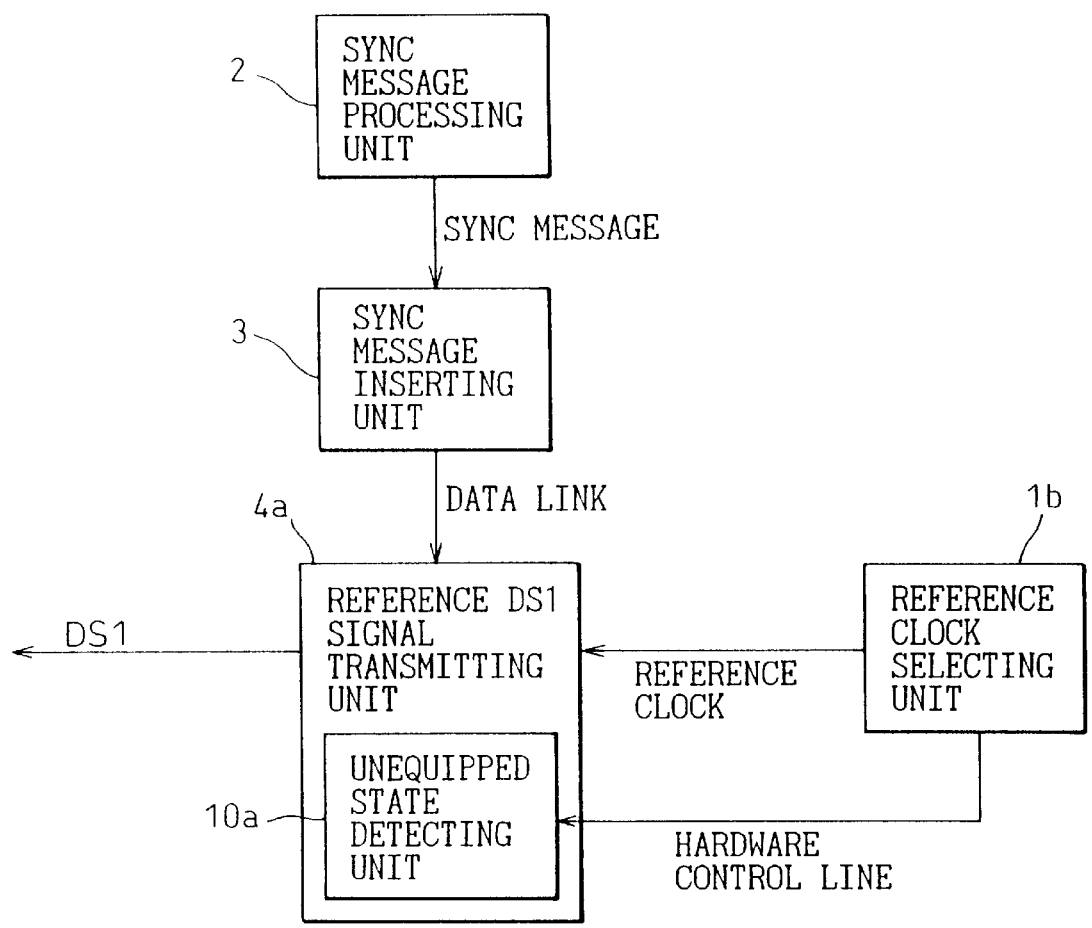
FIG. 22 shows a synchronization message transmitting apparatus according to embodiment 16 of the aspect 1.

FIG. 22 shows a synchronization message transmitting apparatus according to embodiment 16 of the aspect 1. The embodiment 16 differs from the embodiment 14 of FIG. 20 in that it employs an unequipped state detecting unit 10a incorporated in a reference DS1 signal transmitting unit 4b.

If the detecting unit 10a detects an unequipped state of a reference clock selecting unit 1b, the transmitting unit 4b forcibly inserts a bit string of "0011000011111111" representing DUS (do not use as a master clock) in data link bits without regard to data link bits transferred from a synchronization message inserting unit 3 and transmits ESF-DS1 frames with the data link bits to an opposite party so that the opposite party will not use the frames for preparing a master clock.

Embodiment 17 of aspect 1

Figure 23:
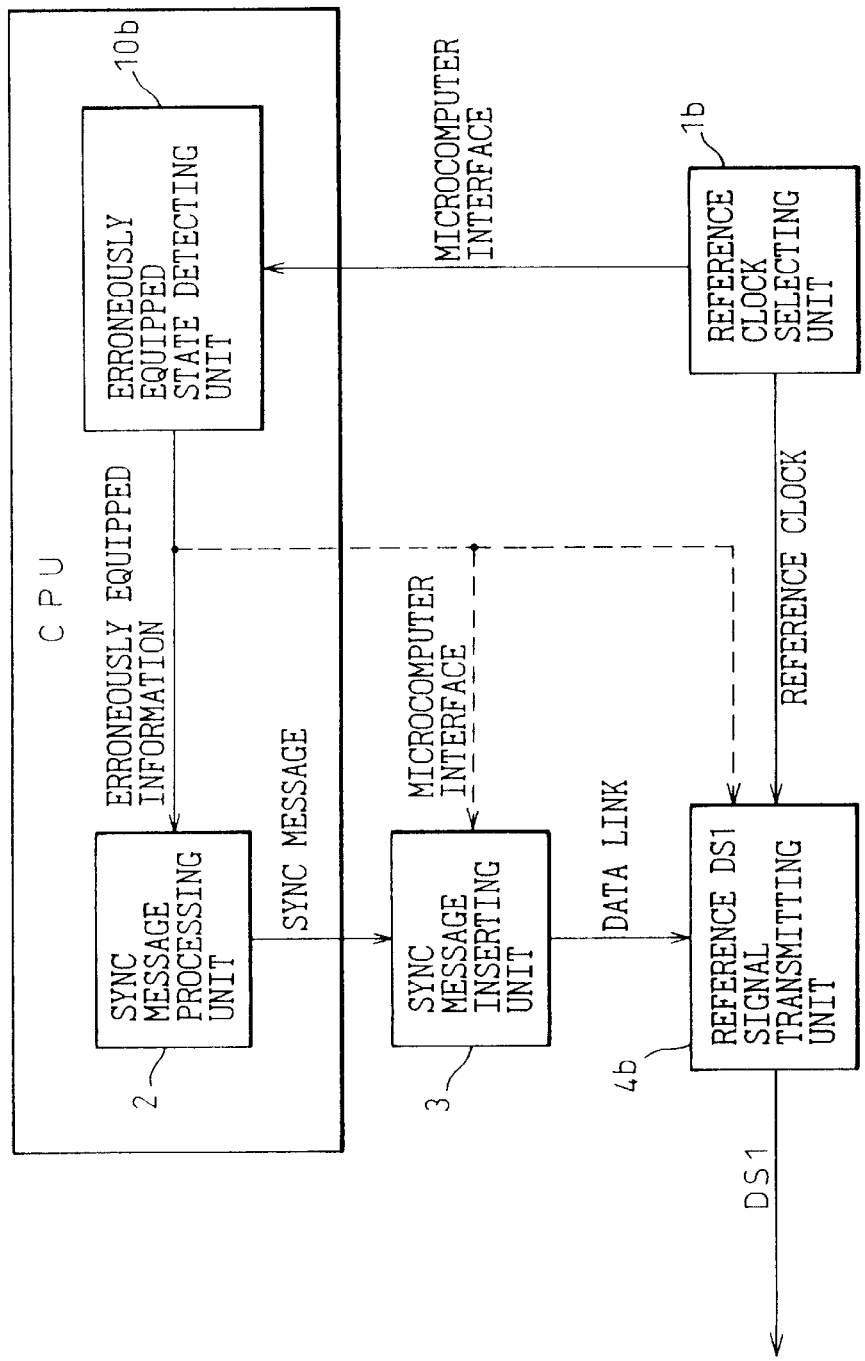
FIG. 23 shows a synchronization message transmitting apparatus according to embodiment 17 of the aspect 1.

FIG. 23 shows a synchronization message transmitting apparatus according to embodiment 17 of the aspect 1. The embodiment 17 differs from the embodiment 13 of FIG. 19 in that it employs an erroneously equipped state detecting unit 10b for detecting an erroneously equipped state of a reference clock selecting unit 1b.

The detecting unit 10b provides erroneously equipped information, if detected, to a synchronization message processing unit 2, a synchronization message inserting unit 3, or a reference DS1 signal transmitting unit 4b.

The operation of the embodiment 17 is the same as that of the embodiment 13 if the detecting unit 10a is replaced with the detecting unit 10b and the unequipped information is replaced with the erroneously equipped information. If the erroneously equipped information is given to any one of the units 2, 3, and 4b, the transmitting unit 4b transmits ESF-DS1 frames containing a synchronization message of DUS (do not use as a master clock) to an opposite party so that the opposite party will not use the frames for preparing a master clock.

The detecting unit 10b detects an erroneously equipped state of the selecting unit 1b in the same manner as the detecting unit 10b of the embodiment 5 of FIG. 11 detecting an erroneously equipped state of the selecting unit 1a.

Embodiments 18, 19, and 20 of aspect 1

Figure 24:
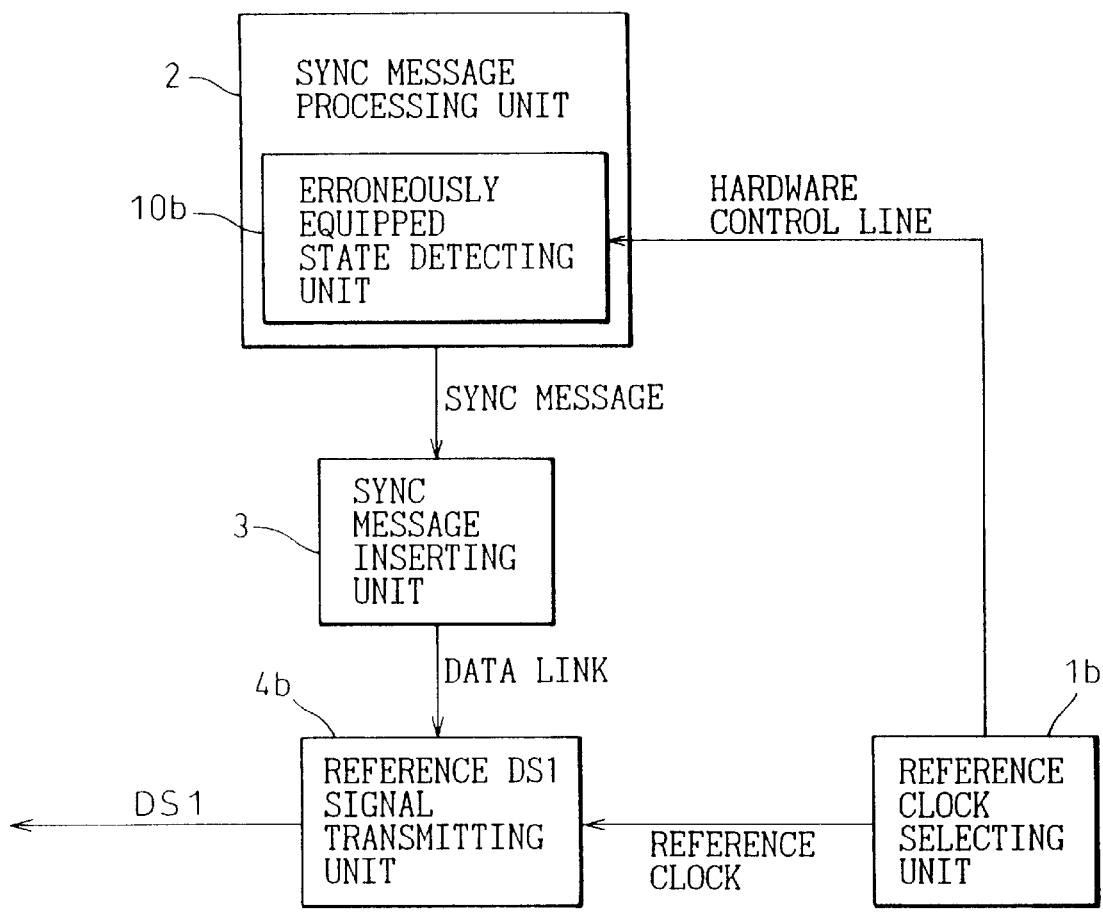
FIG. 24 shows a synchronization message transmitting apparatus according to embodiment 18 of the aspect 1.
Figure 25:
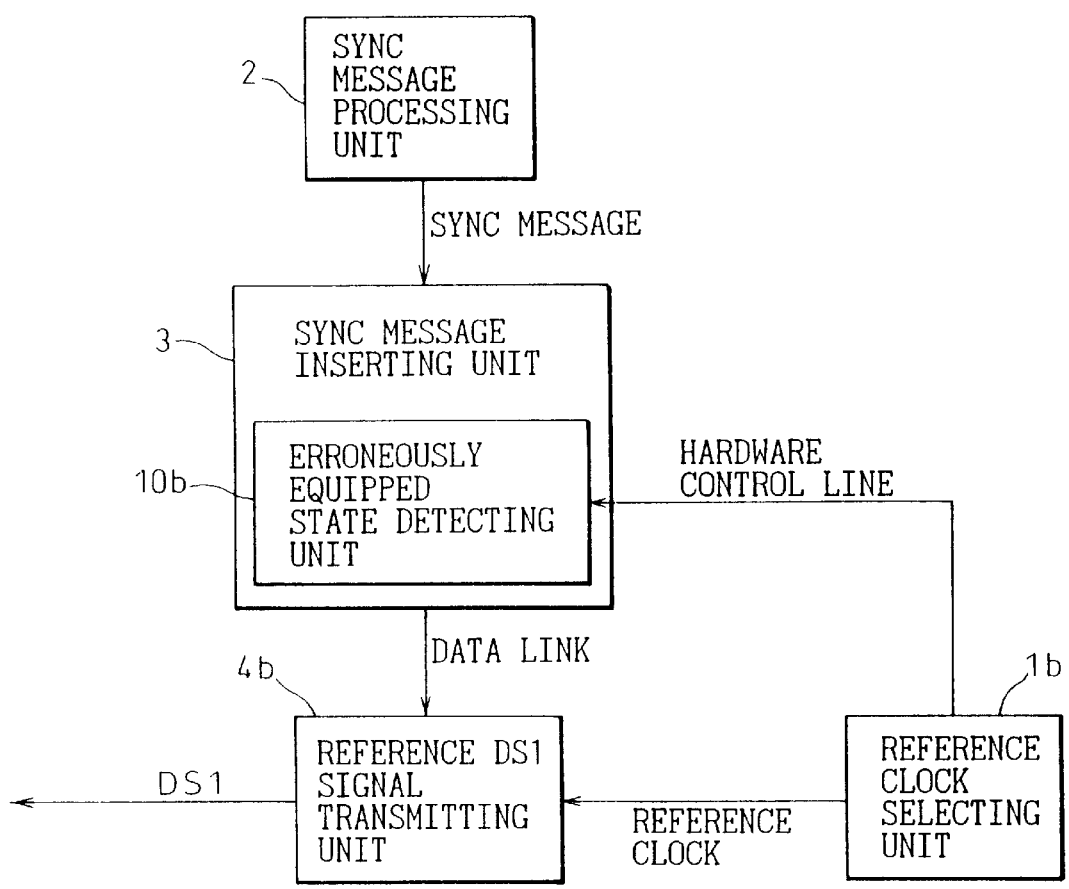
FIG. 25 shows a synchronization message transmitting apparatus according to embodiment 19 of the aspect 1.
Figure 26:
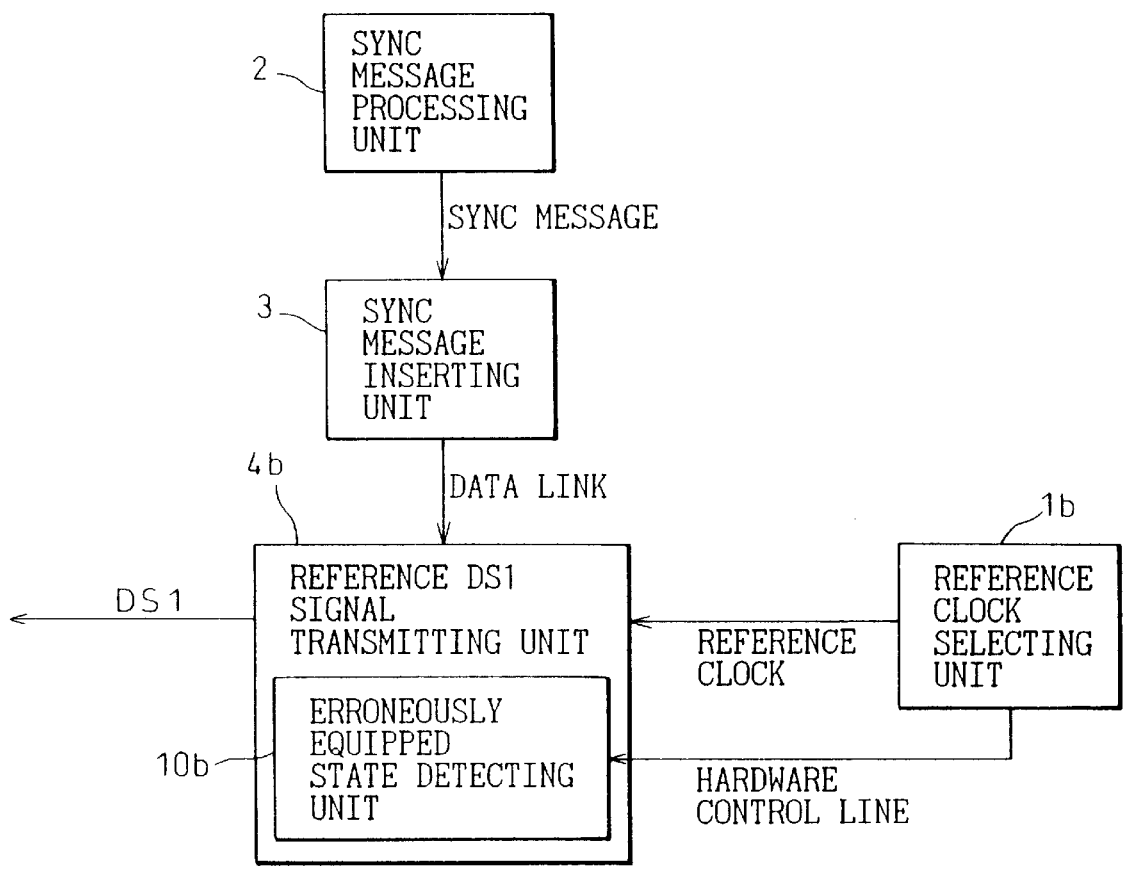
FIG. 26 shows a synchronization message transmitting apparatus according to embodiment 20 of the aspect 1.

FIGS. 24, 25, and 26 show synchronization message transmitting apparatuses according to embodiments 18, 19, and 20 of the aspect 1. These embodiments differ from the embodiments 14, 15, and 16 of FIGS. 20, 21, and 22 in that they employ each an erroneously equipped state detecting unit 10b.

The operations of the embodiments 18 to 20 are the same as those of the embodiments 14 to 16 if the detecting unit 10a is replaced with the detecting unit 10b and the unequipped information is replaced with erroneously equipped information.

If the detecting unit 10b of any one of the embodiments 18 to 20 detects an erroneously equipped state of a reference clock selecting unit 1b, a reference DS1 signal transmitting unit 4b transmits ESF-DS1 frames containing a synchronization message of DUS (do not use as a master clock) to an opposite party so that the opposite party will not use the frames for preparing a master clock.

Embodiment 21 of aspect 1

Figure 27:
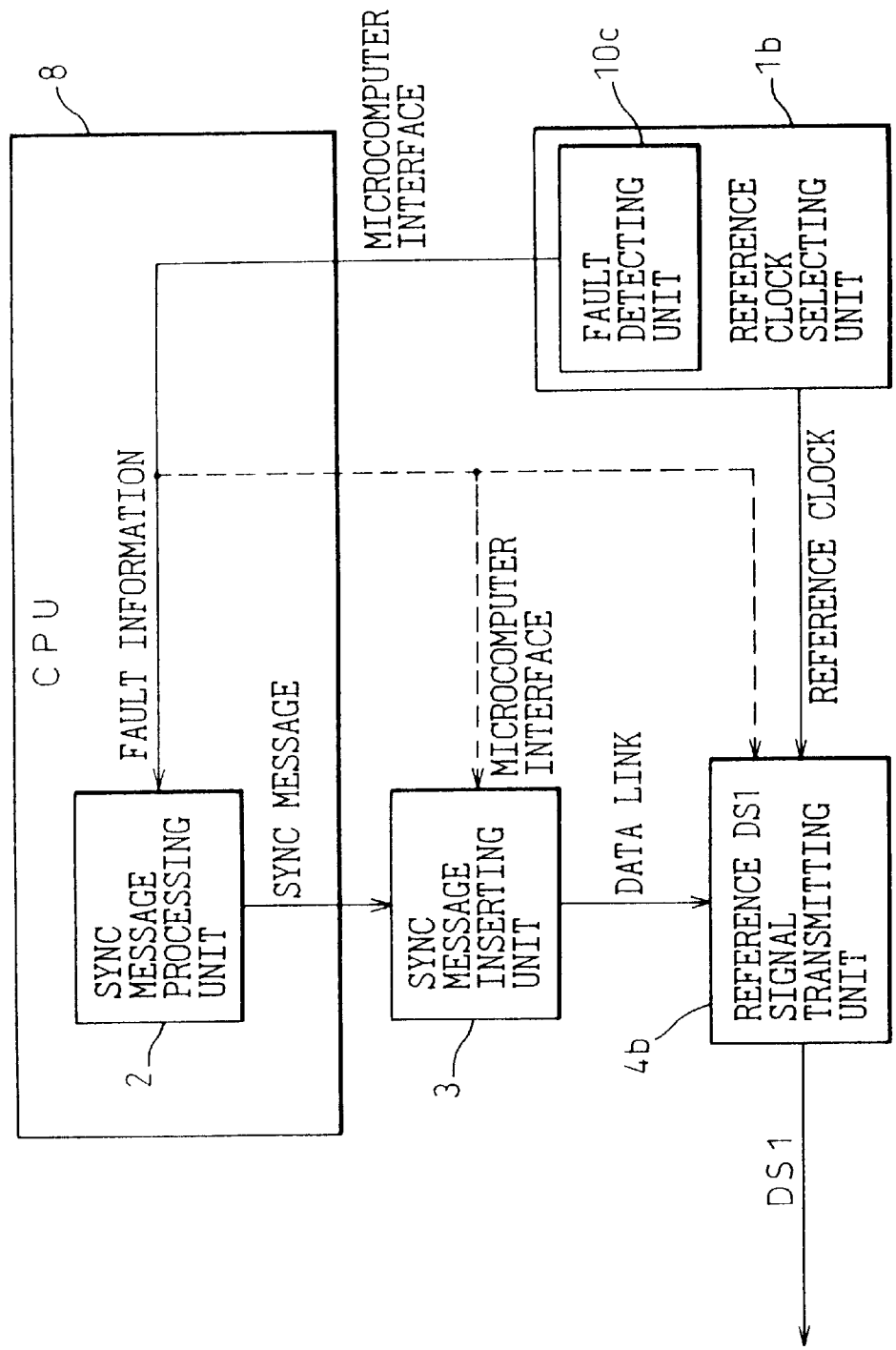
FIG. 27 shows a synchronization message transmitting apparatus according to embodiment 21 of the aspect 1.

FIG. 27 shows a synchronization message transmitting apparatus according to embodiment 21 of the aspect 1. The embodiment 21 differs from the embodiment 13 of FIG. 19 in that it employs a fault detecting unit 10c incorporated in a reference clock selecting unit 1b.

The detecting unit 10c provides fault information about the selecting unit 1b to a synchronization message processing unit 2, a synchronization message inserting unit 3, or a reference DS1 signal transmitting unit 4b.

The operation of the embodiment 21 when the detecting unit 10c provides fault information to any one of the units 2, 3, and 4b is the same as that of the embodiment 13 of FIG. 19 if the detecting unit 10a is replaced with the detecting unit 10c and the unequipped information is replaced with the fault information.

The transmitting unit 4b transmits ESF-DS1 frames with data link bits containing a synchronization message of DUS (do not use as a master clock) to an opposite party so that the opposite party will not employ the frames for preparing a master clock.

Embodiments 22, 23, and 24 of aspect 1

Figure 28:
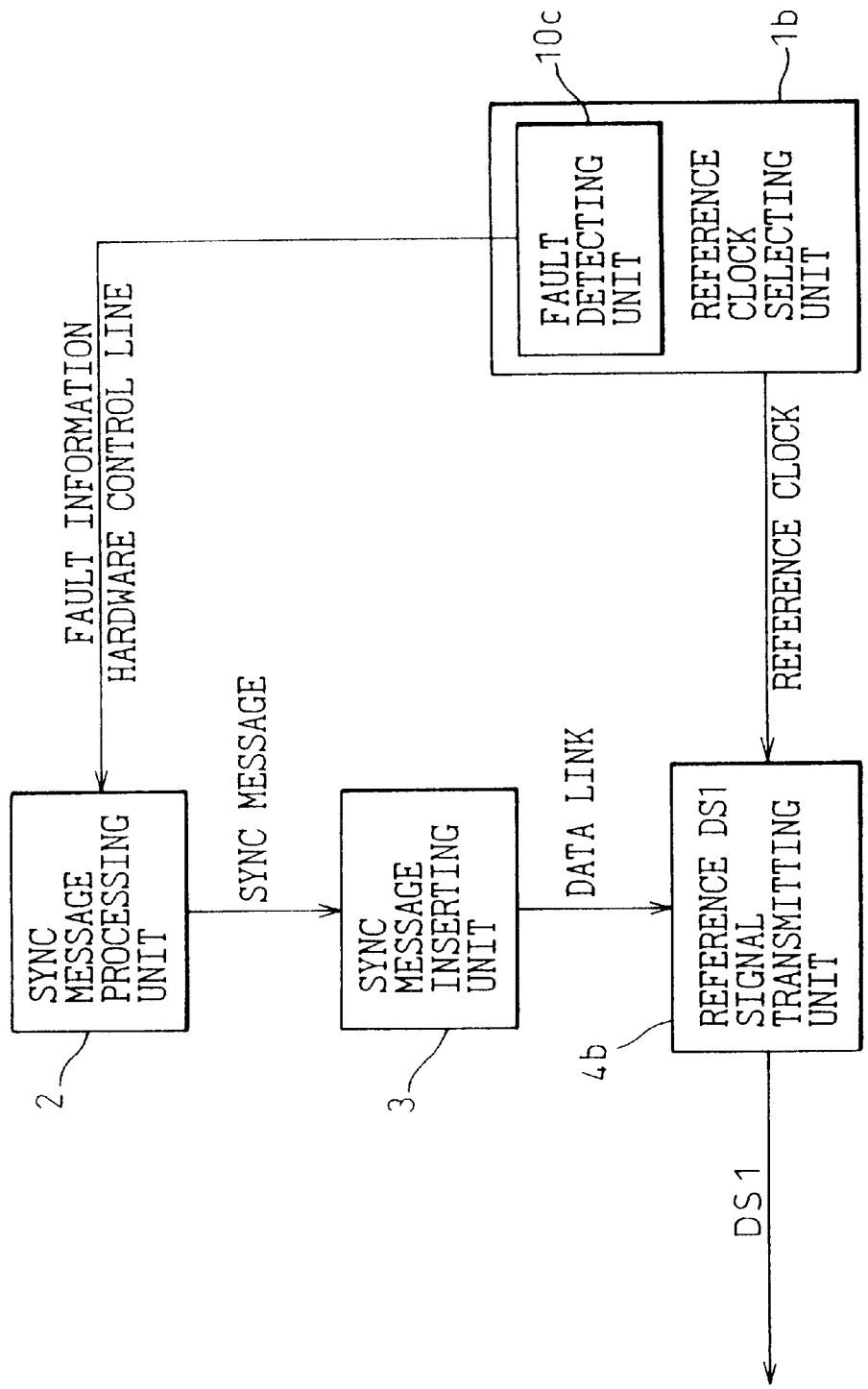
FIG. 28 shows a synchronization message transmitting apparatus according to embodiment 22 of the aspect 1.
Figure 29:
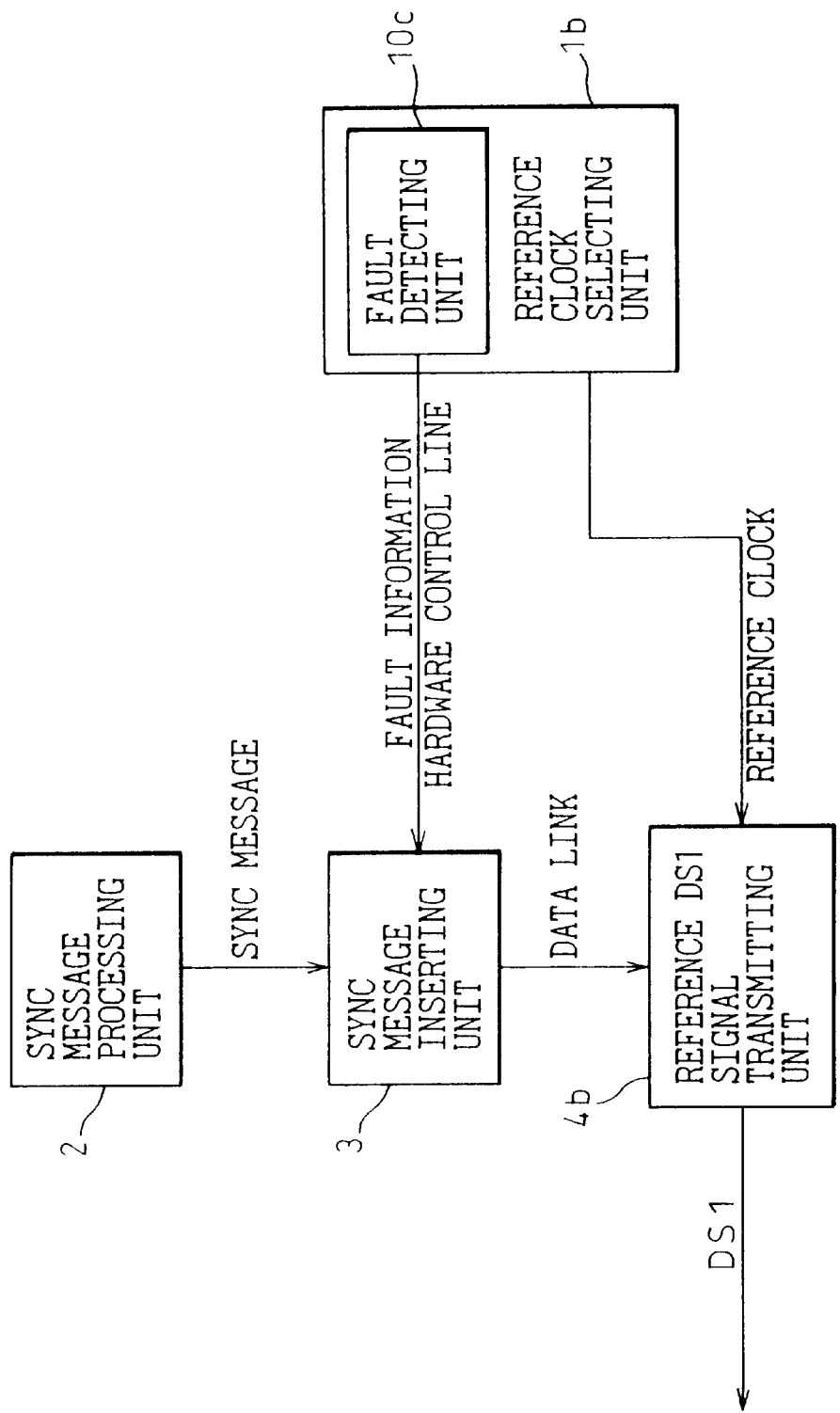
FIG. 29 shows a synchronization message transmitting apparatus according to embodiment 23 of the aspect 1.
Figure 30:
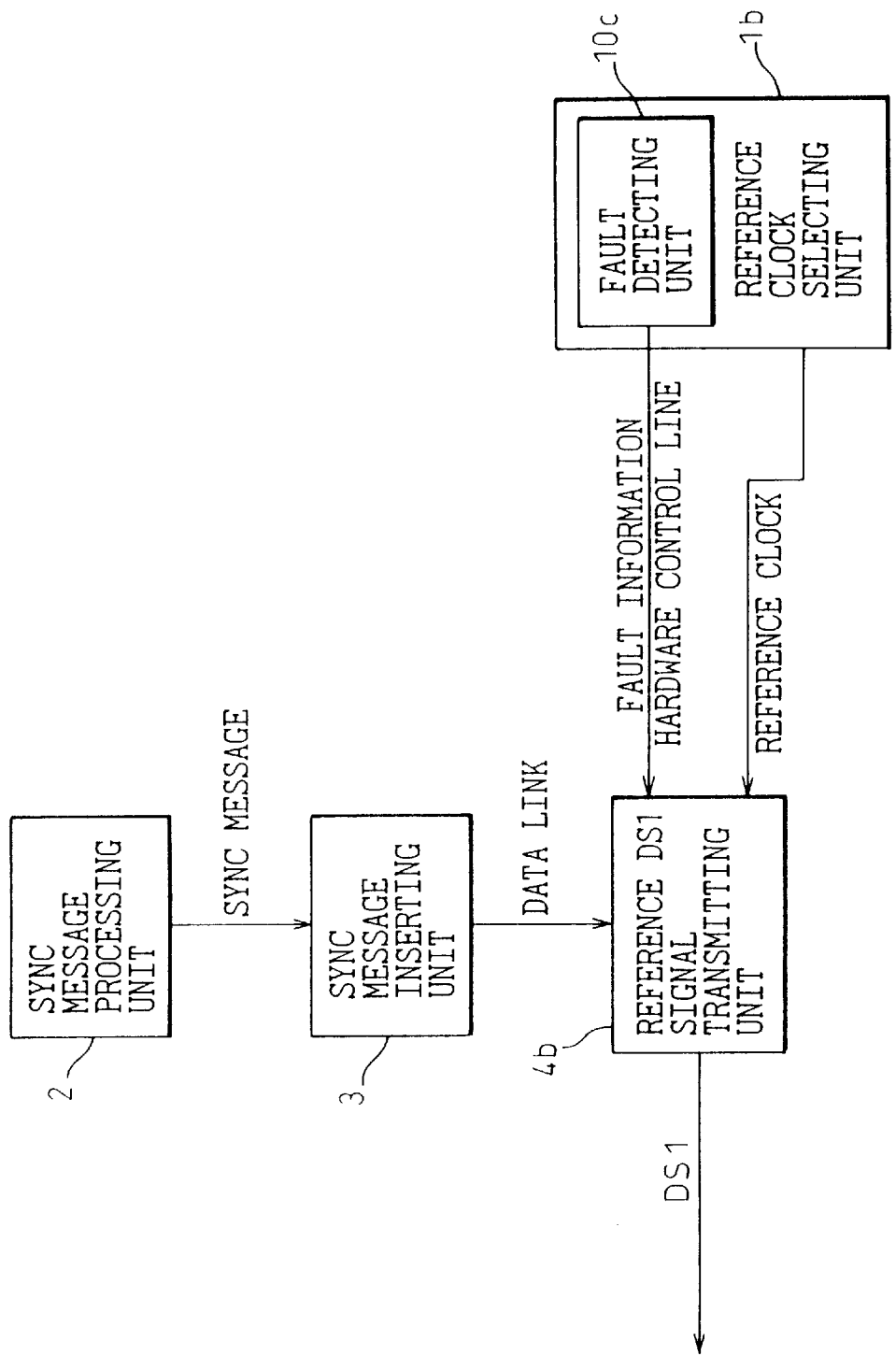
FIG. 30 shows a synchronization message transmitting apparatus according to embodiment 24 of the aspect 1.

FIGS. 28, 29, and 30 show synchronization message transmitting apparatuses according to embodiments 22, 23, and 24 of the aspect 1. These embodiments differ from the embodiment 21 of FIG. 27 in that they employ each a synchronization message processing unit 2 that is not in a CPU and a fault detecting unit 10c that provides fault information about a reference clock selecting unit 1b to the processing unit 2, a synchronization message inserting unit 3, or a reference DS1 signal transmitting unit 4b.

The operation of each of the embodiments 22 to 24 is the same as that of the embodiment 21 of FIG. 27 with the detecting unit 10c providing fault information about the selecting unit 1b to a corresponding one of the units 2, 3, and 4b.

The transmitting unit 4b of any one of the embodiments 22 to 24 transmits ESF-DS1 frames with data link bits containing a synchronization message of DUS (do not use as a master clock) to an opposite party so that the opposite party will not employ the frames for preparing a master clock.

Although the embodiment 21 of FIG. 27 provides fault information to the processing unit 2 through a microcomputer interface, the embodiments 22 to 24 provide fault information to the processing unit 2 through a hardware control line.

Embodiment 1 of aspect 2

Figure 31:
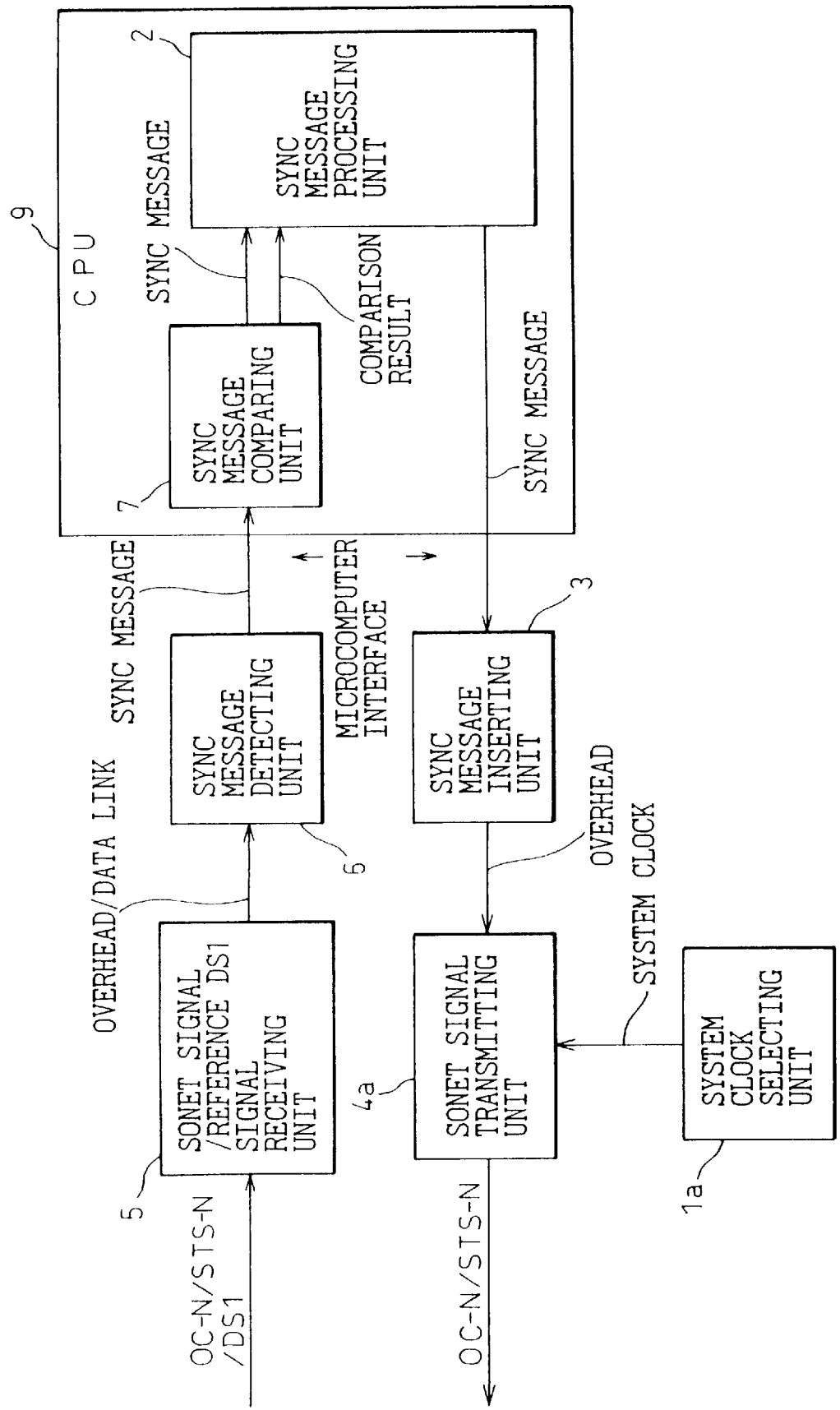
FIG. 31 shows a synchronization message transmitting apparatus according to embodiment 1 of the aspect 2.

FIG. 31 shows a synchronization message transmitting apparatus according to embodiment 1 of the aspect 2. This embodiment employs a system clock selecting unit 1a, a SONET signal transmitting unit 4a, and a SONET signal/reference DS1 signal receiving unit 5.

The transmitting unit 4a receives a system clock serving as a master clock from the selecting unit 1a and an overhead from a synchronization message inserting unit 3 and transmits an OC-N/STS-N SONET frame to an opposite party.

The receiving unit 5 provides a synchronization message contained in an overhead or in data link bits to a synchronization message detecting unit 6.

A synchronization message comparing unit 7 provides a comparison result only to a synchronization message processing unit 2.

The units 2 and 7 are contained in a CPU 9.

In operation, the receiving unit 5 receives an OC-N/STS-N frame or ESF-DS1 frames, and the detecting unit 6 detects a synchronization message in an overhead or data link bits of the received frame(s).

The comparing unit 7 compares a clock quality level written in the received synchronization message with the quality level of an internal clock and provides a comparison result to the processing unit 2.

If the comparison result indicates that the clock quality level written in the received synchronization message is lower than the internal clock quality level, the processing unit 2 sends a synchronization message of DUS (do not use as a master clock) to the inserting unit 3.

The inserting unit 3 inserts "1111" representing DUS in the bits 5 to 8 of the byte S1 of a SONET overhead and transfers the overhead to the transmitting unit 4a. The transmitting unit 4a transmits an OC-N/STS-N frame with the overhead to the opposite party so that the opposite party will never use the frame for preparing a master clock.

Embodiment 2 of aspect 2

Figure 32:
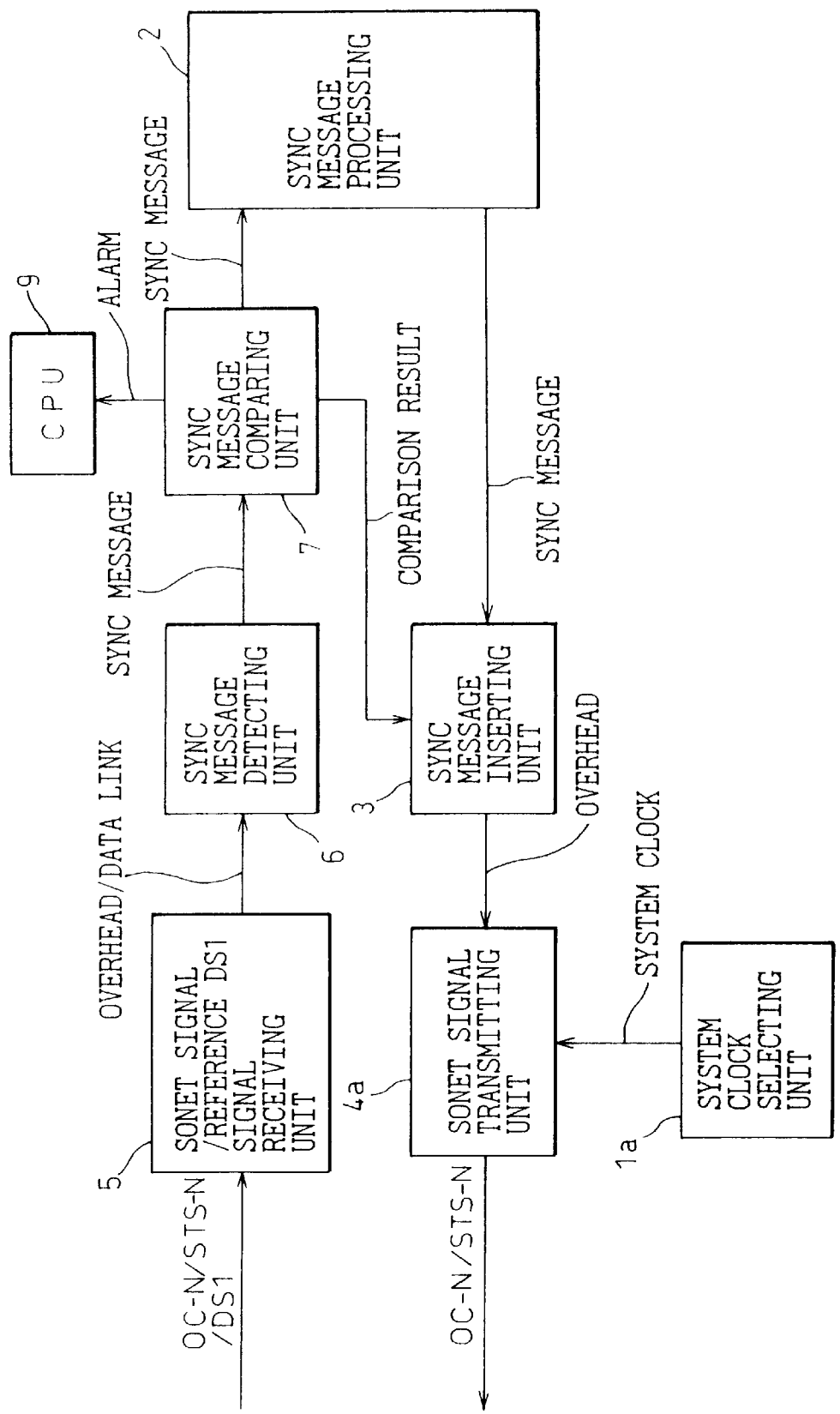
FIG. 32 shows a synchronization message transmitting apparatus according to embodiment 2 of the aspect 2.

FIG. 32 shows a synchronization message transmitting apparatus according to embodiment 2 of the aspect 2. This embodiment differs from the embodiment 1 of FIG. 31 in that it employs a synchronization message comparing unit 7 that provides a comparison result to a synchronization message inserting unit 3. The comparing unit 7 also provides, if necessary, an alarm signal to a CPU 9. The units 2 and 7 are outside the CPU 9.

The operations of a SONET signal/reference DS1 signal receiving unit 5, a synchronization message detecting unit 6, and the comparing unit 7 are the same as those of the embodiment 1 of FIG. 31.

If a clock quality level written in a received synchronization message is lower than the quality level of an internal clock, the comparing unit 7 provides an alarm signal to the CPU 9. At the same time, the inserting unit 3 inserts "1111" representing DUS (do not use as a master clock) in the bits 5 to 8 of the byte S1 of a SONET overhead without regard to the contents of a synchronization message transferred from the processing unit 2 and transfers the overhead to the transmitting unit 4a.

The transmitting unit 4a transmits an OC-N/STS-N frame with the overhead to an opposite party so that the opposite party will never use the frame for preparing a master clock.

Embodiment 3 of aspect 2

Figure 33:
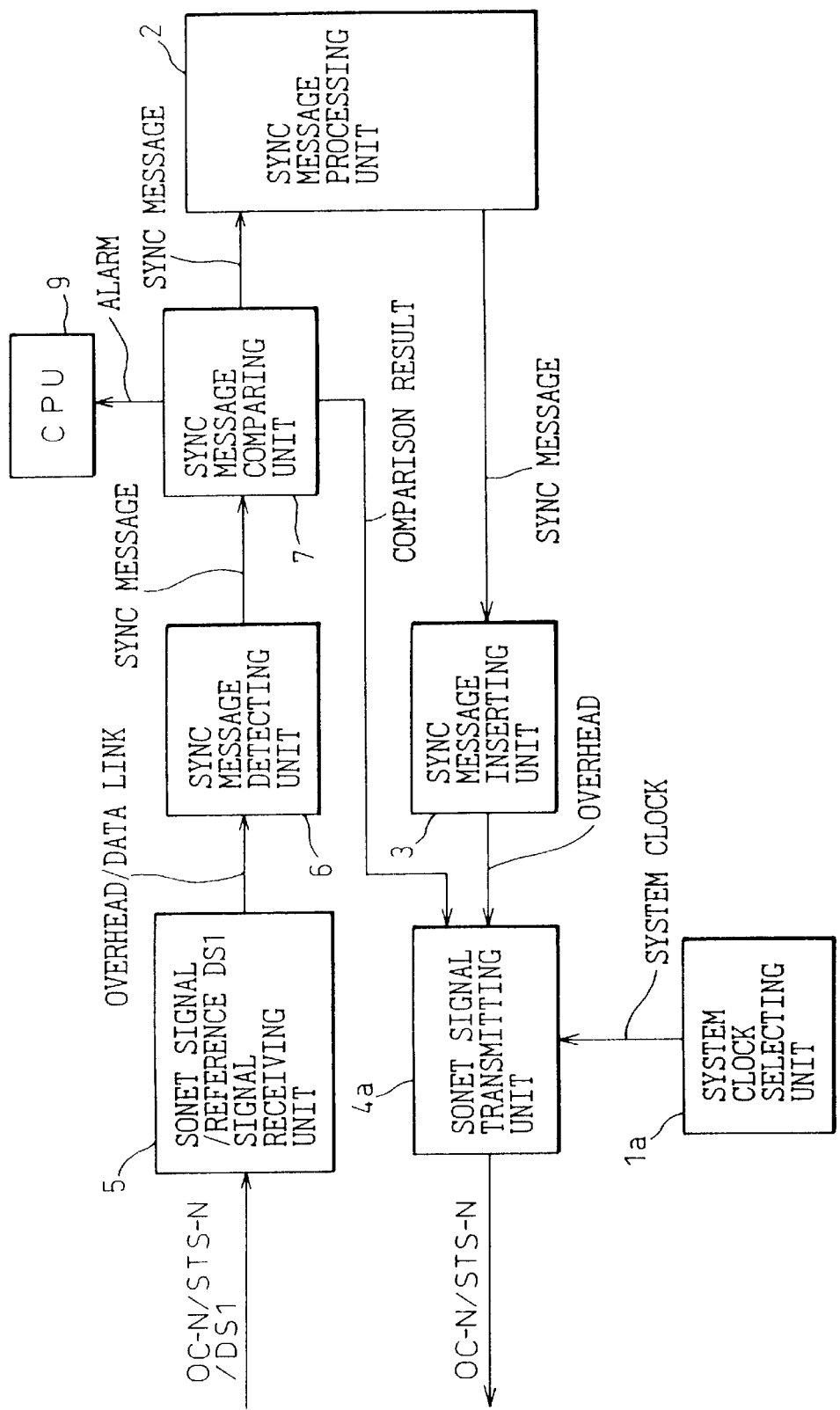
FIG. 33 shows a synchronization message transmitting apparatus according to embodiment 3 of the aspect 2.

FIG. 33 shows a synchronization message transmitting apparatus according to embodiment 3 of the aspect 2. This embodiment differs from the embodiment 1 of FIG. 31 in that it employs a synchronization message comparing unit 7 that provides a comparison result to a SONET signal transmitting unit 4a.

If the comparison result indicates that a clock quality level written in a received synchronization message is lower than the quality level of an internal clock, the transmitting unit 4a forcibly inserts "1111" representing DUS (do not use as a master clock) in the bits 5 to 8 of the byte S1 of an OC-N/STS-N frame and transmits the frame to an opposite party so that the opposite party will never use the frame for preparing a master clock.

Embodiment 4 of aspect 2

Figure 34:
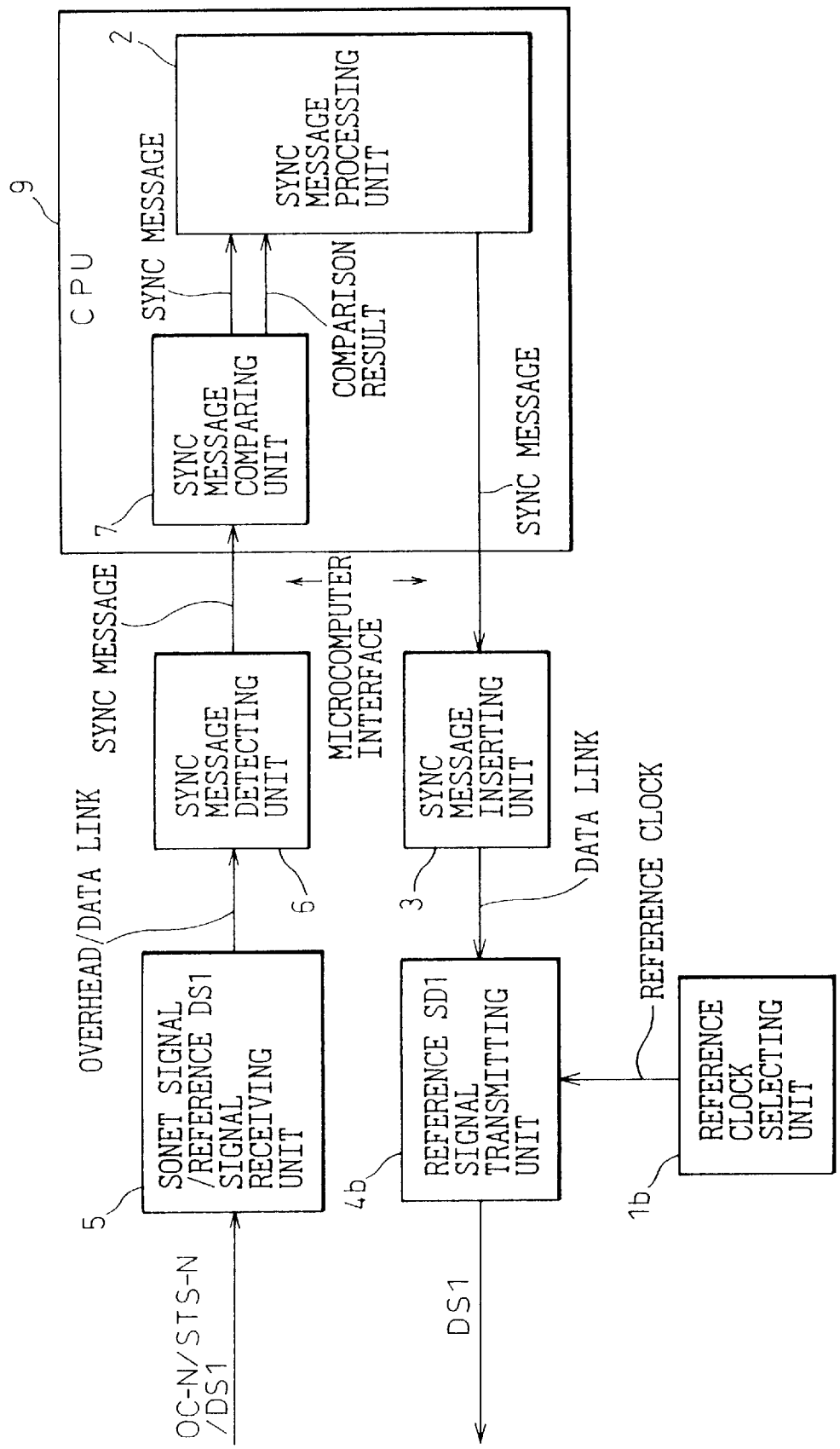
FIG. 34 shows a synchronization message transmitting apparatus according to embodiment 4 of the aspect 2.

FIG. 34 shows a synchronization message transmitting apparatus according to embodiment 4 of the aspect 2. This embodiment differs from the embodiment 1 of FIG. 31 in that it employs a reference clock selecting unit 1b and a reference DS1 signal transmitting unit 4b.

The transmitting unit 4b receives a reference clock from the selecting unit 1b and data link bits from a synchronization message inserting unit 3, and transmits ESF-DS1 frames to an opposite party.

The operations of a SONET signal/reference DS1 signal receiving unit 5, a synchronization message detecting unit 6, a synchronization message comparing unit 7, and a synchronization message processing unit 2 are the same as those of the embodiment 1 of FIG. 31.

If the comparing unit 7 provides a comparison result indicating that a clock quality level written in a received synchronization message is lower than the quality level of an internal clock, the processing unit 2 sends a synchronization message of DUS (do not use as a master clock) to the inserting unit 3.

The inserting unit 3 inserts a bit string of "0011000011111111" representing DUS in data link bits and transfers them to the transmitting unit 4b.

The transmitting unit 4b transmits ESF-DS1 frames with the data link bits to an opposite party so that the opposite party will never use the frames for preparing a master clock.

Embodiment 5 of aspect 2

Figure 35:
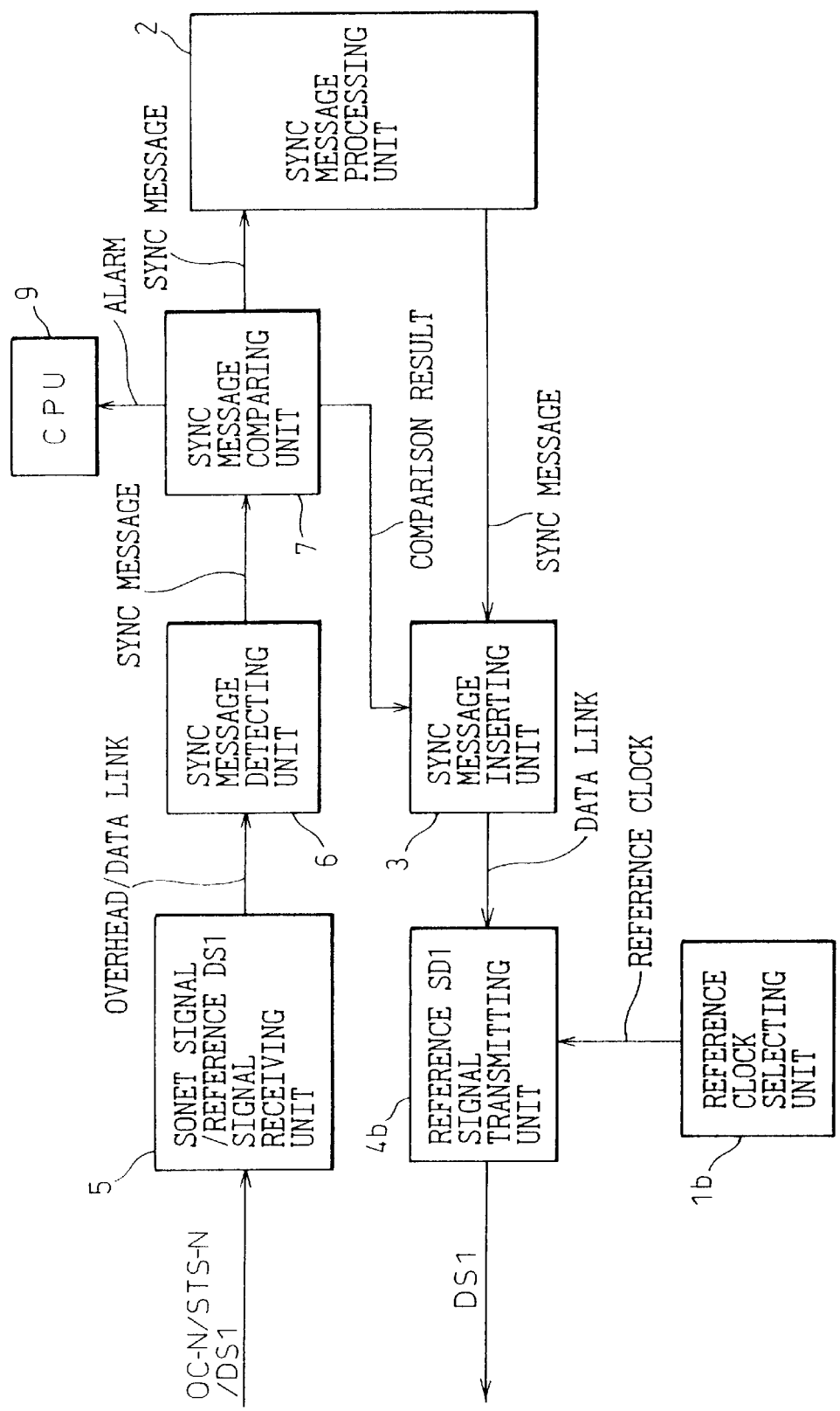
FIG. 35 shows a synchronization message transmitting apparatus according to embodiment 5 of the aspect 2.

FIG. 35 shows a synchronization message transmitting apparatus according to embodiment 5 of the aspect 2. This embodiment differs from the embodiment 4 of FIG. 34 in that it employs a synchronization message comparing unit 7 that provides a comparison result to a synchronization message inserting unit 3.

The comparing unit 7 provides an alarm signal to a CPU 9. The comparing unit 7 and a synchronization message processing unit 2 are outside the CPU 9.

The operations of a SONET signal/reference DS1 signal receiving unit 5, a synchronization message detecting unit 6, and the comparing unit 7 are the same as those of the embodiment 4 of FIG. 34.

If the comparison result from the comparing unit 7 to the inserting unit 3 indicates that a clock quality level written in a received synchronization message is lower than the quality level of an internal clock, the comparing unit 7 provides an alarm signal to the CPU 9. At the same time, the inserting unit 3 inserts a bit string of "0011000011111111" representing DUS (do not use as a master clock) in data link bits without regard to the contents of a synchronization message transferred from the processing unit 2 and transfers the data link bits to a reference DS1 signal transmitting unit 4b. The transmitting unit 4b transmits ESF-DS1 frames with the data link bits to an opposite party so that the opposite party will never use the frames for preparing a master clock.

Embodiment 6 of aspect 2

Figure 36:
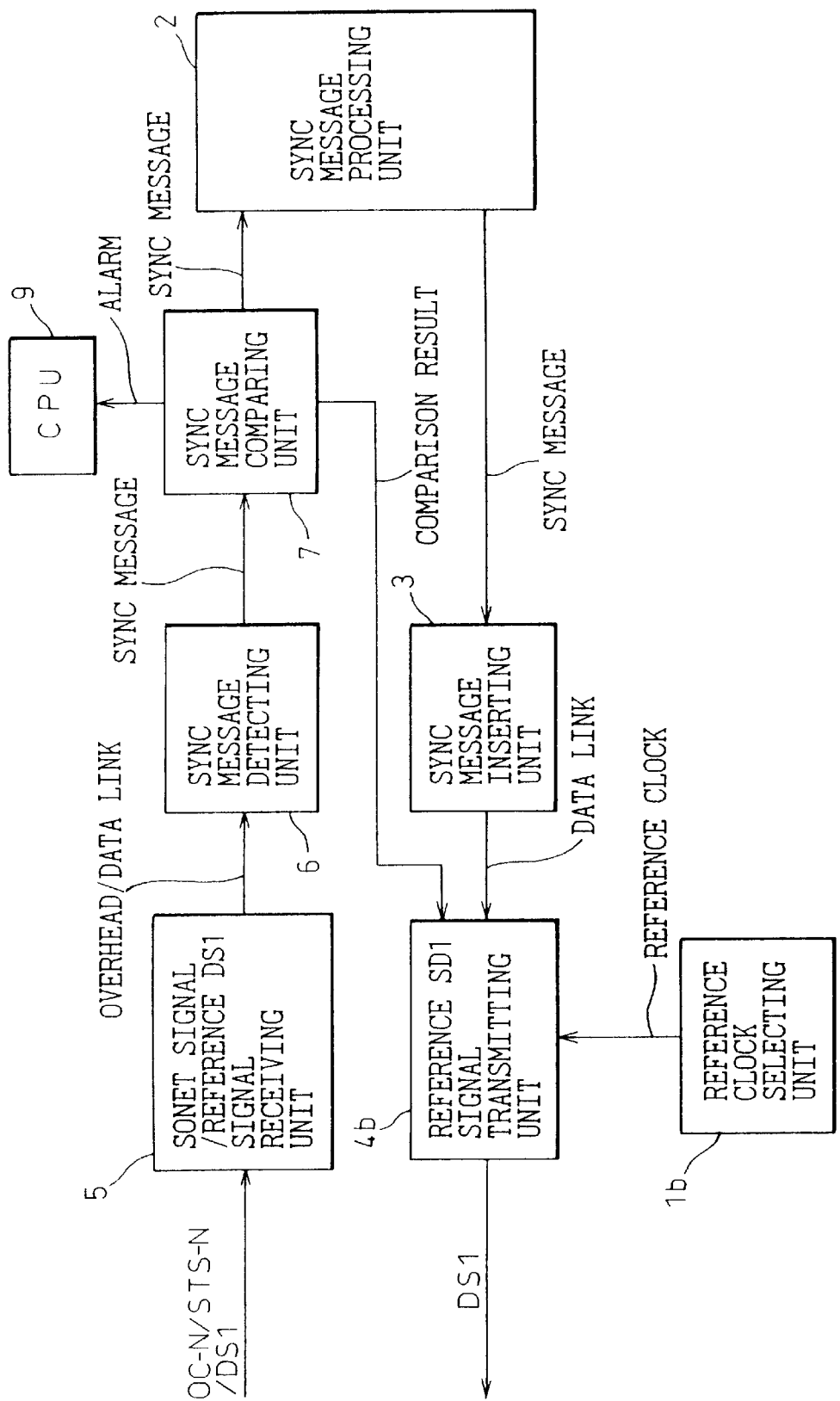
FIG. 36 shows a synchronization message transmitting apparatus according to embodiment 6 of the aspect 2.

FIG. 36 shows a synchronization message transmitting apparatus according to embodiment 6 of the aspect 2. This embodiment differs from the embodiment 5 of FIG. 35 in that it employs a synchronization message comparing unit 7 that provides a comparison result to a reference DS1 signal transmitting unit 4b.

If the comparison result indicates that a clock quality level written in a received synchronization message is lower than the quality level of an internal clock, the transmitting unit 4b forcibly inserts a bit string of "0011000011111111" representing DUS (do not use as a master clock) in data link bits without regard to the contents of a synchronization message transferred from a synchronization message inserting unit 3 and transmits ESF-DS1 frames with the data link bits to an opposite party so that the opposite party will never use the frames for preparing a master clock.

Embodiment 1 of aspect 3

Figure 37:
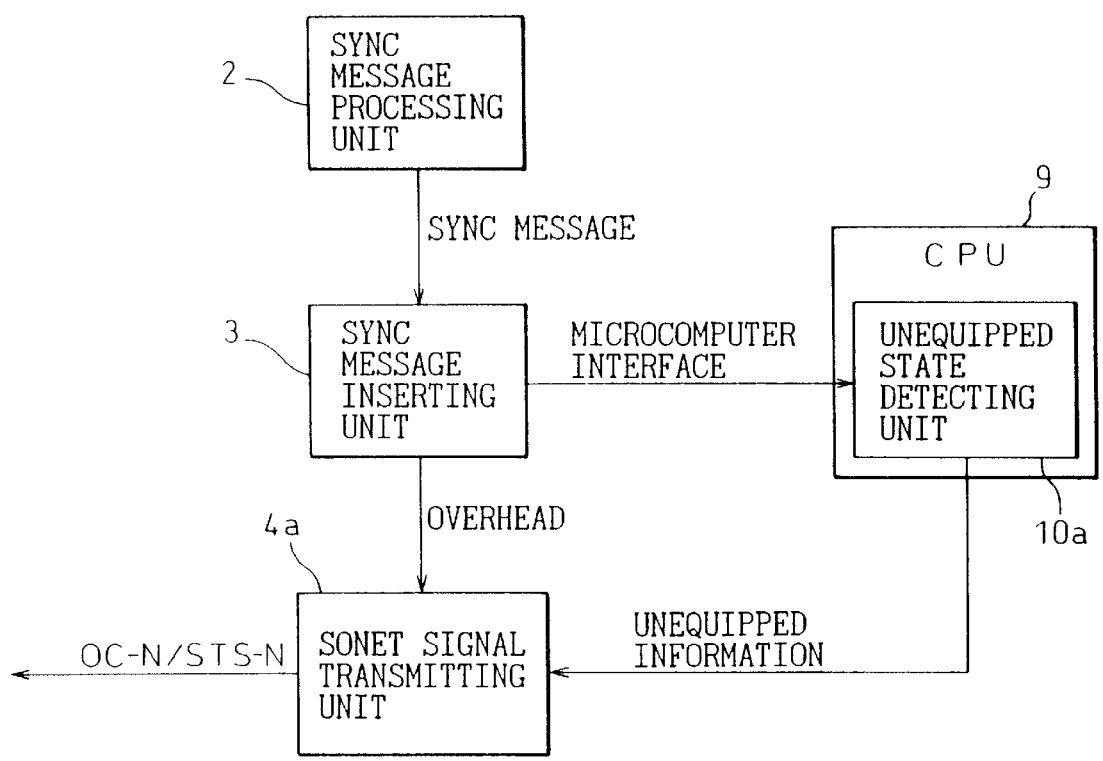
FIG. 37 shows a synchronization message transmitting apparatus according to embodiment 1 of the aspect 3.

FIG. 37 shows a synchronization message transmitting apparatus according to embodiment 5 of the aspect 3. This embodiment employs a SONET signal transmitting unit 4a and an unequipped state detecting unit 10a.

The transmitting unit 4a receives unequipped information from the detecting unit 10a and an overhead from a synchronization message inserting unit 3, and transmits an OC-N/STS-N frame to an opposite party.

The detecting unit 10a is incorporated in a CPU 9, and therefore, communicates with the units 3 and 4a through a microcomputer interface.

If the detecting unit 10a detects an unequipped state of the inserting unit 3, it provides unequipped information to the transmitting unit 4a. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to the opposite party. The opposite party that receives the frame with the synchronization message of DUS will not use the frame for preparing a master clock.

The detecting unit 10a reads a code related to the inserting unit 3 on the microcomputer interface, and if the code is equal to one specific to the inserting unit 3, the detecting unit 10a detects a normally equipped state of the inserting unit 3. If the code is 00h or FFh that is not equal to the specific code, the detecting unit 10a detects an unequipped state of the inserting unit 3.

Embodiment 2 of aspect 3

Figure 38:
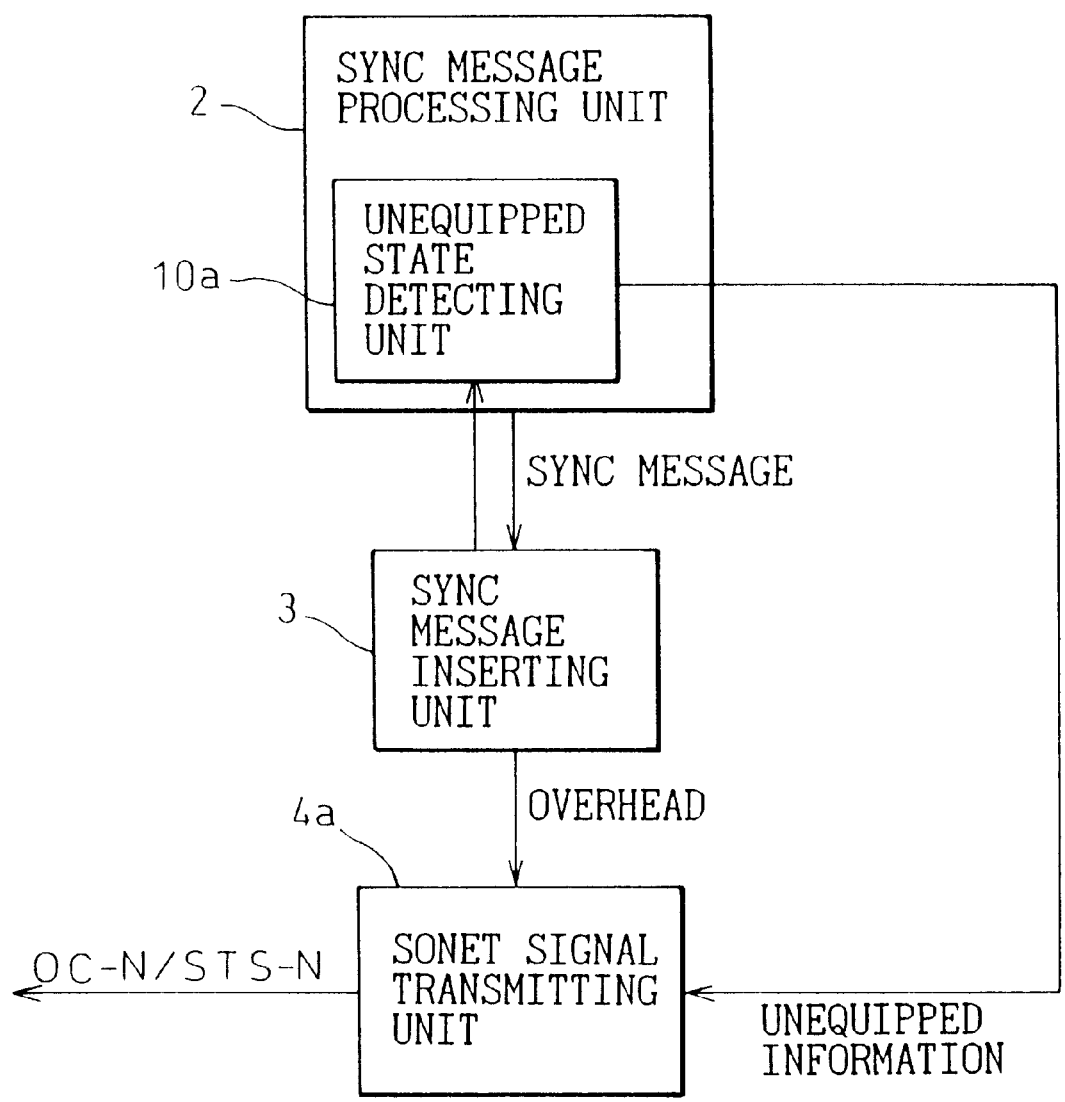
FIG. 38 shows a synchronization message transmitting apparatus according to embodiment 2 of the aspect 3.

FIG. 38 shows a synchronization message transmitting apparatus according to embodiment 2 of the aspect 3. This embodiment differs from the embodiment 1 of FIG. 37 in that it employs an unequipped state detecting unit 10a incorporated in a synchronization message processing unit 2.

If the detecting unit 10a detects an unequipped state of a synchronization message inserting unit 3, the processing unit 2 provides unequipped information to a SONET signal transmitting unit 4a. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party. The opposite party that receives the frame with the synchronization message of DUS will not use the frame for preparing a reference clock.

The detecting unit 10a checks a signal on a hardware control line. If the signal is at low level, the detecting unit 10a determines that the inserting unit 3 is equipped, and if the signal is at high level, that the inserting unit 3 is unequipped.

Embodiment 3 of aspect 3

Figure 39:
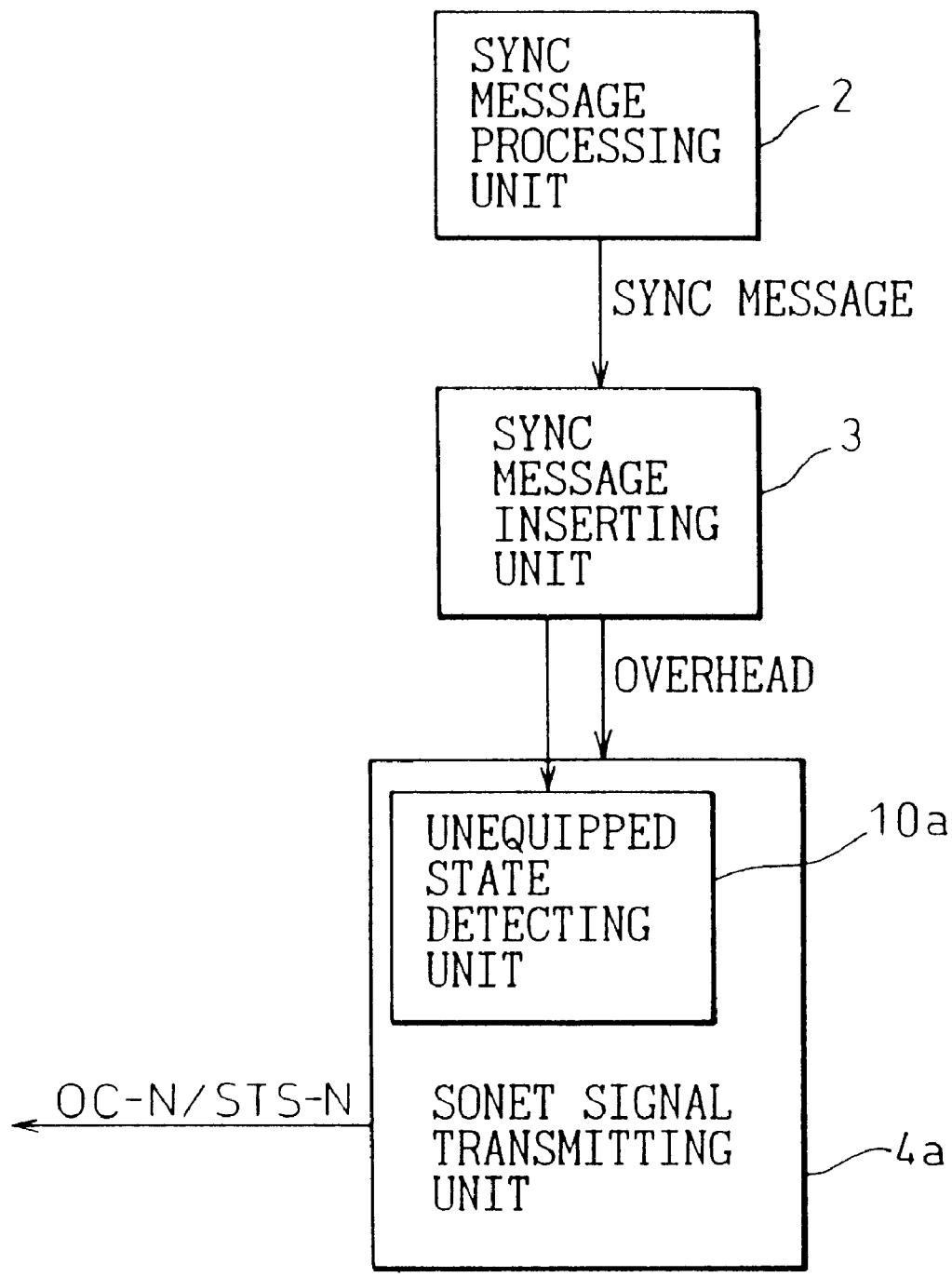
FIG. 39 shows a synchronization message transmitting apparatus according to embodiment 3 of the aspect 3.

FIG. 39 shows a synchronization message transmitting apparatus according to embodiment 3 of the aspect 3. This embodiment differs from the embodiment 2 of FIG. 38 in that it employs an unequipped state detecting unit 10a incorporated in a SONET signal transmitting unit 4a.

If the detecting unit 10a detects an unequipped state of a synchronization message inserting unit 3, the transmitting unit 4a forcibly inserts "1111" representing DUS (do not use as a master clock) in the bits 5 to 8 of the byte S1 of the overhead of an OC-N/STS-N frame without regard to the contents of an overhead transferred from the inserting unit 3 and transmits the frame to an opposite party. The opposite party that receives the frame with the synchronization message of DUS will not use the frame for preparing a master clock.

Embodiment 4 of aspect 3

Figure 40:
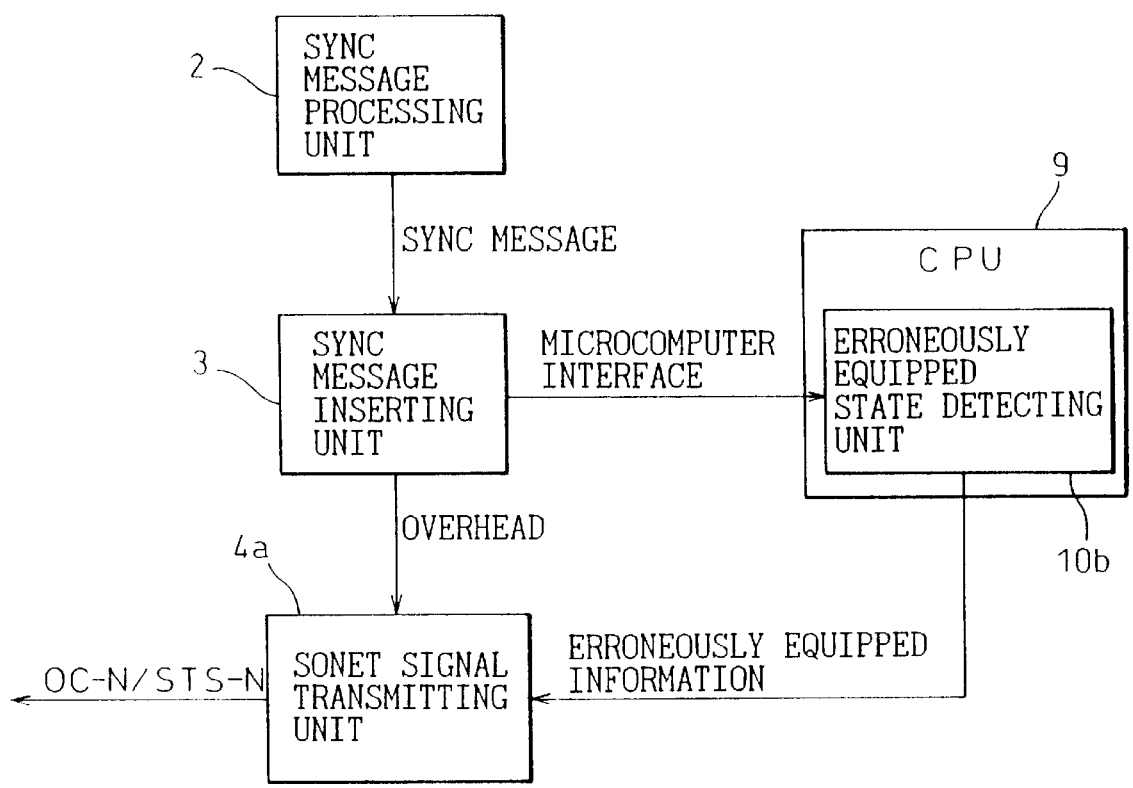
FIG. 40 shows a synchronization message transmitting apparatus according to embodiment 4 of the aspect 3.

FIG. 40 shows a synchronization message transmitting apparatus according to embodiment 5 of the aspect 3. This embodiment differs from the embodiment 1 of FIG. 37 in that it employs an erroneously equipped state detecting unit 10b that provides erroneously equipped information to a SONET signal transmitting unit 4a.

If the detecting unit 10b detects an erroneously equipped state of a synchronization message inserting unit 3, it provides erroneously equipped information to the transmitting unit 4a. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party. The opposite party that receives the frame with the synchronization message of DUS will not use the frame for preparing a master clock.

The detecting unit 10b reads a code related to the inserting unit 3 on a microcomputer interface, and if the code is equal to one specific to the inserting unit 3, the detecting unit 10b detects a normally equipped state of the inserting unit 3. If the code is not equal to the specific code nor the code representing an unequipped state, the detecting unit 10b detects an erroneously equipped state of the inserting unit 3.

Embodiment 5 of aspect 3

Figure 41:
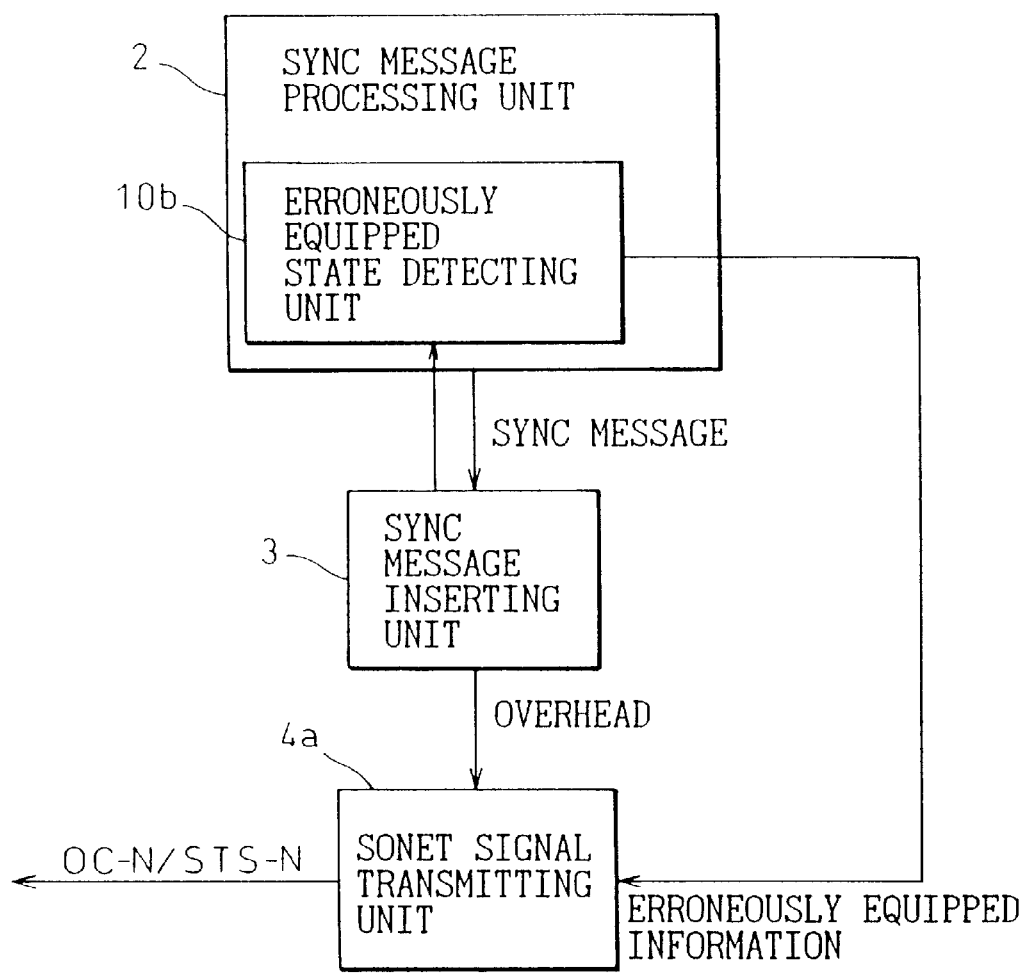
FIG. 41 shows a synchronization message transmitting apparatus according to embodiment 5 of the aspect 3.

FIG. 41 shows a synchronization message transmitting apparatus according to embodiment 5 of the aspect 3. This embodiment differs from the embodiment 2 of FIG. 38 in that it employs an erroneously equipped state detecting unit 10b.

If the detecting unit 10b detects an erroneously equipped state of a synchronization message inserting unit 3, it provides erroneously equipped information to a SONET signal transmitting unit 4a. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party. The opposite party that receives the frame with the synchronization message of DUS will not use the frame for preparing a master clock.

The inserting unit 3 is determined to be normally equipped if a signal level on a hardware control line is low, and to be erroneously equipped if the same is high.

Embodiment 6 of aspect 3

Figure 42:
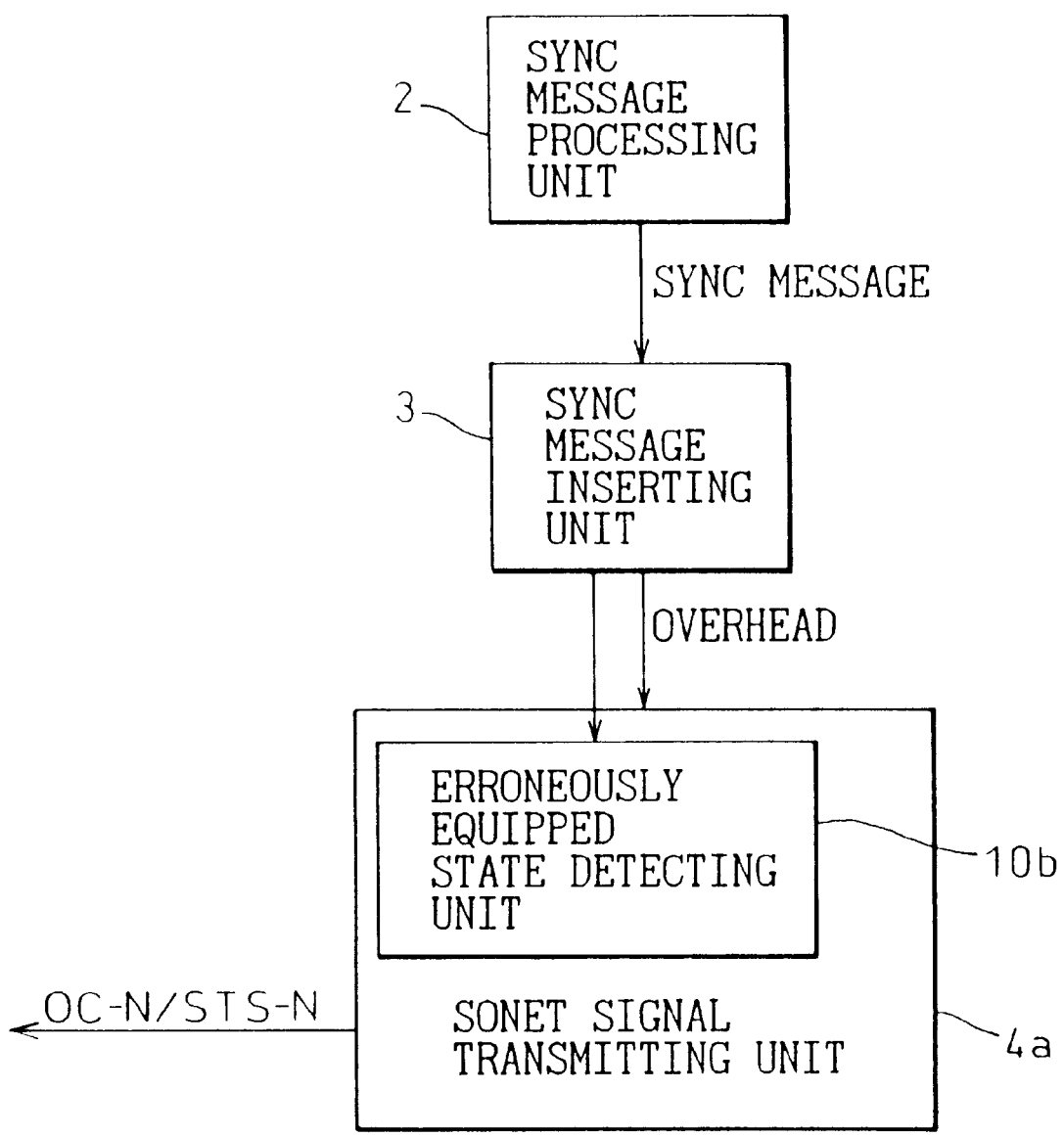
FIG. 42 shows a synchronization message transmitting apparatus according to embodiment 6 of the aspect 3.

FIG. 42 shows a synchronization message transmitting apparatus according to embodiment 6 of the aspect 3. This embodiment differs from the embodiment 3 of FIG. 39 in that it employs an erroneously equipped state detecting unit 10b.

If the detecting unit 10b detects an erroneously equipped state of a synchronization message inserting unit 3, a SONET signal transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party so that the opposite party will not use the frame for preparing a master clock.

Embodiment 7 of aspect 3

Figure 43:
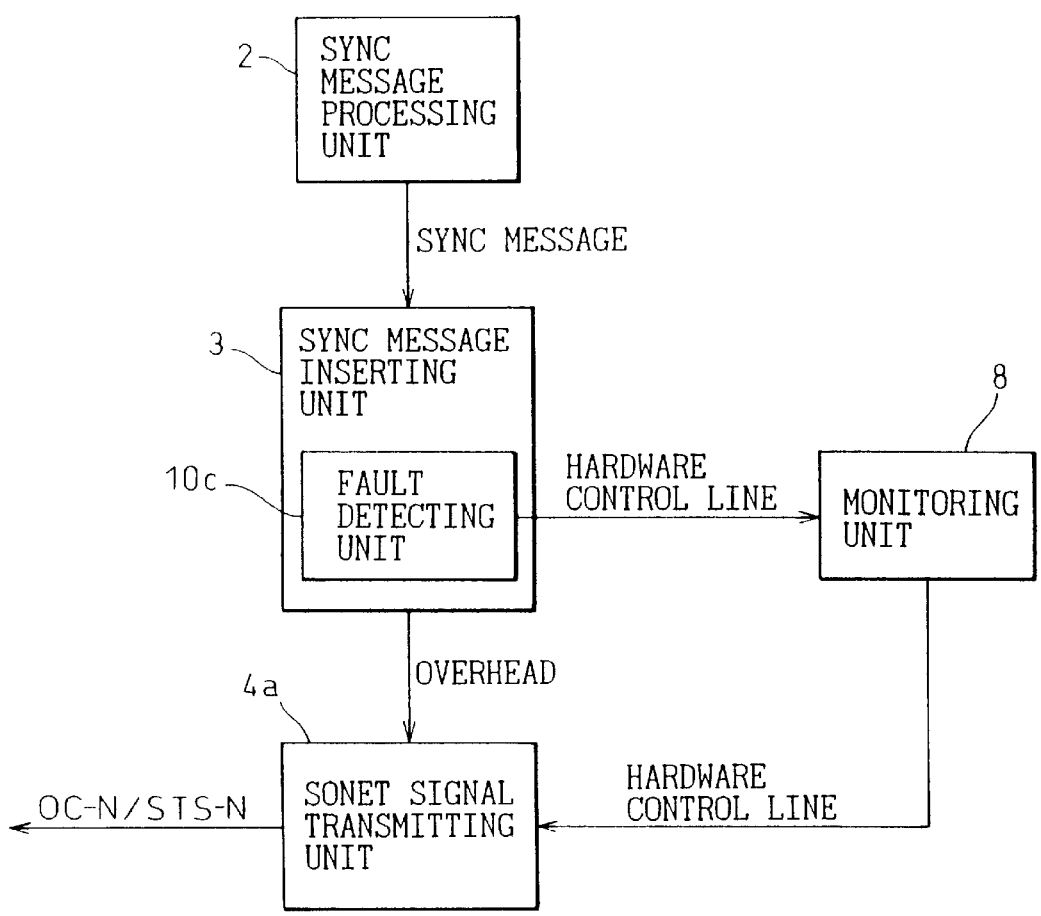
FIG. 43 shows a synchronization message transmitting apparatus according to embodiment 7 of the aspect 3.

FIG. 43 shows a synchronization message transmitting apparatus according to embodiment 7 of the aspect 3. This embodiment differs from the embodiment 1 of FIG. 37 in that it employs a fault detecting unit 10c incorporated in a synchronization message inserting unit 3.

When the detecting unit 10c provides fault information to a CPU 9, the CPU 9 provides the fault information to a SONET signal transmitting unit 4a through a microcomputer interface or a hardware control line. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party so that the opposite party will not use the frame for preparing a master clock.

Embodiment 8 of aspect 3

Figure 44:
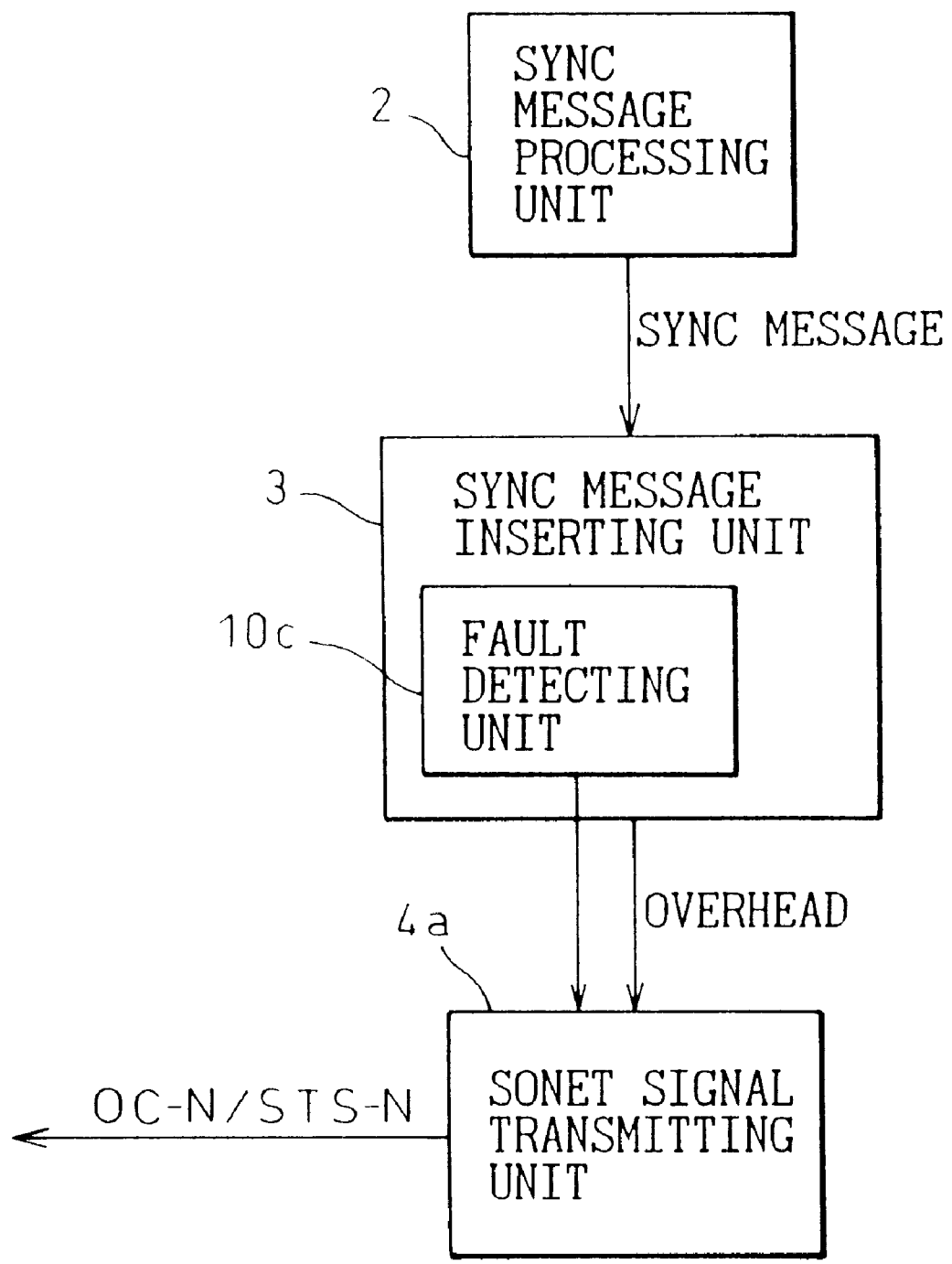
FIG. 44 shows a synchronization message transmitting apparatus according to embodiment 8 of the aspect 3.

FIG. 44 shows a synchronization message transmitting apparatus according to embodiment 8 of the aspect 3. This embodiment differs from the embodiment 7 of FIG. 43 in that it employs a fault detecting unit 10c that provides fault information directly to a SONET signal transmitting unit 4a without passing through a CPU.

If the detecting unit 10c detects a fault in a synchronization message inserting unit 3, it provides fault information to the transmitting unit 4a. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party so that the opposite party will not use the frame for preparing a master clock.

Embodiment of aspect 4

Figure 45:
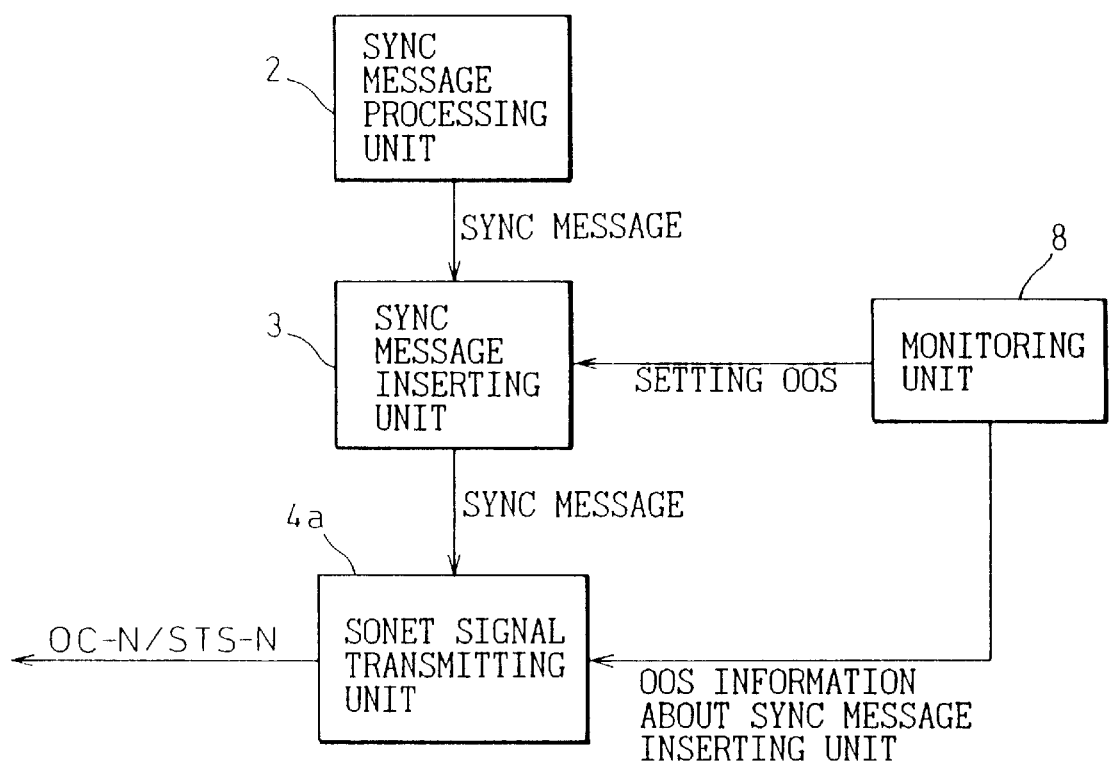
FIG. 45 shows a synchronization message transmitting apparatus according to an embodiment of the aspect 4.

FIG. 45 shows a synchronization message transmitting apparatus according to an embodiment of the aspect 4. This embodiment employs a CPU as a monitoring unit 8, and a SONET signal transmitting unit 4a.

If the user sets a synchronization message inserting unit 3 to OOS (out of service) through the CPU, the CPU informs the transmitting unit 4a. The transmitting unit 4a forcibly inserts "1111" representing DUS (do not use as a master clock) in the bits 5 to 8 of the byte S1 of the overhead of an OC-N/STS-N frame without regard to the contents of a synchronization message transferred from the inserting unit 3 and transmits the frame to an opposite party. The opposite party that receives the frame with the synchronization message of DUS will not use the frame for preparing a master clock.

Embodiment of aspect 5

Figure 46:
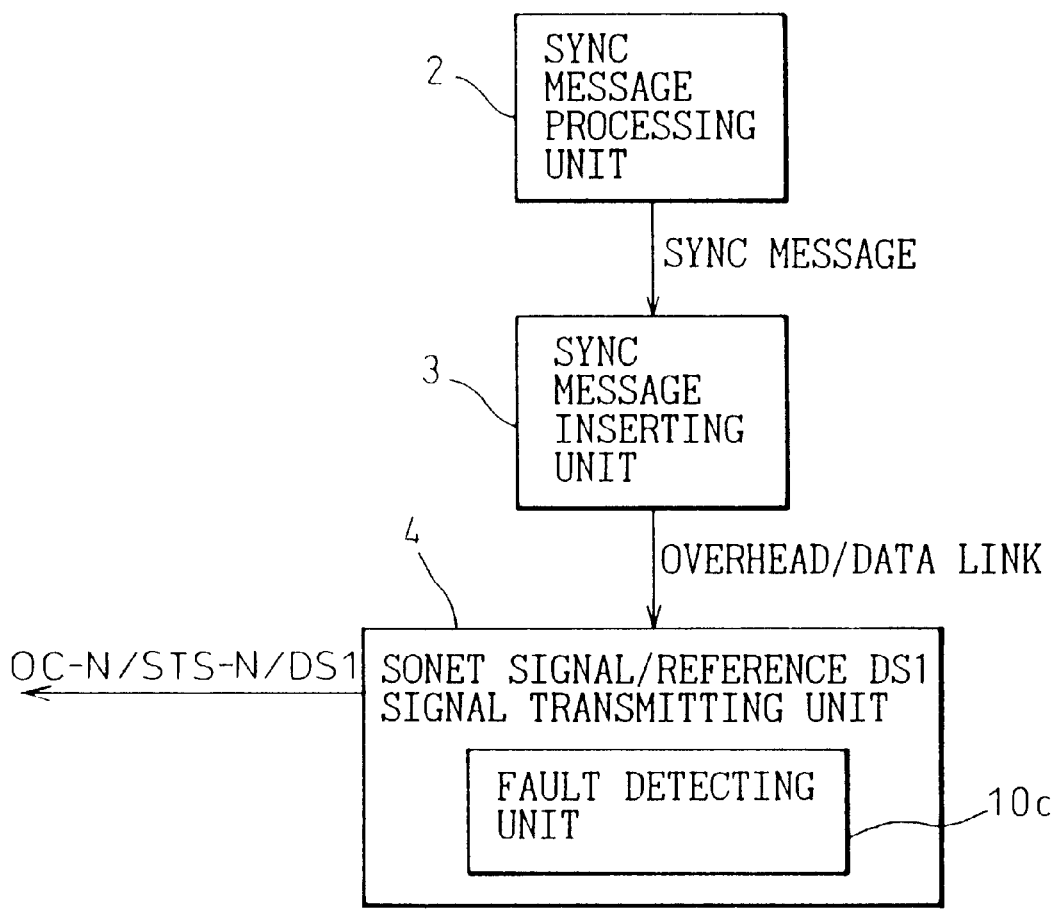
FIG. 46 shows a synchronization message transmitting apparatus according to an embodiment of the aspect 5.

FIG. 46 shows a synchronization message transmitting apparatus according to an embodiment of the aspect 5 of FIG. 5. This embodiment employs a signal transmitting unit 4, which may be a SONET signal transmitting unit 4a or a reference DS1 signal transmitting unit 4b.

If a fault detecting unit 10c detects a fault in the transmitting unit 4, the transmitting unit 4 forcibly inserts a synchronization message of DUS (do not use as a master clock) in the overhead of an OC-N/STS-N frame when the unit 4 is the SONET signal transmitting unit 4a, or in the data link bits of ESF-DS1 frames when the unit 4 is the reference DS1 signal transmitting unit 4b, and transmits the frame(s) to an opposite party. The opposite party that receives the frame(s) with the synchronization message of DUS will not use the frame(s) for preparing a master clock.

If the transmitting unit 4 has a fault, a frame and a synchronization message must be abnormal. In this case, the apparatus can transmit the synchronization message of DUS to the opposite party.

Embodiment of aspect 6

Figure 47:
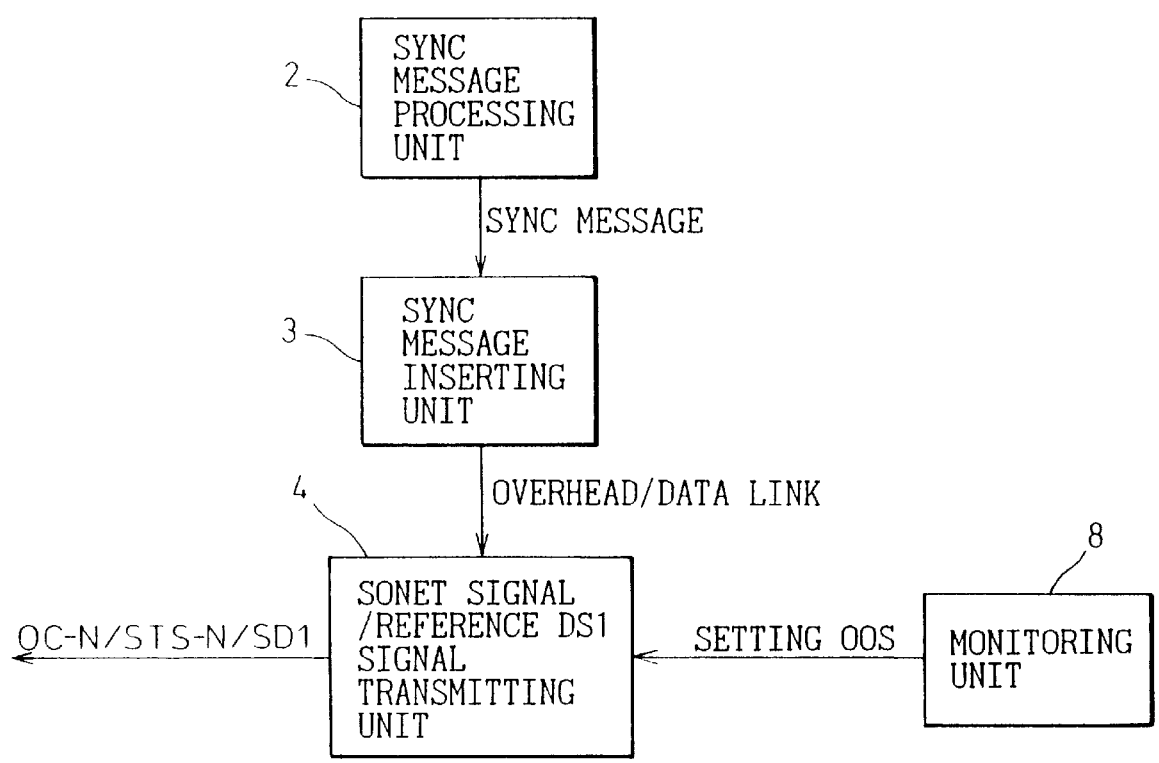
FIG. 47 shows a synchronization message transmitting apparatus according to an embodiment of the aspect 6.

FIG. 47 shows a synchronization message transmitting apparatus according to an embodiment of the aspect 6 of FIG. 6. This embodiment employs a signal transmitting unit 4, which may be a SONET signal transmitting unit 4a or a reference DS1 signal transmitting unit 4b, and a CPU serving as a monitoring unit 8.

If the monitoring unit 8 sets the transmitting unit 4 to OOS (out of service), the transmitting unit 4 forcibly inserts a synchronization message of DUS (do not use as a master clock) in the overhead of an OC-N/STS-N frame when the unit 4 is the SONET signal transmitting unit 4a, or in the data link bits of ESF-DS1 frames when the unit 4 is the reference DS1 signal transmitting unit 4b, and transmits the frame(s) to an opposite party. The opposite party that receives the frame(s) with the synchronization message of DUS will not use the frame(s) for preparing a master clock.

Concrete example of embodiment of FIG. 34

Figure 48A:
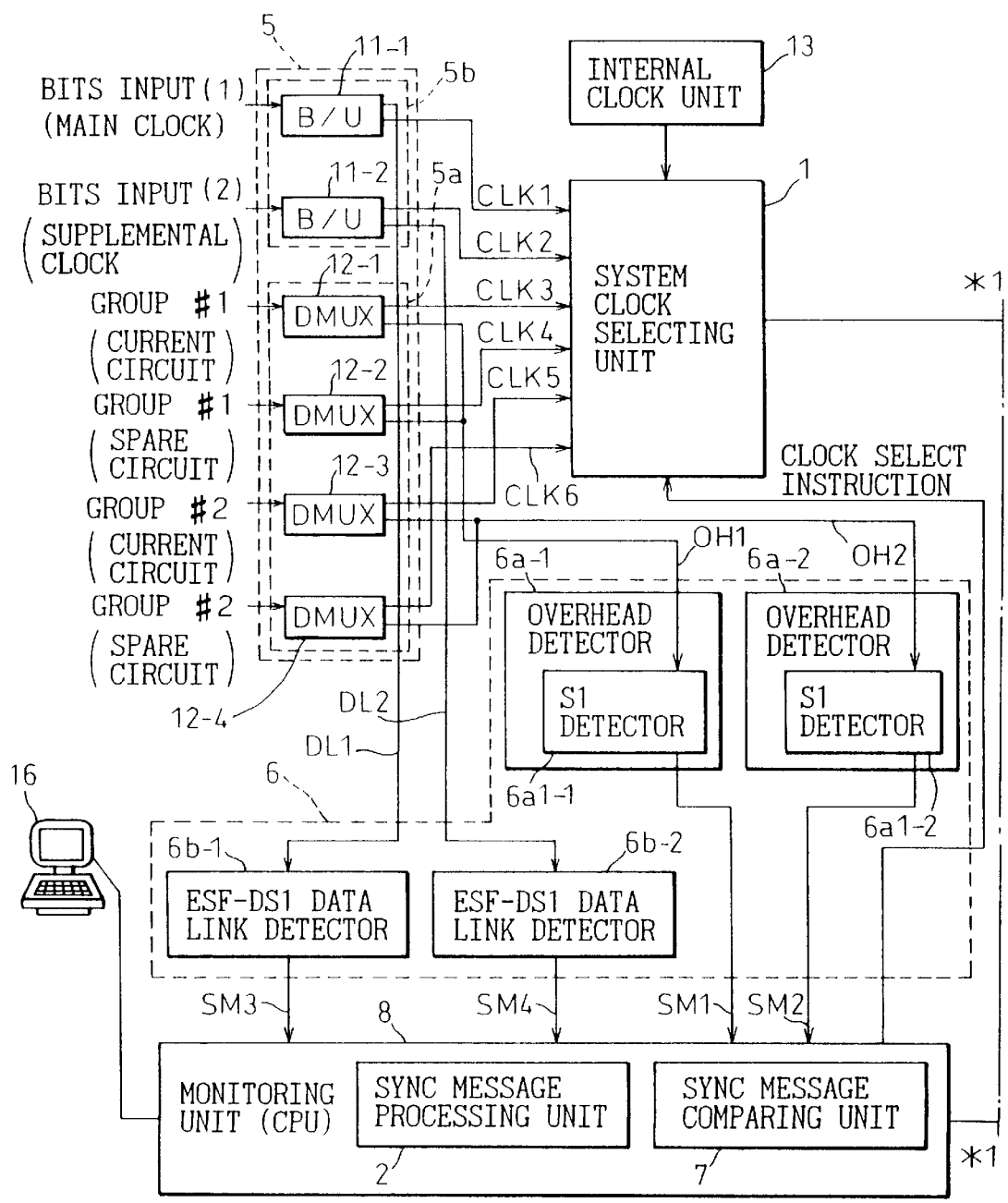
FIGS. 48A and 48B show a concrete example (1) of the embodiment of FIG. 34.
Figure 48B:
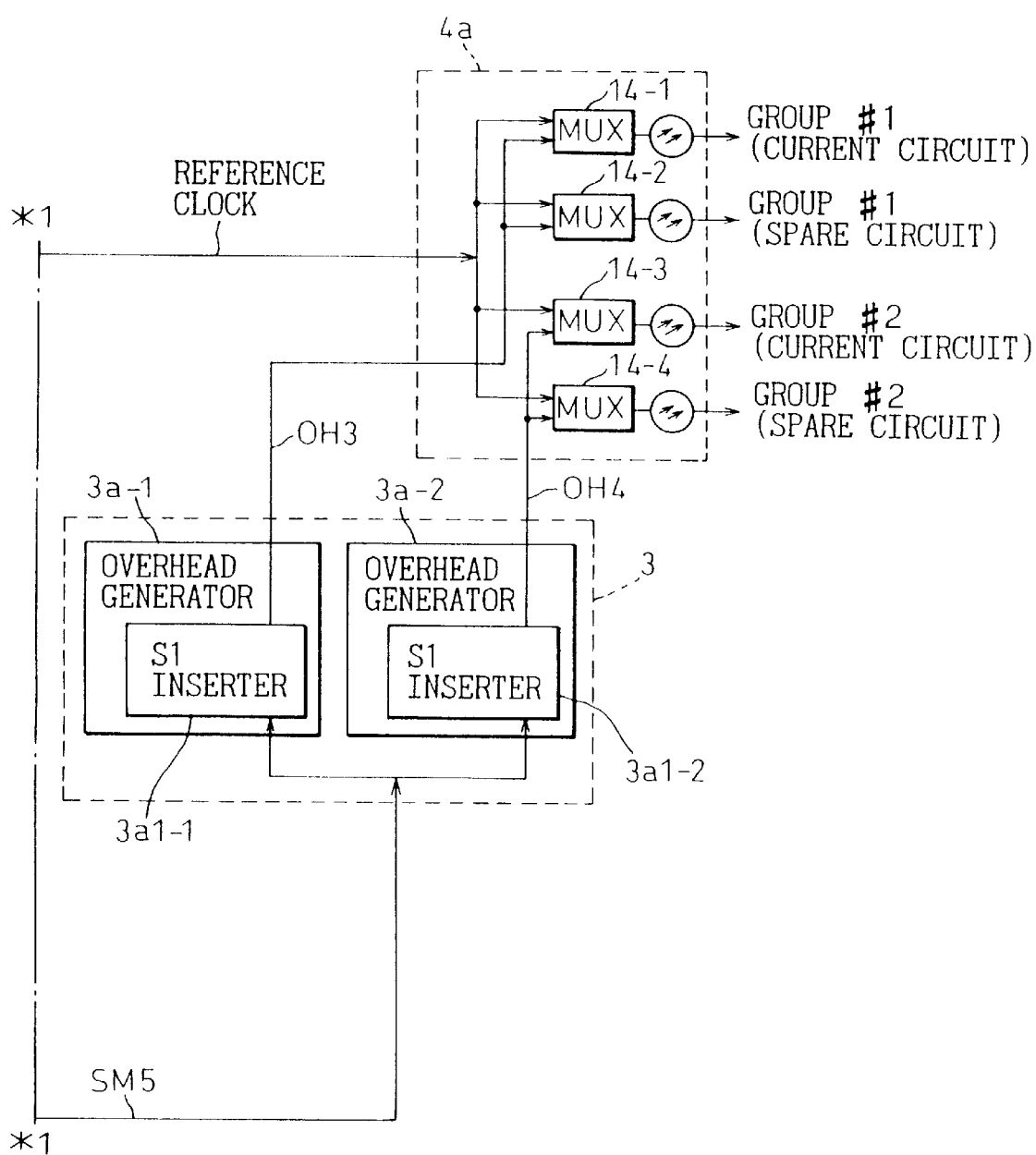

FIGS. 48A and 48B show a concrete example of the embodiment of FIG. 34.

A signal receiving unit 5 consists of a SONET signal receiving unit 5a and a reference DS1 signal receiving unit 5b. The receiving unit 5b consists of bipolar-unipolar (B/U) converters 11-1 and 11-2 for receiving bipolar input signals BITS (1) and (2) (ESF-DS1 frames) and providing unipolar clocks CLK1 and CLK2 a system clock selecting unit 1. The signal receiving unit 5a consists of demultiplexers (DMUXS) 12-1 to 12-4 for receiving input signals of group #1 (current circuit), group #2 (spare circuit), group #2 (current circuit), and group #2 (spare circuit), demultiplexing them, and providing the clock selecting unit 1 with clocks CLK3, CLK4, CLK5, and CLK6.

A synchronization message detecting unit 6 consists of ESF-DS1 data link detectors 6b-1 and 6b-2 for receiving data link signals DL1 and DL2 from the converters 11-1 and 11-2 and providing a CPU 8 with synchronization messages SM3 and SM4, and overhead detectors 6a-1 and 6a-2 containing S1 detectors 6a-1 and 6a1-2 for receiving an overhead OH1 from the demultiplexers 12-1 and 12-2 and an overhead OH2 from the demultiplexers 12-3 and 12-4 and providing the CPU 8 with synchronization messages SM1 and SM2.

A synchronization message inserting unit 3 receives a synchronization message SM5 from the CPU 8. The inserting unit 3 consists of an overhead generator 3a1-1 having an S1 inserter 3a1-1 and an overhead generator 3a-2 having an S1 inserter 3a1-2.

A SONET signal transmitting unit 4a consists of multiplexers 14-1 to 14-4. The multiplexers 14-1 and 14-2 receive an overhead OH3 from the S1 inserter 3a1-1 and a reference clock from the reference clock selecting unit 1, multiplex them, and provide multiplexed signals to the current and spare circuits of the group #1. The multiplexers 14-3 and 14-4 receive an overhead OH4 from the S1 inserter 3a1-2 and the reference clock from the reference clock selecting unit 1, multiplex them, and provide multiplexed signals to the current and spare circuits of the group #2.

The CPU 8 includes a synchronization message processing unit 2 and a synchronization message comparing unit 7.

In operation, the user employs a control board 16 to enter, into the processing unit 2, clock determining information such as a source priority list and quality information about an internal clock unit 13.

The receiving unit 5 receives OC-N frames from the current and spare circuits of the groups #1 and #2, and the demultiplexers 12-1 to 12-4 provide the selecting unit 1 with clocks CLK3 to CLK6.

The converters 11-1 and 11-2 of the receiving unit 5 convert ESF-DS1 frames (BITS inputs (1) and (2)) into unipolar clocks CLK1 and CLK2, which are supplied to the selecting unit 1.

The S1 detector 6a1-l provides the processing unit 2 with a synchronization message SM1 that is contained in an overhead OH1 transferred from a current one of the demultiplexers 12-1 and 12-2.

The S1 detector 6a1-2 provides the processing unit 2 with a synchronization message SM2 that is contained in an overhead OH2 transferred from a current one of the demultiplexers 12-3 and 12-4.

The converters 11-1 and 11-2 supply data links DL1 and DL2 to the ESF-DS1 data link detectors 6b-1 and 6b-2, which supply synchronization messages SM3 and SM4 to the processing unit 2.

The processing unit 2 determines a clock to be selected according to the synchronization messages SM1 to SM4 that indicate the quality levels of the clocks CLK1 to CLK4, and the source priority list. If any synchronization message shows DUS (do not use as a master clock), the corresponding clock will not be selected.

The processing unit 2 sends a clock select instruction to indicate a clock to be selected to the system clock selecting unit 1.

The selecting unit 1 selects the instructed clock as a reference clock, which is sent to the multiplexers 14-1 to 14-4. The reference clock is used as a master clock to multiplex data into an STS or OC-1 frame, which is transmitted to an opposite party.

The comparing unit 7 compares the known quality level of an internal clock with the quality level, which is written in the corresponding synchronization message, of the clock selected by the selecting unit 1, and provides a comparison result SM5 to the S1 inserters 3a1-1 and 3a1-2.

If the comparison result SM5 indicates that the quality level of the selected reference clock is lower than that of the internal clock, the S1 inserters 3*a*1-1 and 3*a*1-2 put "1111" representing DUS (do not use as a master clock) in the bits 5 to 8 of the byte S1 of an overhead, and the overhead generators 3*a*-1 and 3*a*-2 prepare the overhead, which is supplied to the multiplexers 14-1 to 14-4 of the transmitting unit 4*a*. If the comparison result SM5 indicates that the quality level of the selected reference clock is higher than that of the internal clock, the reference clock is used to transmit data.

The multiplexers 14-1 to 14-4 transmit an OC-1 SONET frame to the current and spare circuits of the groups #1 and #2. The opposite party that receives the OC-1 frame with the synchronization message of DUS will not use the frame for preparing a master clock.

Modification of FIGS. 48A and 48B

Figure 49A:
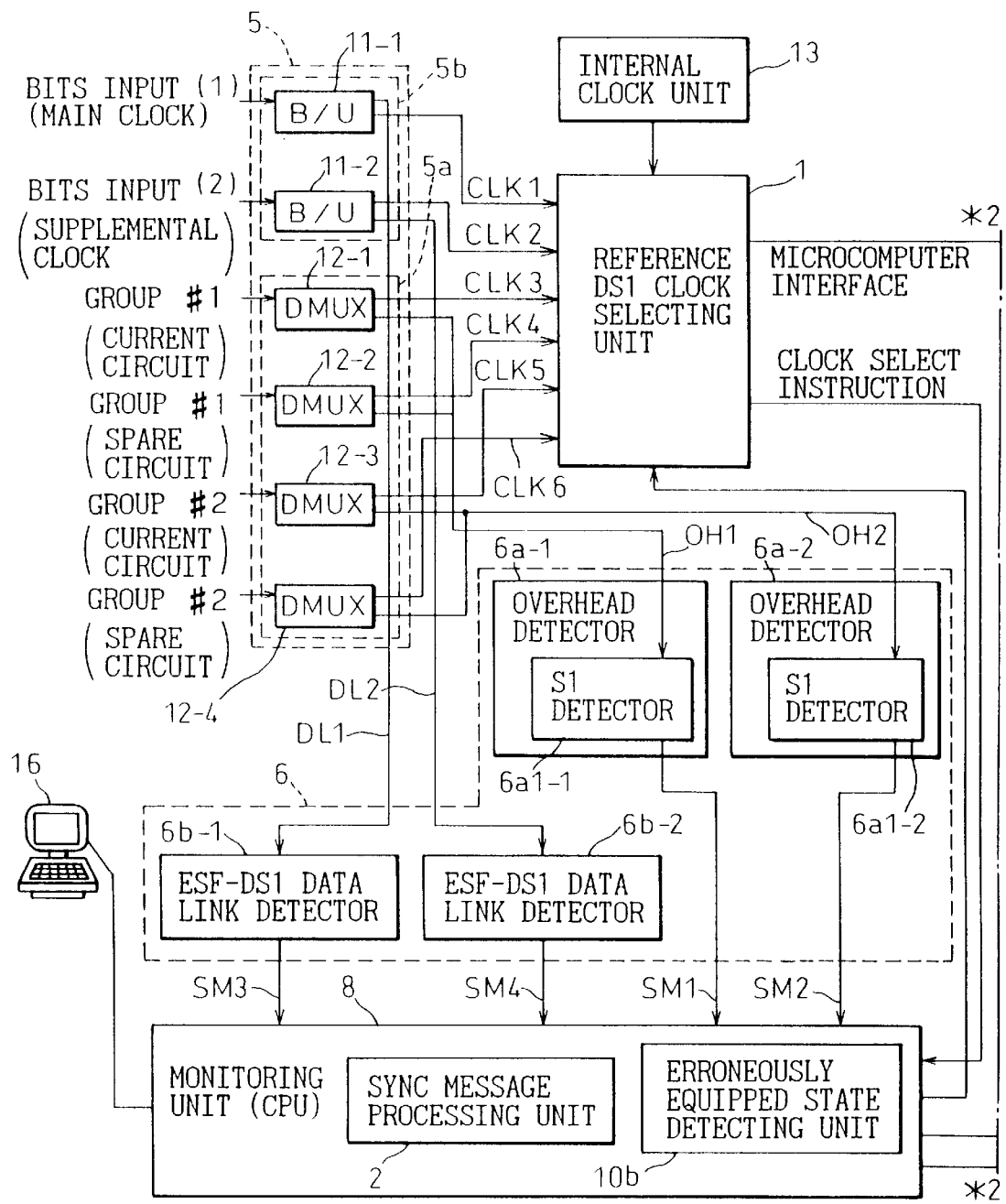
FIGS. 49A and 49B show a modification of the example of FIGS. 48A and 48B.
Figure 49B:
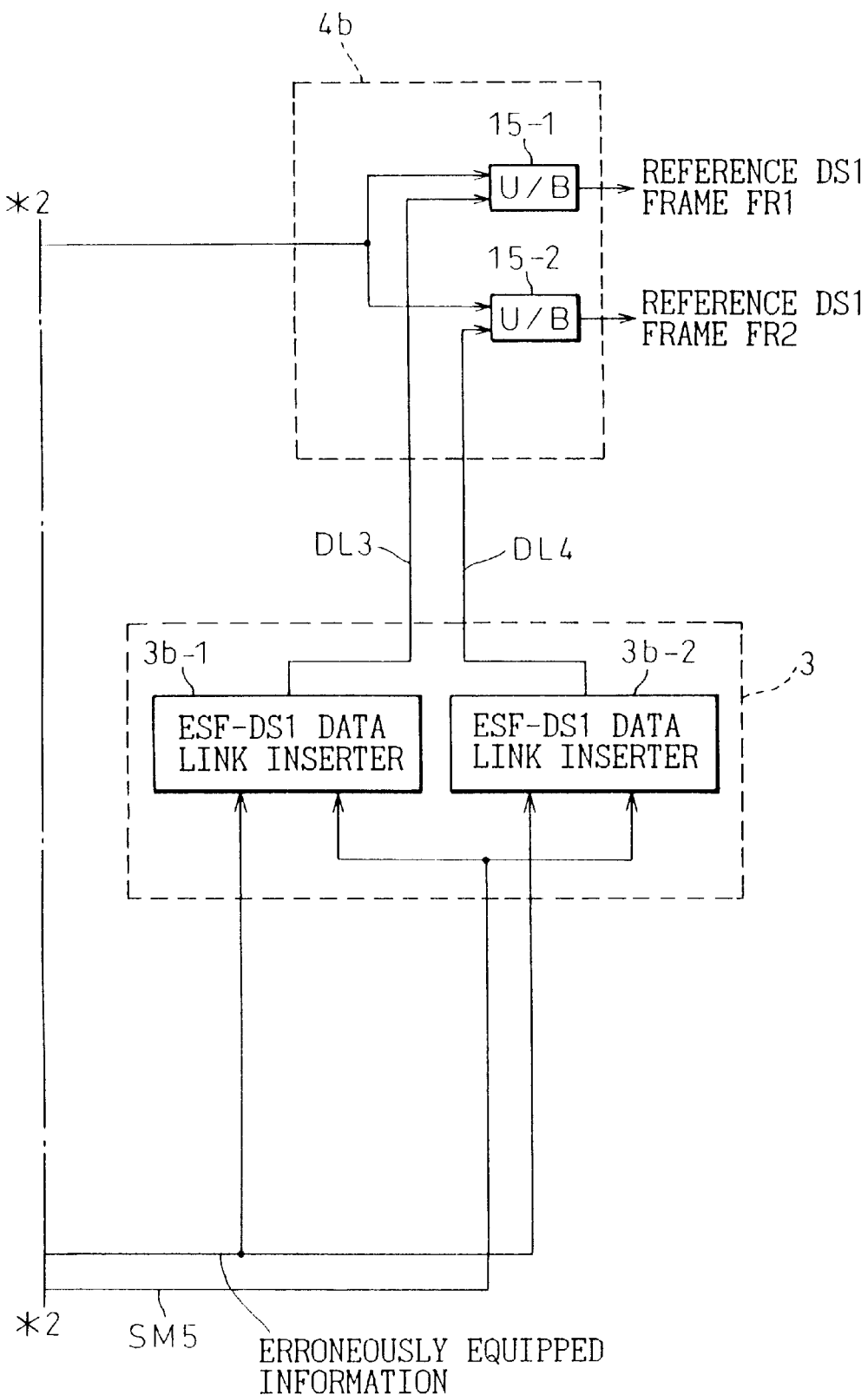

FIGS. 49A and 49B show a modification of the example of FIGS. 48A and 48B. The modification differs from the example of FIGS. 48A and 48B in that it employs a synchronization message inserting unit 3 consisting of ESF-DS1 data link inserters 3*b*-1 and 3*b*-2, and a reference DS1 signal transmitting unit 4*b*.

The transmitting unit 4*b* consists of unipolar-bipolar (U/B) converters 15-1 and 15-2 for receiving a reference clock from a reference DS1 clock selecting unit 1 as well as data links DL3 and DL4 from the inserters 3*b*-1 and 3*b*-2.

The converters 15-1 and 15-2 convert unipolar input signals into bipolar reference DS1 frames FR1 and FR2.

A CPU 8 includes a synchronization message processing unit 2 and an erroneously equipped state detecting unit 10*b*.

The selecting unit 1 has a specific code on a microcomputer interface, and the code is passed to the detecting unit 10*b* in advance.

If the selecting unit 1 is in an erroneously equipped state in operation, the detecting unit 10*b* reads a code related to the selecting unit 1 on the microcomputer interface and finds that the read code is not equal to the specific code of the selecting unit 1 nor a code representing an unequipped state. Then, the detecting unit 10*b* provides erroneously equipped information to the inserters 3*b*-1 and 3*b*-2.

The inserters 3*b*-1 and 3*b*-2 insert a bit string of "0011000011111111" representing DUS (do not use as a master clock) in data link bits without regard to the contents of a synchronization message provided by the processing unit 2.

The converters 15-1 and 15-2 transmit reference DS1 frames FR1 and FR2 with the data link bits prepared by the inserters 3*b*-1 and 3*b*-2 to an opposite party.

The opposite party that receives the frames with the synchronization message of DUS will not use the frames for preparing a master clock.

As explained above, the present invention provides a synchronization message transmitting apparatus that detects an abnormality, if any, in any part of the apparatus or in a clock and prepares a synchronization message announcing that a frame to be transmitted must not be used for providing a master clock. An opposite party that receives the frame with the message will never use the frame for preparing a master clock.

What is claimed is:

1. A synchronization message transmitting apparatus in a network, comprising:

synchronization message processing means for determining a master clock for said network, among available clocks having various quality levels, according to clock determination information and providing a synchronization message that consists of a plural-bit sequence and specifies the quality level of the master clock, the bit rate of the master clock is not changed throughout the network;

clock selecting means for selecting the master clock among the available clocks;

synchronization message inserting means for inserting the synchronization message in a frame to be transmitted;

signal transmitting means for transmitting the frame to an opposite party according to the master clock;

said clock selecting means, said synchronization message inserting means, and said signal transmitting means being removable from said synchronization message processing means; and the apparatus further comprising:

abnormality detecting means for detecting an abnormality, if any, in the clock selecting means and providing abnormality information to any one of the synchronization message processing means, synchronization message inserting means, and signal transmitting means, the means that has received the abnormality information being adapted to insert, in the synchronization message of the frame to be transmitted to the opposite party, information indicating that the frame must not be used for preparing a master clock, by the opposite party.

2. The apparatus of claim 1, wherein the abnormality detecting means detects an unequipped state of the clock selecting means.

3. The apparatus of claim 1, wherein the abnormality detecting means detects an erroneously equipped state of the clock selecting means.

4. The apparatus of claim 1, wherein the abnormality detecting means detects a fault in the clock selecting means.

5. The apparatus of claim 1, wherein the clock selecting means selects a system clock serving as one of a SONET master clock and a reference DS1 clock.

6. The apparatus of claim 1, wherein the abnormality detecting means detects an unequipped state of the clock selecting means, and the clock selecting means selects a system clock serving as one of a SONET master clock and a reference DS1 clock.

7. The apparatus of claim 1, wherein the abnormality detecting means detects an erroneously equipped state of the clock selecting means, and the clock selecting means selects a system clock serving as one of a SONET master clock and a reference DS1 clock.

8. The apparatus of claim 1, wherein the abnormality detecting means detects a fault in the clock selecting means, and the clock selecting means selects a system clock serving as one of a SONET master clock and a reference DS1 clock.

9. The apparatus of any one of claims 1, wherein the synchronization message inserting means inserts the synchronization message in an overhead of a SONET frame or in data link bits of ESF-DS1 frames.

10. The apparatus of claim 1, wherein the abnormality detecting means detects an unequipped state of the clock selecting means, and the synchronization message inserting means inserts the synchronization message in an overhead of a SONET frame or in data link bits of ESF-DS1 frames.

11. The apparatus of claim 1, wherein the abnormality detecting means detects an erroneously equipped state of the clock selecting means, and the synchronization message inserting means inserts the synchronization message in an overhead of a SONET frame or in data link bits of ESF-DS1 frames.

12. The apparatus of claim 1, wherein the abnormality detecting means detects a fault in the clock selecting means, and the synchronization message inserting means inserts the synchronization message in an overhead of a SONET frame or in data link bits of ESF-DS1 frames.

13. The apparatus of claim 1, wherein the clock selecting means selects a system clock serving as one of a SONET master clock and a reference DS1 clock, and the synchronization message inserting means inserts the synchronization message in an-overhead of a SONET frame or in data link bits of ESF-DS1 frames.

14. The apparatus of claim 1, wherein the abnormality detecting means detects an unequipped state of the clock selecting means, the clock selecting means selects a system clock serving as one of a SONET master clock and a reference DS1 clock, and the synchronization message inserting means inserts the synchronization message in an overhead of a SONET frame or in data link bits of ESF-DS1 frames.

15. The apparatus of claim 1, wherein the abnormality detecting means detects an erroneously equipped state of the clock selecting means, the clock selecting means selects a system clock serving as one of a SONET master clock and a reference DS1 clock, and the synchronization message inserting means inserts the synchronization message in an overhead of a SONET frame or in data link bits of ESF-DS1 frames.

16. The apparatus of claim 1, wherein the abnormality detecting means detects a fault in the clock selecting means, the clock selecting means selects a system clock serving as one of a SONET master clock and a reference DS1 clock, and the synchronization message inserting means inserts the synchronization message in an overhead of a SONET frame or in data link bits of ESF-DS1 frames.

17. A synchronization message transmitting apparatus in a network, comprising:

signal receiving means for receiving a frame from another party;

synchronization message detecting means for detecting a synchronization message in the received frame;

synchronization message processing means for determining a master clock for said network, among available clocks having various quality levels, according to clock determination information and providing a synchronization message that consists of a plural-bit sequence and specifies the quality level of the master clock, the bit rate of the master clock is not changed throughout the network;

clock selecting means for selecting the master clock among the available clocks having various quality levels;

synchronization message inserting means for inserting the synchronization message prepared by the synchronization message processing means in a frame to be transmitted;

signal transmitting means for transmitting the frame to an opposite party according to the master clock;

said clock selecting means, said synchronization message inserting means, and said signal transmitting means being removable from said synchronization message processing means; and the apparatus further comprising:

synchronization message comparing means for comparing a clock quality level written in the received synchronization message with the quality level of an internal clock and providing a comparison result to any one of the synchronization message processing means, synchronization message inserting means, and signal transmitting means, the means that has received the comparison result being adapted to insert, if the comparison result indicates that the clock quality level, information indicating that the frame to be transmitted to the opposite party must not be used by the opposite party for preparing a master clock in the synchronization message of the frame.

18. The apparatus of claim 17, wherein the clock selecting means selects a system clock serving as one of a SONET master clock and a reference DS1 clock.

19. The apparatus of claims 17, wherein the clock selecting means selects a system clock serving as one of a SONET master clock and a reference DS1 clock, and the synchronization message inserting means inserts the synchronization message in an overhead of a SONET frame or in data link bits of ESF-DS1 frames.

20. A synchronization message transmitting apparatus in a network, comprising:

synchronization message processing means for providing a synchronization message that consists of a plural-bit sequence and specifies the quality level of a master clock for said network, the bit rate of the master clock is not changed throughout the network;

synchronization message inserting means for inserting the synchronization message in a frame to be transmitted;

signal transmitting means for transmitting the frame to an opposite party according to the master clock;

said synchronization message inserting means and said signal transmitting means being removable from said synchronization message processing means; and the apparatus further comprising:

abnormality detecting means for detecting an abnormality, if any, in the synchronization message inserting means and providing abnormality information to the signal transmitting means, which inserts, in the synchronization message of the frame to be transmitted to the opposite party, information indicating that the frame must not be used for preparing a master clock, by the opposite party.

21. The apparatus of claim 20, wherein the abnormality detecting means detects an unequipped state of the synchronization message inserting means.

22. The apparatus of claim 20, wherein the abnormality detecting means detects an erroneously equipped state of the synchronization message inserting means.

23. The apparatus of claim 20, wherein the abnormality detecting means detects a fault in the synchronization message inserting means.

24. The apparatus of claim 20, wherein the abnormality detecting means detects an unequipped state of the synchronization message inserting means, and the synchronization message inserting means inserts the synchronization message in an overhead of a SONET frame or in data link bits of ESF-DS1 freeazes.

25. The apparatus of claim 20, wherein the abnormality detecting means detects an erroneously equipped state of the synchronization message inserting means, and the synchronization message inserting means inserts the synchronization message in an overhead of a SONET frame or in data link bits tof ESF-DS1 frames.

26. The apparatus of claim 20, wherein the abnormality detecting means detects a fault in the synchronization message inserting means, and the synchronization message inserting means inserts the synchronization message in an overhead of a SONET frame or in data link bits of ESF-DS1 frames.

27. A synchronization message transmitting apparatus in a network, comprising:

synchronization message processing means for providing a synchronization message that consists of a plural-bit sequence and specifies the quality level of a master clock for said network, the bit rate of the master clock is not changed throughout the network;

synchronization message inserting means for inserting the synchronization message in a frame to be transmitted;

signal transmitting means for transmitting the frame to an opposite party according to the master clock;

said synchronization message inserting means and said signal transmitting means being removable from said synchronization message processing means; and the apparatus further comprising:

means for monitoring and controlling the apparatus, providing the synchronization message inserting means with a signal to put the inserting means in a pseudo unequipped state, and providing the signal transmitting means with unequipped information indicating that the inserting means is in the pseudo unequipped state, the signal transmitting means inserting, upon receiving the unequipped information, information indicating that the frame to be transmitted to the opposite party must not be used on the opposite party for preparing a master clock in the synchronization message of the frame.

28. A synchronization message transmitting apparatus in a network, comprising:

synchronization message processing means for providing a synchronization message that consists of a plural-bit sequence and specifies the quality level of a master clock for said networking, the bit rate of the master clock is not changed throughout the network;

synchronization message inserting means for inserting the synchronization message in a frame to be transmitted;

a signal transmitting means for transmitting the frame to an opposite party according to the master clock;

said synchronization message inserting means and said signal transmitting means being removable from said synchronization message processing means; and the apparatus further comprising:

abnormality detecting means for detecting an abnormality, if any, in the signal transmitting means and inserting, in the synchronization message of the frame to be transmitted to the opposite party, information indicating that the frame must not be used for preparing a master clock by the opposite party.

29. The apparatus of claimed 28, wherein the abnormality detecting means detects an erroneously equipped state of the signal transmitting means.

30. The apparatus of claim 28, wherein the abnormality detecting means detects a fault in the signal transmitting means.

31. The apparatus of claim 28, wherein the abnormality detecting means detects an erroneously equipped state of the signal transmitting means, and the synchronization message inserting means inserts the synchronization message in an overhead of a SONET frame or in data link bits of ESF-DS1 frames.

32. The apparatus of claim 28, wherein the abnormality detecting means detects a fault in the signal transmitting means, and the synchronization message inserting means inserts the synchronization message in an overhead of a SONET frame or in data link bits of ESF-DS1 frames.

33. A synchronization message transmitting apparatus in a network, comprising:

synchronization message processing means for providing a synchronization message that consists of a plural-bit sequence and specifies the quality level of a master clock for said network, the bit rate of the master clock is not changed throughout the network;

synchronization message inserting means for inserting the synchronization message in a frame to be transmitted;

signal transmitting the frame to an opposite party according to the master clock;

said synchronization message inserting means and said signal transmitting means being removable from said synchronization message processing means; and the apparatus further comprising:

means for monitoring and controlling the apparatus and providing the signal transmitting means with a signal to put the signal transmitting means in a pseudo unequipped state and letting the signal transmitting means insert, in the synchronization message of the frame to be transmitted to the opposite party, information indicating that the frame must not be used for preparing a master clock by the opposite party.

* * * * *